(12) United States Patent
Sirpal et al.

(10) Patent No.: US 10,444,848 B2
(45) Date of Patent: Oct. 15, 2019

(54) MEDIA CENTER PANELS FOR AN INTELLIGENT TELEVISION

(71) Applicant: Flextronics AP, LLC, San Jose, CA (US)

(72) Inventors: Sanjiv Sirpal, Oakville (CA); Mohammed Selim, Oakville (CA); Mikhail Shoykher, Thornhill (CA); John S. Visosky, Gormley (CA); Terrance D. Voth, Uxbridge (CA)

(73) Assignee: Flextronics AP, LLC, San Jose, CA (US)

(*) Notice: Subject to any disclaimer, the term of this patent is extended or adjusted under 35 U.S.C. 154(b) by 0 days.

(21) Appl. No.: 14/822,705

(22) Filed: Aug. 10, 2015

(65) Prior Publication Data

US 2016/0050462 A1 Feb. 18, 2016

Related U.S. Application Data

(63) Continuation of application No. 13/968,897, filed on Aug. 16, 2013, now abandoned, and a continuation of
(Continued)

(51) Int. Cl.
*H04N 21/431* (2011.01)
*G06F 3/01* (2006.01)
(Continued)

(52) U.S. Cl.
CPC ............ *G06F 3/017* (2013.01); *G06F 3/0481* (2013.01); *G06F 3/04817* (2013.01);
(Continued)

(58) Field of Classification Search
CPC ......... H04N 21/26291; H04N 21/4307; H04N 21/437; H04N 21/44204; H04N 21/44213;
(Continued)

(56) References Cited

U.S. PATENT DOCUMENTS 5,539,479 A 7/1996 Bertram
5,734,444 A 3/1998 Yoshinobo
(Continued)

FOREIGN PATENT DOCUMENTS

CN 101540850 9/2009
CN 101567992 10/2009
(Continued)

OTHER PUBLICATIONS

U.S. Appl. No. 14/834,316, filed Aug. 24, 2015, Selim et al.
(Continued)

*Primary Examiner* — Joshua D Taylor
(74) *Attorney, Agent, or Firm* — Sheridan Ross P.C.

(57) ABSTRACT

An Intelligent TV can organize metadata about media items for display in a variety of contextual panels. The panels may be interactive or informational and may provide recommendations of other media items to the user. The Intelligent TV can receive a request to activate a panel through the reception of signals from a remote control or a user interface. Based on the request, the Intelligent TV can determine the type of panel requested by the user. The layout, information, and content of a panel may depend on the context and content of the media item with focus when a user activates the panel. The Intelligent TV can retrieve metadata for the requested panel and can then transition to the desired panel and provide the retrieved metadata.

20 Claims, 42 Drawing Sheets

Related U.S. Application Data application No. 13/968,903, filed on Aug. 16, 2013, now abandoned, application No. 14/822,705, which is a continuation of application No. 13/968,876, filed on Aug. 16, 2013, now abandoned, application No. 14/822,705, which is a continuation of application No. 13/968,867, filed on Aug. 16, 2013, now Pat. No. 9,237,291, application No. 14/822,705, which is a continuation of application No. 13/968,913, filed on Aug. 16, 2013, now abandoned, application No. 14/822,705, which is a continuation of application No. 14/407,598, filed as application No. PCT/US2013/036844 on Apr. 16, 2013, now abandoned, application No. 14/822,705, which is a continuation of application No. 14/407,593, filed as application No. PCT/US2013/036782 on Apr. 16, 2013, now abandoned.

(60) Provisional application No. 61/684,672, filed on Aug. 17, 2012, provisional application No. 61/702,650, filed on Sep. 18, 2012, provisional application No. 61/697,710, filed on Sep. 6, 2012, provisional application No. 61/700,182, filed on Sep. 12, 2012, provisional application No. 61/736,692, filed on Dec. 13, 2012, provisional application No. 61/798,821, filed on Mar. 15, 2013, provisional application No. 61/804,942, filed on Mar. 25, 2013, provisional application No. 61/804,998, filed on Mar. 25, 2013, provisional application No. 61/804,971, filed on Mar. 25, 2013, provisional application No. 61/804,990, filed on Mar. 25, 2013, provisional application No. 61/805,003, filed on Mar. 25, 2013, provisional application No. 61/805,053, filed on Mar. 25, 2013, provisional application No. 61/805,030, filed on Mar. 25, 2013, provisional application No. 61/805,027, filed on Mar. 25, 2013, provisional application No. 61/805,042, filed on Mar. 25, 2013, provisional application No. 61/805,038, filed on Mar. 25, 2013.

(51) Int. Cl.

| | | |
|---|---|---|
| *H04N 21/4725* | (2011.01) | |
| *H04N 21/40* | (2011.01) | |
| *H04N 21/8545* | (2011.01) | |
| *H04N 21/85* | (2011.01) | |
| *H04N 21/43* | (2011.01) | |
| *H04N 21/422* | (2011.01) | |
| *H04N 21/25* | (2011.01) | |
| *H04N 21/258* | (2011.01) | |
| *H04N 21/24* | (2011.01) | |
| *H04N 5/44* | (2011.01) | |
| *H04N 21/262* | (2011.01) | |
| *H04N 21/81* | (2011.01) | |
| *H04N 21/442* | (2011.01) | |
| *H04N 21/485* | (2011.01) | |
| *H04N 21/84* | (2011.01) | |
| *H04N 21/478* | (2011.01) | |
| *G06F 3/0481* | (2013.01) | |
| *H04N 21/61* | (2011.01) | |
| *H04L 12/58* | (2006.01) | |
| *G06F 3/0488* | (2013.01) | |
| *H04N 5/445* | (2011.01) | |
| *H04N 21/658* | (2011.01) | |
| *H04N 21/426* | (2011.01) | |
| *G06F 3/0484* | (2013.01) | |
| *H04N 21/472* | (2011.01) | |
| *H04N 21/414* | (2011.01) | |
| *H04N 21/482* | (2011.01) | |
| *H04N 21/231* | (2011.01) | |
| *H04N 1/00* | (2006.01) | |

(52) U.S. Cl.
CPC ...... *G06F 3/04842* (2013.01); *G06F 3/04883* (2013.01); *H04L 51/32* (2013.01); *H04N 1/00448* (2013.01); *H04N 5/4403* (2013.01); *H04N 5/44591* (2013.01); *H04N 21/23109* (2013.01); *H04N 21/24* (2013.01); *H04N 21/25* (2013.01); *H04N 21/251* (2013.01); *H04N 21/258* (2013.01); *H04N 21/25808* (2013.01); *H04N 21/25883* (2013.01); *H04N 21/25891* (2013.01); *H04N 21/26291* (2013.01); *H04N 21/40* (2013.01); *H04N 21/414* (2013.01); *H04N 21/422* (2013.01); *H04N 21/4221* (2013.01); *H04N 21/42203* (2013.01); *H04N 21/42684* (2013.01); *H04N 21/43* (2013.01); *H04N 21/431* (2013.01); *H04N 21/4302* (2013.01); *H04N 21/4312* (2013.01); *H04N 21/4314* (2013.01); *H04N 21/4316* (2013.01); *H04N 21/44204* (2013.01); *H04N 21/44222* (2013.01); *H04N 21/478* (2013.01); *H04N 21/4725* (2013.01); *H04N 21/47205* (2013.01); *H04N 21/485* (2013.01); *H04N 21/4823* (2013.01); *H04N 21/4858* (2013.01); *H04N 21/6125* (2013.01); *H04N 21/6175* (2013.01); *H04N 21/6582* (2013.01); *H04N 21/8166* (2013.01); *H04N 21/8173* (2013.01); *H04N 21/84* (2013.01); *H04N 21/85* (2013.01); *H04N 21/8545* (2013.01); *G06F 2203/04804* (2013.01); *H04N 2005/4414* (2013.01)

(58) Field of Classification Search
CPC ......... H04N 21/44222; H04N 21/4622; H04N 21/472; H04N 21/4788; H04N 21/4823; H04N 21/4828; H04N 21/485; H04N 21/8166; H04N 21/21
See application file for complete search history.

(56) References Cited

U.S. PATENT DOCUMENTS

| | | |
|---|---|---|
| 5,801,747 A | 9/1998 | Bedard |
| 5,933,141 A | 8/1999 | Smith |
| 6,002,394 A | 12/1999 | Schein et al. |
| 6,008,803 A | 12/1999 | Rowe et al. |
| 6,239,794 B1 | 5/2001 | Yuen et al. |
| 6,563,515 B1 | 5/2003 | Reynolds et al. |
| 6,564,378 B1 | 5/2003 | Satterfield et al. |
| 6,661,468 B2 | 12/2003 | Alten et al. |
| 6,978,473 B1 | 12/2005 | Nsonwu et al. |
| 7,152,236 B1 | 12/2006 | Wugofski et al. |
| 7,159,177 B2 | 1/2007 | Billmaier et al. |
| 7,174,126 B2 | 2/2007 | McElhatten et al. |
| 7,228,556 B2 | 6/2007 | Beach et al. |
| 7,487,529 B1 | 2/2009 | Orlick |
| 7,493,641 B2 | 2/2009 | Klosterman et al. |
| 7,506,350 B2 | 3/2009 | Johnson |
| 7,543,320 B2 | 6/2009 | Schein et al. |
| 7,685,520 B2 | 3/2010 | Rashkovskiy et al. |
| 7,694,319 B1 | 4/2010 | Hassell et al. |
| 7,880,077 B2 | 2/2011 | Pauws et al. |
| 7,900,228 B2 | 3/2011 | Stark et al. |
| 7,908,635 B2 | 3/2011 | Barton et al. |
| 8,006,201 B2 | 8/2011 | Bhattacharya |
| 8,089,455 B1 | 1/2012 | Wieder |
| 8,127,329 B1 | 2/2012 | Kunkel et al. |
| 8,132,221 B2 | 3/2012 | Malik |

(56) References Cited

U.S. PATENT DOCUMENTS

| | | |
|---|---|---|
| 8,166,511 B2 | 4/2012 | Griggs |
| 8,220,021 B1 | 7/2012 | Look et al. |
| 8,281,339 B1 | 10/2012 | Walker et al. |
| 8,352,983 B1 | 1/2013 | Chane et al. |
| 8,510,780 B2 | 8/2013 | Stallings et al. |
| 8,516,519 B2 | 8/2013 | Lee |
| 8,549,561 B2 | 10/2013 | Yeh et al. |
| 8,589,981 B2 | 11/2013 | Lee et al. |
| 8,640,166 B1 | 1/2014 | Craner |
| 8,683,519 B2 | 3/2014 | McCarthy et al. |
| 8,776,101 B2 | 7/2014 | Donoghue et al. |
| 8,875,056 B2 | 10/2014 | Onogi et al. |
| 9,055,254 B2 | 6/2015 | Selim |
| 9,055,255 B2 | 6/2015 | Burdzinski et al. |
| 9,118,864 B2 | 8/2015 | Sirpal et al. |
| 9,219,946 B2 | 12/2015 | Bae et al. |
| 9,237,291 B2 | 1/2016 | Selim |
| 9,271,039 B2 | 2/2016 | Sirpal et al. |
| 2001/0056577 A1 | 12/2001 | Gordon et al. |
| 2002/0026637 A1 | 2/2002 | Markel et al. |
| 2002/0042914 A1 | 4/2002 | Walker et al. |
| 2002/0067376 A1 | 6/2002 | Martin et al. |
| 2002/0188944 A1 | 12/2002 | Noble |
| 2002/0188958 A1 | 12/2002 | Miller |
| 2003/0003876 A1 | 1/2003 | Rumsey |
| 2003/0014752 A1 | 1/2003 | Zaslaysky et al. |
| 2003/0028880 A1* | 2/2003 | Smith ............... H04N 5/44543 725/40 |
| 2003/0069874 A1 | 4/2003 | Hertzog et al. |
| 2003/0070171 A1 | 4/2003 | Jeon et al. |
| 2003/0110234 A1 | 6/2003 | Egli et al. |
| 2003/0149988 A1 | 8/2003 | Ellis et al. |
| 2003/0177498 A1 | 9/2003 | Ellis et al. |
| 2003/0182658 A1 | 9/2003 | Alexander |
| 2003/0182659 A1 | 9/2003 | Ellis et al. |
| 2003/0221192 A1 | 11/2003 | Rappaport et al. |
| 2004/0093616 A1 | 5/2004 | Johnson |
| 2004/0117831 A1 | 6/2004 | Ellis et al. |
| 2004/0154040 A1 | 8/2004 | Ellis |
| 2004/0216156 A1 | 10/2004 | Wagner |
| 2004/0237108 A1 | 11/2004 | Drazin et al. |
| 2005/0015803 A1 | 1/2005 | Macrae et al. |
| 2005/0097622 A1 | 5/2005 | Zigmond et al. |
| 2005/0160452 A1 | 7/2005 | Lawler et al. |
| 2005/0204387 A1 | 9/2005 | Knudson et al. |
| 2005/0273819 A1 | 12/2005 | Knudson et al. |
| 2006/0101504 A1 | 5/2006 | Aravamudan et al. |
| 2006/0117343 A1 | 6/2006 | Novak et al. |
| 2006/0123445 A1 | 6/2006 | Sullivan et al. |
| 2006/0136965 A1* | 6/2006 | Ellis ............... H04H 60/31 725/46 |
| 2006/0184972 A1 | 8/2006 | Rafey et al. |
| 2006/0236349 A1* | 10/2006 | Lee ............... G06F 3/0482 725/80 |
| 2007/0011702 A1 | 1/2007 | Vaysman |
| 2007/0162936 A1 | 7/2007 | Stallings et al. |
| 2007/0199022 A1 | 8/2007 | Moshiri et al. |
| 2007/0261090 A1 | 11/2007 | Miller et al. |
| 2008/0022309 A1 | 1/2008 | Begeja et al. |
| 2008/0066111 A1 | 3/2008 | Ellis et al. |
| 2008/0086456 A1 | 4/2008 | Rasanen et al. |
| 2008/0086745 A1 | 4/2008 | Knudson et al. |
| 2008/0120635 A1 | 5/2008 | Trimper et al. |
| 2008/0155613 A1 | 6/2008 | Benya et al. |
| 2008/0244637 A1 | 10/2008 | Candelore |
| 2008/0250455 A1 | 10/2008 | Fukuda et al. |
| 2008/0271080 A1 | 10/2008 | Gossweiler et al. |
| 2008/0282294 A1 | 11/2008 | Carpenter et al. |
| 2008/0313677 A1 | 12/2008 | Lee |
| 2009/0013350 A1 | 1/2009 | Ohlfs et al. |
| 2009/0064222 A1 | 3/2009 | Dawson et al. |
| 2009/0112930 A1 | 4/2009 | Anguiano |
| 2009/0125940 A1 | 5/2009 | Kim et al. |
| 2009/0158375 A1 | 6/2009 | Rodriguez et al. |
| 2009/0160764 A1 | 6/2009 | Myllymäki |
| 2009/0199241 A1 | 8/2009 | Unger et al. |
| 2009/0199242 A1 | 8/2009 | Johnson et al. |
| 2009/0204929 A1 | 8/2009 | Baurmann et al. |
| 2009/0213079 A1 | 8/2009 | Segal et al. |
| 2009/0228919 A1 | 9/2009 | Zott et al. |
| 2009/0271823 A1 | 10/2009 | Jung et al. |
| 2009/0300674 A1 | 12/2009 | Ratsch et al. |
| 2009/0313232 A1 | 12/2009 | Tinsley et al. |
| 2010/0013997 A1 | 1/2010 | Whang |
| 2010/0037267 A1 | 2/2010 | Bennett |
| 2010/0060799 A1 | 3/2010 | Ishii |
| 2010/0095317 A1 | 4/2010 | Toebes et al. |
| 2010/0177252 A1 | 7/2010 | Larsen et al. |
| 2010/0180292 A1 | 7/2010 | Epstein et al. |
| 2010/0180300 A1 | 7/2010 | Carpenter et al. |
| 2010/0201890 A1 | 8/2010 | Degonde et al. |
| 2010/0225830 A1 | 9/2010 | Blanchard et al. |
| 2010/0235740 A1 | 9/2010 | Friedlander et al. |
| 2010/0251304 A1 | 9/2010 | Donoghue et al. |
| 2010/0302444 A1 | 12/2010 | Ahn et al. |
| 2011/0041150 A1 | 2/2011 | Schein et al. |
| 2011/0055873 A1 | 3/2011 | Heo et al. |
| 2011/0078745 A1 | 3/2011 | Macrae et al. |
| 2011/0107376 A1 | 5/2011 | Lee et al. |
| 2011/0119626 A1 | 5/2011 | Faenger et al. |
| 2011/0119702 A1 | 5/2011 | Jang et al. |
| 2011/0126251 A1 | 5/2011 | LaFreniere et al. |
| 2011/0145860 A1 | 6/2011 | Wei |
| 2011/0154198 A1 | 6/2011 | Bachman et al. |
| 2011/0173657 A1 | 7/2011 | Thomas et al. |
| 2011/0173667 A1 | 7/2011 | Watson et al. |
| 2011/0179453 A1* | 7/2011 | Poniatowski ......... G06F 3/0482 725/58 |
| 2011/0179454 A1 | 7/2011 | Yates |
| 2011/0289067 A1 | 11/2011 | Jordan et al. |
| 2011/0289419 A1 | 11/2011 | Yu et al. |
| 2011/0289452 A1 | 11/2011 | Jordan et al. |
| 2011/0321095 A1 | 12/2011 | Yao et al. |
| 2011/0321098 A1 | 12/2011 | Bangalore et al. |
| 2012/0030317 A1* | 2/2012 | Smyth ............... G06F 17/30905 709/219 |
| 2012/0060092 A1 | 3/2012 | Hill et al. |
| 2012/0072952 A1 | 3/2012 | Vaysman et al. |
| 2012/0076473 A1 | 3/2012 | Kunkel et al. |
| 2012/0090004 A1 | 4/2012 | Jeong |
| 2012/0110623 A1 | 5/2012 | Hill et al. |
| 2012/0120316 A1* | 5/2012 | Lee ............... H04N 21/42204 348/564 |
| 2012/0144416 A1* | 6/2012 | Wetzer ............ H04N 21/25816 725/14 |
| 2012/0144422 A1 | 6/2012 | Han et al. |
| 2012/0144423 A1 | 6/2012 | Kim et al. |
| 2012/0167142 A1 | 6/2012 | Hey |
| 2012/0174029 A1 | 7/2012 | Rhoads et al. |
| 2012/0185902 A1 | 7/2012 | LaRosa et al. |
| 2012/0200574 A1 | 8/2012 | Hill et al. |
| 2012/0206652 A1 | 8/2012 | Yi |
| 2012/0210275 A1 | 8/2012 | Park et al. |
| 2012/0210367 A1 | 8/2012 | Lee et al. |
| 2012/0210370 A1 | 8/2012 | Kim et al. |
| 2012/0210386 A1 | 8/2012 | Kim et al. |
| 2012/0221972 A1 | 8/2012 | Dougall et al. |
| 2012/0229320 A1 | 9/2012 | Yu |
| 2012/0257108 A1 | 10/2012 | Friedlander et al. |
| 2012/0260284 A1 | 10/2012 | Friedlander et al. |
| 2012/0271711 A1 | 10/2012 | Moshiri et al. |
| 2012/0272271 A1 | 10/2012 | Nishizawa et al. |
| 2012/0278837 A1 | 11/2012 | Curtis et al. |
| 2012/0284751 A1 | 11/2012 | Kim et al. |
| 2012/0291068 A1 | 11/2012 | Khushoo et al. |
| 2012/0303710 A1 | 11/2012 | Roberts et al. |
| 2013/0027613 A1 | 1/2013 | Kim et al. |
| 2013/0097640 A1 | 4/2013 | Lemmons et al. |
| 2013/0198685 A1 | 8/2013 | Bernini et al. |
| 2013/0238777 A1 | 9/2013 | Raleigh |
| 2013/0276031 A1 | 10/2013 | Oh et al. |
| 2013/0318553 A1 | 11/2013 | Yegorov et al. |
| 2013/0326557 A1 | 12/2013 | Kang et al. |
| 2014/0053180 A1 | 2/2014 | Shoykher |

(56) References Cited

U.S. PATENT DOCUMENTS

| | | |
|---|---|---|
| 2014/0053198 A1 | 2/2014 | Sirpal et al. |
| 2014/0053202 A1 | 2/2014 | Selim |
| 2014/0053212 A1 | 2/2014 | Shoykher et al. |
| 2014/0059605 A1 | 2/2014 | Sirpal et al. |
| 2014/0059606 A1 | 2/2014 | Selim et al. |
| 2014/0059615 A1 | 2/2014 | Sirpal et al. |
| 2014/0059635 A1 | 2/2014 | Sirpal et al. |
| 2014/0068673 A1 | 3/2014 | Sirpal et al. |
| 2014/0068674 A1 | 3/2014 | Sirpal et al. |
| 2014/0282730 A1 | 9/2014 | Hieb |
| 2015/0033268 A1 | 1/2015 | Alford et al. |
| 2015/0163537 A1 | 6/2015 | Sirpal et al. |
| 2015/0201147 A1 | 7/2015 | Sirpal et al. |
| 2016/0189390 A1 | 6/2016 | Hayashi |
| 2017/0099521 A1 | 4/2017 | Sirpal et al. |
| 2017/0366842 A1 | 12/2017 | Shoykher |

FOREIGN PATENT DOCUMENTS

| | | |
|---|---|---|
| CN | 201937743 | 8/2011 |
| EP | 2328346 | 6/2011 |
| EP | 2348724 | 7/2011 |
| EP | 2439935 | 4/2012 |
| EP | 2487922 | 8/2012 |
| WO | WO 99/21308 | 4/1999 |
| WO | WO 00/05884 | 2/2000 |
| WO | WO 2007/137611 | 12/2007 |
| WO | WO 2011/148054 | 12/2011 |
| WO | WO 2012/030024 | 3/2012 |
| WO | WO 2014/026640 | 2/2014 |
| WO | WO 2014/028074 | 2/2014 |

OTHER PUBLICATIONS

U.S. Appl. No. 14/841,199, filed Aug. 31, 2015, Sirpal et al.
International Search Report and Written Opinion for International (PCT) Patent Application No. PCT/US2013/055294, dated Dec. 2, 2013 10 pages.
International Preliminary Report on Patentability for International (PCT) Patent Application No. PCT/US2013/055294, dated Feb. 26, 2015 10 pages.
International Search Report and Written Opinion for International (PCT) Patent Application No. PCT/US2013/055296, dated Nov. 29, 2013 9 pages.
International Search Report and Written Opinion for International (PCT) Patent Application No. PCT/US13/55493, dated Nov. 7, 2013 9 pages.
International Preliminary Report on Patentability for International (PCT) Patent Application No. PCT/US13/55493, dated Feb. 26, 2015 8 pages.
International Search Report and Written Opinion for International (PCT) Patent Application No. PCT/US13/55509, dated Nov. 8, 2013 9 pages.
International Preliminary Report on Patentability for International (PCT) Patent Application No. PCT/US13/55509, dated Feb. 26, 2015 8 pages.
International Search Report and Written Opinion for International (PCT) Patent Application No. PCT/US2013/055303, dated Dec. 5, 2013 8 pages.
International Preliminary Report on Patentability for International (PCT) Patent Application No. PCT/US2013/055303, dated Feb. 26, 2015 7 pages.
International Search Report and Written Opinion for International (PCT) Patent Application No. PCT/US2013/055280, dated Jan. 10, 2014 10 pages.
Official Action for U.S. Appl. No. 13/968,948 dated May 6, 2014 11 pages.
Official Action for U.S. Appl. No. 13/968,948, dated Nov. 24, 2014 13 pages.
Official Action for U.S. Appl. No. 13/968,948, dated Mar. 11, 2015 13 pages.
Official Action for U.S. Appl. No. 13/968,929, dated Apr. 29, 2015 12 pages.
Official Action for U.S. Appl. No. 13/969,588, dated Nov. 10, 2014 11 pages.
Official Action for U.S. Appl. No. 13/969,588, dated Mar. 11, 2015 12 pages.
Official Action for U.S. Appl. No. 13/970,374, dated Jun. 6, 2014 7 pages.
Official Action for U.S. Appl. No. 13/970,374, dated Dec. 9, 2014 9 pages.
Official Action for U.S. Appl. No. 13/968,897, dated Aug. 15, 2014 15 pages.
Official Action for U.S. Appl. No. 13/968,897, dated Jan. 28, 2015 18 pages.
Official Action for U.S. Appl. No. 13/968,897, dated May 8, 2015 21 pages.
Sohail, "Smart TV—A Late Bloomer," Harwarezonw.com, Apr. 1, 2011, 2 pages.
International Preliminary Report on Patentability for International (PCT) Patent Application No. PCT/US2013/055296, dated Feb. 26, 2015 8 pages.
International Preliminary Report on Patentability for International (PCT) Patent Application No. PCT/US2013/055280, dated Jun. 11, 2015 9 pages.
Official Action for U.S. Appl. No. 13/968,948, dated Jul. 17, 2015 13 pages.
Official Action for U.S. Appl. No. 13/969,588, dated Aug. 17, 2015 13 pages.
Official Action for U.S. Appl. No. 13/970,374, dated May 22, 2015 11 pages.
Notice of Allowance for U.S. Appl. No. 13/968,948, dated Mar. 28, 2016 7 pages.
Official Action for U.S. Appl. No. 14/834,316, dated Jan. 14, 2016 11 pages.
Official Action for U.S. Appl. No. 13/968,665, dated Oct. 9, 2014 12 pages.
Official Action for U.S. Appl. No. 13/968,665, dated May 7, 2015 11 pages.
Notice of Allowance for U.S. Appl. No. 13/968,665, dated Sep. 4, 2015 8 pages.
Official Action for U.S. Appl. No. 14/841,199, dated Oct. 6, 2016 10 pages.
Official Action for U.S. Appl. No. 14/841,199, dated Feb. 1, 2017 12 pages.
Notice of Allowance for U.S. Appl. No. 14/841,199, dated Apr. 17, 2017 8 pages.
Official Action for U.S. Appl. No. 13/969,588, dated Jan. 21, 2016 14 pages.
Official Action for U.S. Appl. No. 15/358,788, dated Feb. 28, 2017 10 pages.
Notice of Allowance for U.S. Appl. No. 14/834,316, dated Jul. 20, 2016 7 pages.
International Search Report and Written Opinion for International (PCT) Patent Application No. PCT/US2013/055293, dated Dec. 2, 2013 12 pages.
International Preliminary Report for International (PCT) Patent Application No. PCT/US2013/055293, dated Feb. 26, 2015 12 pages.
International Search Report and Written Opinion for Intenational (PCT) Patent Application No. PCT/CN2013/081639, dated Nov. 28, 2013 10 pages.
International Preliminary Report on Patentability for International (PCT) Patent Application No. PCT/CN2013/081639, dated Feb. 26, 2015 6 pages.
International Search Report and Written Opinion for International (PCT) Patent Application No. PCT/US2013/055298, dated Nov. 29, 2013 8 pages.
International Preliminary Report for International (PCT) Patent Application No. PCT/US2013/055298, dated Feb. 26, 2015 7 pages.
Official Action for U.S. Appl. No. 13/968,983, dated Jul. 7, 2014 15 pages.

(56) References Cited

OTHER PUBLICATIONS

Final Action for U.S. Appl. No. 13/968,983, dated Nov. 26, 2014 17 pages.
Official Action for U.S. Appl. No. 13/968,983, dated Mar. 12, 2015 21 pages.
Notice of Allowance for U.S. Appl. No. 13/968,983, dated Oct. 8, 2015 23 pages.
Official Action for U.S. Appl. No. 14/418,972, dated Jun. 16, 2016 15 pages.
Official Action for U.S. Appl. No. 13/968,937, dated Dec. 18, 2014 9 pages.
Official Action for U.S. Appl. No. 13/968,937, dated Apr. 7, 2015 10 pages.
Official Action for U.S. Appl. No. 13/968,937, dated Jul 17, 2015 9 pages.
Final Action for U.S. Appl. No. 13/968,937, dated Feb. 4, 2016 11 pages.
Notice of Allowance for U.S. Appl. No. 15/358,788, dated Oct. 20, 2017 9 pages.
U.S. Appl. No. 13/968,983, filed Aug. 16, 2013 now U.S. Pat. No. 9,271,039.
U.S. Appl. No. 14/418,972, filed Feb. 2, 2015.
U.S. Appl. No. 13/968,937, filed Aug. 16, 2013.
U.S. Appl. No. 15/693,801, filed Sep. 1, 2017.
International Search Report and Written Opinion for International (PCT) Patent Application No. PCT/US2013/036828, dated Jun. 28, 2013 12 pages.
International Preliminary Report on Patentability for International (PCT) Patent Application No. PCT/US2013/036828, dated Feb. 26, 2015 12 pages.
International Search Report and Written Opinion for International (PCT) Patent Application No. PCT/US2013/055349, dated Nov. 29, 2013 7 pages.
International Preliminary Report for International (PCT) Patent Application No. PCT/US2013/055349, dated Apr. 2, 2015 7 pages.
Official Action for U.S. Appl. No. 13/864,120 dated Jun. 13, 2014 10 pages.
Official Action for U.S. Appl. No. 13/864,120, dated Dec. 24, 2014 13 pages.
Notice of Allowance for U.S. Appl. No. 13/864,120, dated Apr. 14, 2015 9 pages.
Official Action for U.S. Appl. No. 13/968,969, dated May 6, 2014 12 pages.
Official Action for U.S. Appl. No. 13/968,969, dated Aug. 19, 2014 14 pages.
Notice of Allowance for U.S. Appl. No. 13/968,969, dated Jan. 6, 2015 6 pages.
Official Action for U.S. Appl. No. 15/693,801, dated Feb. 5, 2018 11 pages.
Tvonicsuk "Tvonics: How to use the EPG search function." 1 pages retrieved from the internet on Nov. 11, 2013 from [www.youtube.com/watch?v=H8euZ0lydo].
Official Action for U.S. Appl. No. 13/968,884, dated Jun. 25, 2014 23 pages.
Notice of Allowance for U.S. Appl. No. 13/968,884, dated Jan. 5, 2015 20 pages.
Corrected Notice of Allowance for U.S. Appl. No. 13/968,884, dated Apr. 1, 2015 15 pages.
Official Action for U.S. Appl. No. 13/968,876 dated Jun. 16, 2014 10 pages.
Official Action for U.S. Appl. No. 13/968,876, dated Dec. 26, 2014 13 pages.
Official Action for U.S. Appl. No. 13/968,867, dated Jan. 27, 2015 17 pages.
Official Action for U.S. Appl. No. 13/968,913, dated Apr. 1, 2015 16 pages.
Official Action for U.S. Appl. No. 13/968,903, dated Jul. 18, 2014 14 pages.
Official Action for U.S. Appl. No. 13/968,903, dated Jan. 5, 2015 13 pages.
Official Action for U.S. Appl. No. 14/407,598, dated Oct. 8, 2015 18 pages.
Final Action for U.S. Appl. No. 14/407,598, dated May 4, 2016 27 pages.
Official Action for U.S. Appl. No. 13/968,876, dated Jun. 10, 2015 14 pages.
Final Action for U.S. Appl. No. 13/968,876, dated Jan. 25, 2016 17 pages.
Notice of Allowance for U.S. Appl. No. 13/968,867, dated Aug. 26, 2015 21 pages.
Official Action for U.S. Appl. No. 14/407,593, dated Jan. 25, 2016 10 pages.
Official Action for U.S. Appl. No. 13/968,903, dated Jun. 26, 2015 13 pages.
Official Action for U.S. Appl. No. 13/968,903, dated Feb. 26, 2016 15 pages.
U.S. Appl. No. 13/968,948, filed Aug. 16, 2013.
U.S. Appl. No. 13/968,929, filed Aug. 16, 2013.
U.S. Appl. No. 14/841,199, filed Aug. 31, 2015.
U.S. Appl. No. 13/969,588, filed Aug. 18, 2013.
U.S. Appl. No. 13/970,374, filed Aug. 19, 2013.
U.S. Appl. No. 14/834,316, filed Aug. 24, 2015.
U.S. Appl. No. 13/968,665, filed Aug. 16, 2013.
U.S. Appl. No. 13/968,897, filed Aug. 16, 2013.
U.S. Appl. No. 13/864,120, filed Apr. 16, 2013, now U.S. Pat. No. 9,118,864.
U.S. Appl. No. 13/968,969, filed Aug. 16, 2013, now U.S. Pat. No. 9,005,255.

\* cited by examiner

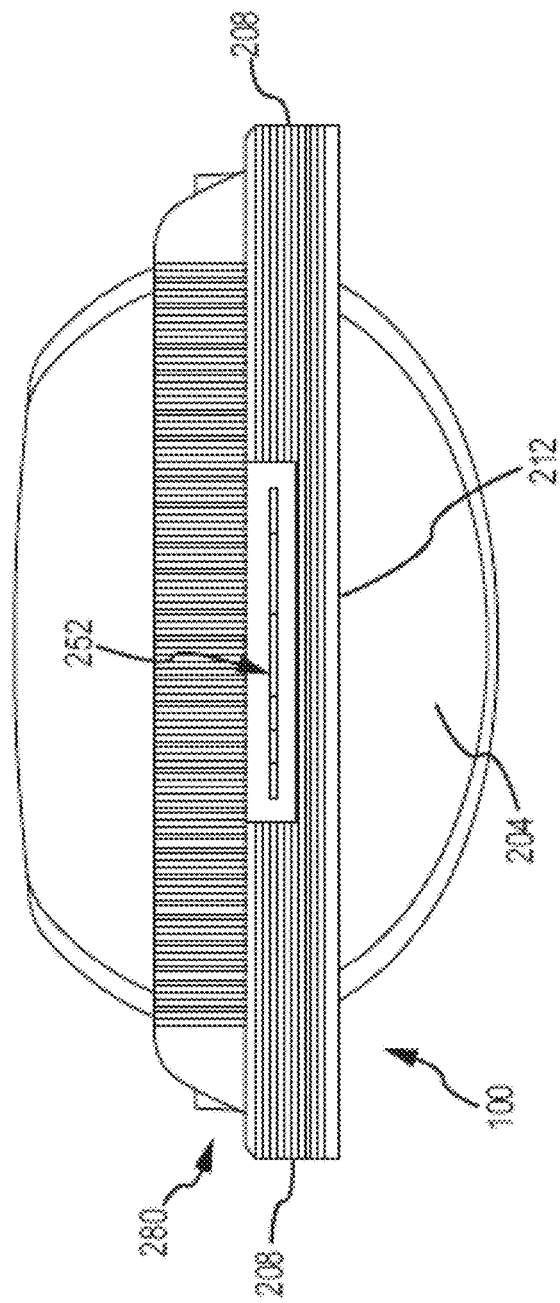

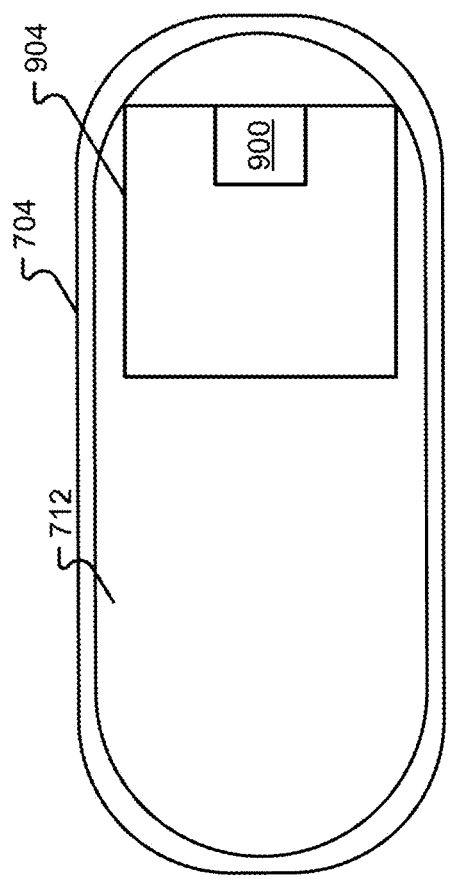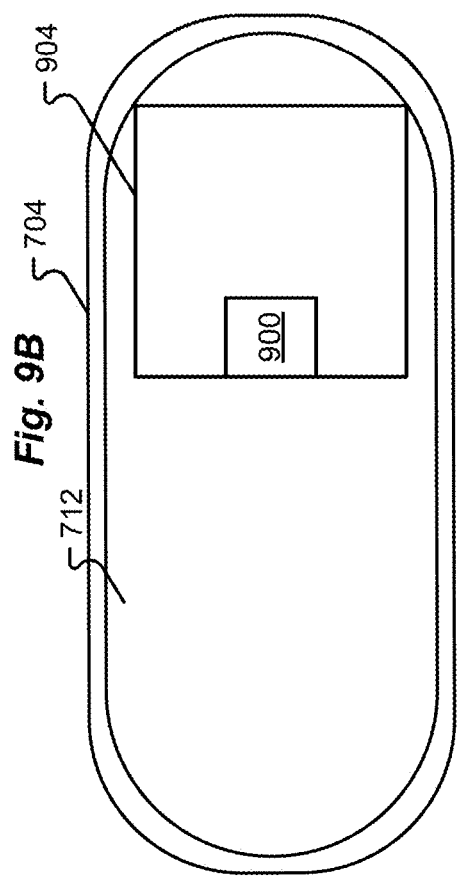

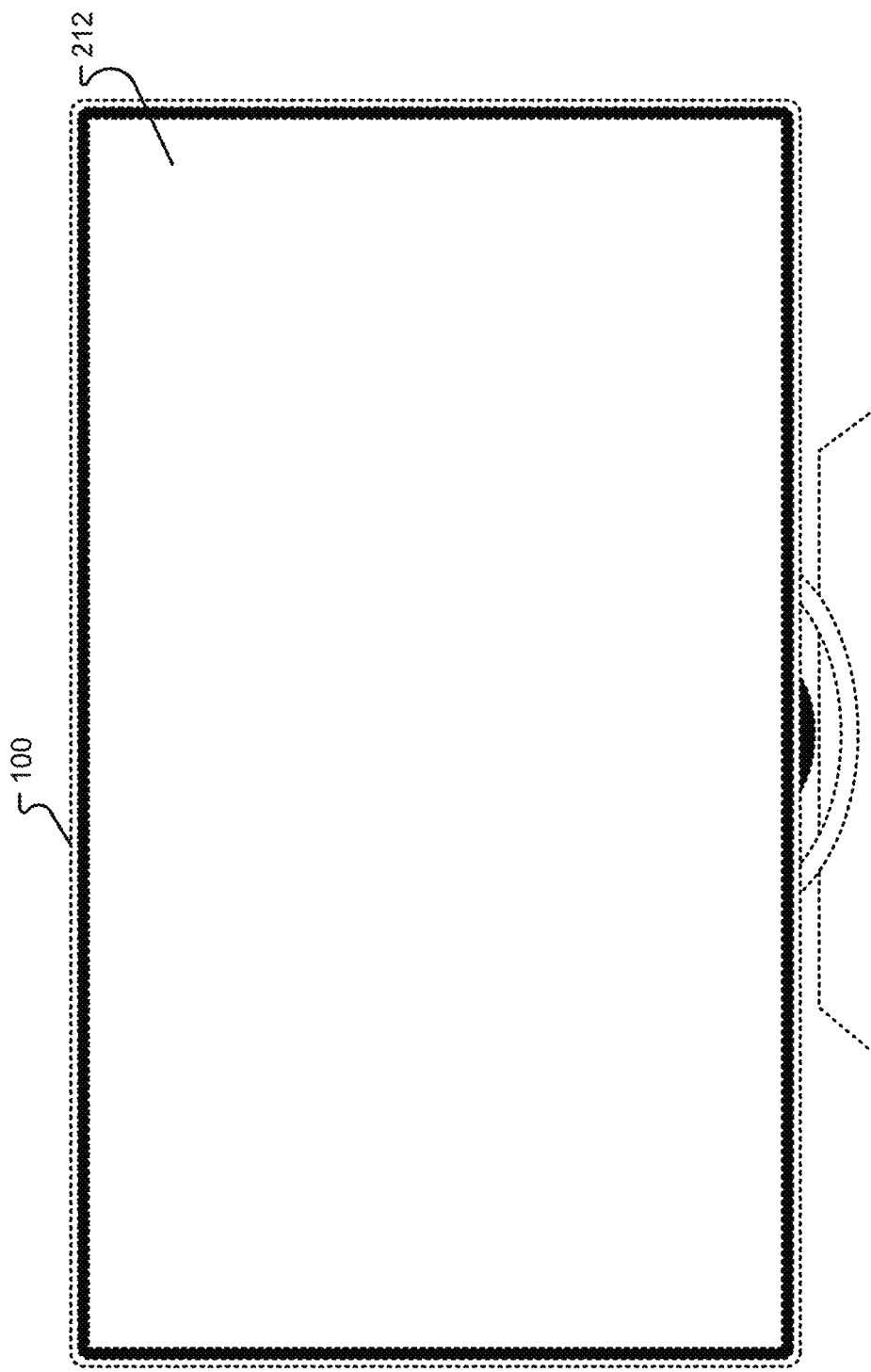

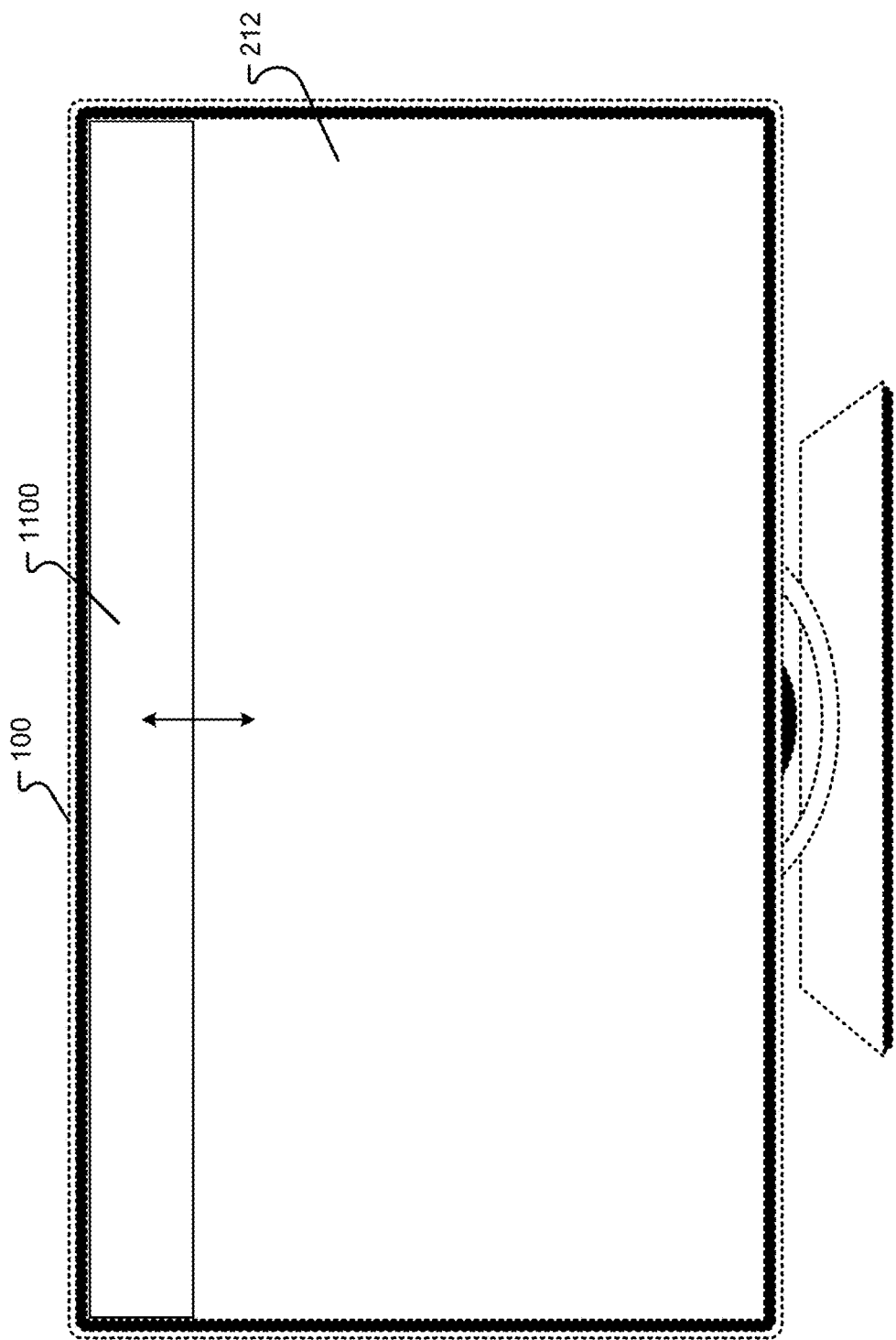

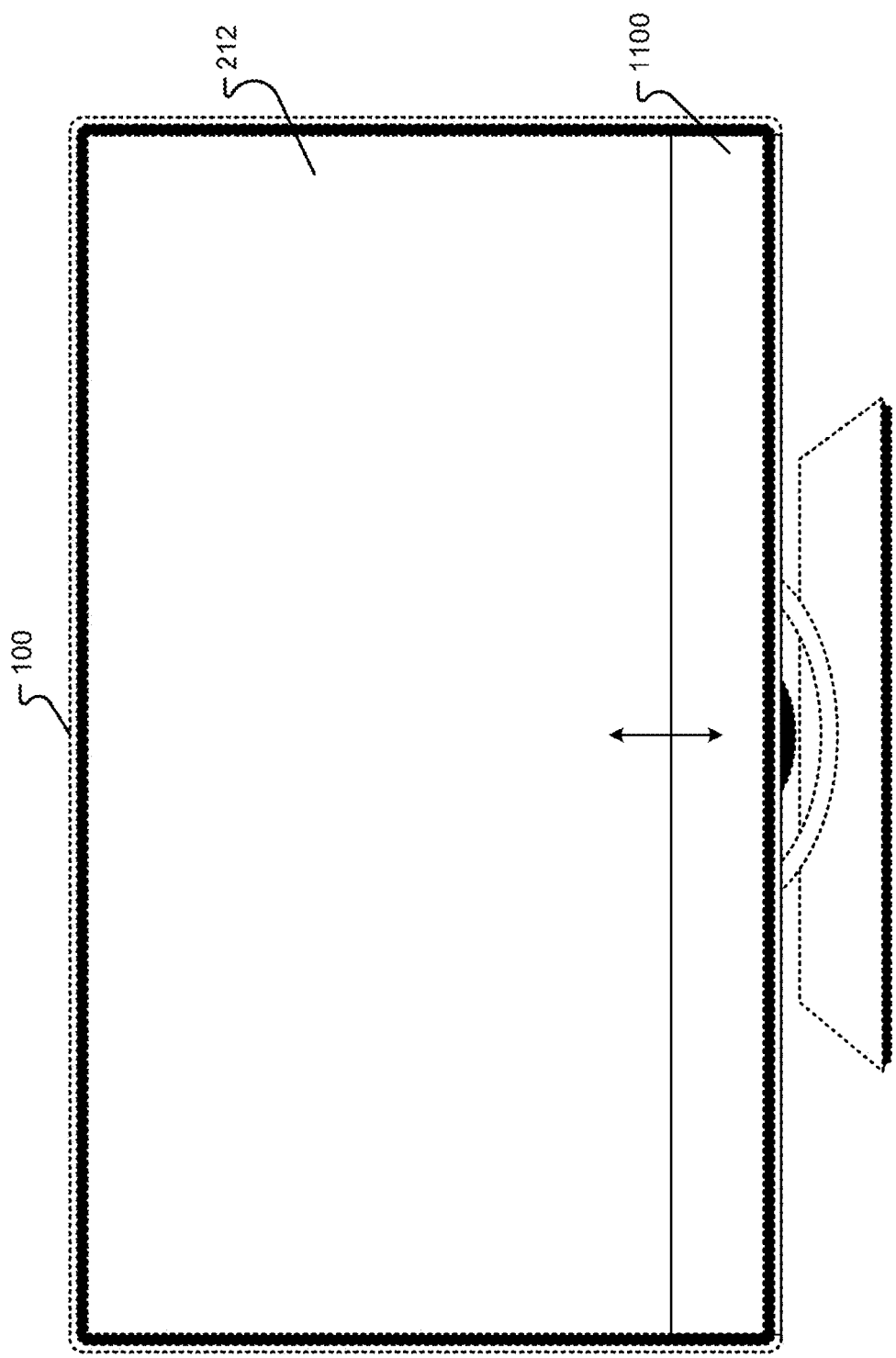

MEDIA CENTER PANELS FOR AN INTELLIGENT TELEVISION

CROSS REFERENCE TO RELATED APPLICATION

The present application is a continuation of and claims priority to U.S. patent application Ser. No. 13/968,897 filed Aug. 16, 2013 entitled "Media Center Panels for an Intelligent Television"; Ser. No. 13/968,903 filed Aug. 16, 2013 entitled "Media Data Service for an Intelligent Television"; Ser. No. 13/968,876 filed Aug. 16, 2013 entitled "On Screen Header Bar for Providing Program Information"; Ser. No. 13/968,867 filed Aug. 16, 2013 entitled "Method and System for Locating Programming on a Television"; and Ser. No. 13/968,913 filed Aug. 16, 2013 entitled "Method and System for Managing Programming on a Television," each of which claims the benefits of and priority, under 35 U.S.C. § 119(e), to U.S. Provisional Application Ser. No. 61/684,672 filed Aug. 17, 2012, "Smart TV"; 61/702,650 filed Sep. 18, 2012, "Smart TV"; 61/697,710 filed Sep. 6, 2012, "Social TV"; 61/700,182 filed Sep. 12, 2012, "Social TV Roadmap"; 61/736,692 filed Dec. 13, 2012, "SmartTV"; 61/798,821 filed Mar. 15, 2013, "SmartTV"; 61/804,942 filed Mar. 25, 2013, "SmartTV"; 61/804,998 filed Mar. 25, 2013, "SmartTV"; 61/804,971 filed Mar. 25, 2013, "SmartTV"; 61/804,990 filed Mar. 25, 2013, "SmartTV"; 61/805,003 filed Mar. 25, 2013, "SmartTV"; 61/805,053 filed Mar. 25, 2013, "SmartTV"; 61/805,030 filed Mar. 25, 2013, "SmartTV"; 61/805,027 filed Mar. 25, 2013, "SmartTV"; 61/805,042 filed Mar. 25, 2013, "SmartTV"; and 61/805,038 filed Mar. 25, 2013, "SmartTV." The present application is also a continuation of and claims priority to U.S. patent application Ser. No. 14/407,598 filed Dec. 12, 2014 entitled "Intelligent Television," which is a national stage application under 35 U.S.C. 371 of PCT Application No. PCT/US2013/036844, having an international filing date of Apr. 16, 2013, and U.S. patent application Ser. No. 14/407,593, filed Dec. 12, 2014 entitled "Media Center," which is a national stage application under 35 U.S.C. 371 of PCT Application No. PCT/US2013/036782, having an international filing date of Apr. 16, 2013, with the aforementioned PCT applications claiming the benefits of and priority, under 35 U.S.C. § 119(e), to U.S. Provisional Application Ser. No. 61/684,672 filed Aug. 17, 2012, "Smart TV"; 61/702,650 filed Sep. 18, 2012, "Smart TV"; 61/697,710 filed Sep. 6, 2012, "Social TV"; 61/700,182 filed Sep. 12, 2012, "Social TV Roadmap"; 61/736,692 filed Dec. 13, 2012, "SmartTV"; 61/798,821 filed Mar. 15, 2013, "SmartTV"; 61/804,942 filed Mar. 25, 2013, "SmartTV"; 61/804,998 filed Mar. 25, 2013, "SmartTV"; 61/804,971 filed Mar. 25, 2013, "SmartTV"; 61/804,990 filed Mar. 25, 2013, "SmartTV"; 61/805,003 filed Mar. 25, 2013, "SmartTV"; 61/805,053 filed Mar. 25, 2013, "SmartTV"; 61/805,030 filed Mar. 25, 2013, "SmartTV"; 61/805,027 filed Mar. 25, 2013, "SmartTV"; 61/805,042 filed Mar. 25, 2013, "SmartTV"; and 61/805,038 filed Mar. 25, 2013, "SmartTV." Each of the aforementioned documents is incorporated herein by reference in their entirety for all that they teach and for all purposes.

BACKGROUND

Consolidation of device features or technological convergence is in an increasing trend. Technological convergence describes the tendency for different technological systems to evolve toward performing similar tasks. As people use more devices, the need to carry those devices, charge those devices, update software on those devices, etc. becomes more cumbersome. To compensate for these problems, technology companies have been integrating features from different devices into one or two multi-functional devices. For example, cellular phones are now capable of accessing the Internet, taking photographs, providing calendar functions, etc.

The consolidation trend is now affecting the design and functionality of devices generally used in the home. For example, audio receivers can access the Internet, digital video recorders can store or provide access to digital photographs, etc. The television in home audio/video systems remains a cornerstone device because the display function cannot be integrated into other devices. As such, consolidating home devices leads to integrating features and functionality into the television. The emergence of the Smart Television (Smart TV) is evidence of the trend to consolidate functionality into the television.

A Smart TV is generally conceived as a device that integrates access to the Internet and Web 2.0 features into television sets. The Smart TV represents the trend of technological convergence between computers and television sets. The Smart TV generally focuses on online interactive media, Internet TV, on-demand streaming media, and generally does not focus on traditional broadcast media. Unfortunately, most Smart TVs have yet to provide seamless and intuitive user interfaces for navigating and/or executing the various features of the Smart TV. As such, there are still issues with the consolidation of features and the presentation of these features in Smart TVs.

SUMMARY

There is a need for an Intelligent TV with intuitive user interfaces and with seamless user interaction capability. These and other needs are addressed by the various aspects, embodiments, and/or configurations of the present disclosure. Also, while the disclosure is presented in terms of exemplary embodiments, it should be appreciated that individual aspects of the disclosure can be separately claimed.

According to the disclosure, a non-transitory computer readable storage medium having stored thereon instructions that cause a processor to execute a method of displaying a media center panel on a television display is provided, the method may include: receiving a request to activate the media center panel; determining a type of media center panel requested; retrieving, from memory, metadata based on the type of media center panel requested; and displaying on the television display the retrieved metadata in the media center panel. Exemplary media center panels may include an information panel; a favorite panel; a last viewed panel; a most viewed panel; a search panel; and a new panel. Exemplary metadata may comprise at least one of: a thumbnail; a title; a description; a rating; and a run time. The method may further include receiving a selection of a media item from one or more media items displayed in the media center panel and presenting, on a display, content associated with the selected media item. The method may yet further include receiving a request to activate a second media center panel; determining the type of media center panel requested; retrieving, from memory, metadata based on the type of the second media center panel; and displaying, on the television display, the retrieved metadata in the second media center panel. The method may further include receiving a selection of a media item from one or more media items displayed in the second media center panel; and presenting content associated with the selected media item. The media center panel may include a list of one or more related media items. The method may further include receiving a selection of a media item displayed in the list of one or more related media items and determining if the selected media item is stored on a connected storage medium or available to purchase or rent from a content provider. If the selected media item is stored on the connected storage medium, presenting content associated with the selected media item on a display. If the selected media item is available to purchase or rent, connecting to the content provider to purchase or rent the selected media item and presenting content associated with the selected media item on a display. The method may yet further include retrieving, from a data subservice, metadata based on the type of media center panel requested. The method may still further include after receiving the request to activate the media center panel: identifying a user associated with the request and retrieving metadata associated with the identified user from memory for display by the media center panel. The method may further include after receiving the request, determining whether the request is a first request to activate a media center panel from a current user interface or if the request is not the first request to activate the media center panel from the current user interface. If the request is a first request: determining the type of media center panel requested; retrieving, from memory, metadata based on the type of media center panel requested; and displaying on the television display the retrieved metadata in the media center panel. If the request is not the first request: determining the type of media center panel last displayed in the current user interface; retrieving, from memory, metadata based on the type of media center panel last displayed in the current user interface; and displaying on the television display the retrieved metadata in the media center panel.

According to the disclosure, an Intelligent TV system may include: a display; a memory; a processor in communication with the memory and the display. The processor is operable to: receive a request to activate a media center panel; determine the type of media center panel requested; retrieve, from memory, metadata based on the type of media center panel requested; and display, on the television display, the retrieved metadata in the media center panel. The metadata may comprise at least one of a thumbnail, a title, a description, a rating, and a run time. The processor may further be operable to receive a selection of a media item from one or more media items displayed in the media center panel and present content associated with the selected media item. The media center panel may include a list of one or more related media items. The processor may further be operable to receive a second request to launch a second media center panel based on a media item selected from one or more media items displayed in the media center panel; determine the type of media center panel requested; retrieve, from memory, metadata based on the type of the second media center panel; and display on the television display the retrieved metadata in the second media center panel. The processor may still further be operable to receive a selection of a media item from one or more media items displayed in the second media center panel and present content associated with the selected media item.

According to the disclosure, a method for organizing media item metadata on an Intelligent TV is provided, the method comprising: receiving a request to activate a media center panel; determining the type of media center panel requested; retrieving, from memory, metadata based on the type of media center panel requested; and displaying on the television display the retrieved metadata in the media center panel. The method may further comprise receiving a second request to launch a second media center panel based on a media item selected from one or more media items displayed in the media center panel; determining the type of media center panel requested; retrieving, from memory, metadata based on the type of the second media center panel; and displaying on the television display the retrieved metadata in the second media center panel. The media center panel may include a first list of one or more related media items; and the second media center panel may include a second list of one or more related media items. The method may further comprise receiving a selection of a media item from one or more media items displayed in the media center panel; and presenting content associated with the selected media item.

The present disclosure can provide a number of advantages depending on the particular aspect, embodiment, and/or configuration. Media center panels provide a context and content aware display of information on media items and quick access to media items such as videos, movies, television episodes, television series, photo albums, photos, connected devices, and folders. Media center panels are organized and provided in a manner to provide quick access to requested metadata and enable quick selection of a media item. The user can quickly access media items that have been recently added or which are the most important and receive information about them.

These and other advantages will be apparent from the disclosure.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "blog" (a blend of the term web log) is a type of website or part of a website supposed to be updated with new content from time to time. Blogs are usually maintained by an individual with regular entries of commentary, descriptions of events, or other material such as graphics or video. Entries are commonly displayed in reverse-chronological order.

A "blogging service" is a blog-publishing service that allows private or multi-user blogs with time-stamped entries.

The term "cable TV" refers to a system of distributing television programs to subscribers via radio frequency (RF) signals transmitted through coaxial cables or light pulses through fiber-optic cables. This contrasts with traditional broadcast television (terrestrial television) in which the television signal is transmitted over the air by radio waves and received by a television antenna attached to the television.

The term "channel" or "television channel," as used herein, can be a physical or virtual channel over which a television station or television network is distributed. A physical cannel in analog television can be an amount of bandwidth, typically 6, 7, or 8 MHz, that occupies a predetermine channel frequency. A virtual channel is a representation, in cable or satellite television, of a data stream for a particular television media provider (e.g., CDS, TNT, HBO, etc.).

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "enhanced television" (ETV) refers to a collection of specifications developed under the OpenCable project of CableLabs (Cable Television Laboratories, Inc.) that define an ETV Application consisting of resources (files) adhering to the Enhanced TV Binary Interchange Format (EBIF) content format as well as PNG images, JPEG images, and PFR downloadable fonts. An ETV application is normally delivered through an MPEG transport stream and accompanies an MPEG program containing video and audio elementary streams. An "ETV Application" is a collection of resources (files) that include one or more EBIF resources that represent viewable information in the form of pages. Two forms of a given ETV Application may be distinguished: (1) an interchange form and (2) an execution form. The interchange form of an ETV Application consists of the resources (files) that represent the compiled application prior to its actual execution by an ETV User Agent. The execution form of an ETV Application consists of the stored, and possibly mutated forms of these resources while being decoded, presented, and executed by an ETV User Agent. An "ETV User Agent" is a software component that operates on a set-top box, a television, or any other computing environment capable of receiving, decoding, presenting, and processing an ETV Application. This component usually provides, along with its host hardware environment, one or more mechanisms for an end-user to navigate and interact with the multimedia content represented by ETV Applications.

The term "high-definition television" (HDTV) provides a resolution that is substantially higher than that of standard-definition television. HDTV may be transmitted in various formats, namely 1080p—1920×1080p: 2,073,600 pixels (approximately 2.1 megapixels) per frame, 1080i (which is typically either 1920×1080i: 1,036,800 pixels (approximately 1 megapixel) per field or 2,073,600 pixels (approximately 2.1 megapixels) per frame or 1440×1080i:[1] 777,600 pixels (approximately 0.8 megapixels) per field or 1,555,200 pixels (approximately 1.6 megapixels) per frame), or 720p—1280×720p: 921,600 pixels (approximately 0.9 megapixels) per frame. As will be appreciated, "frame size" in pixels is defined as number of horizontal pixels×number of vertical pixels, for example 1280×720 or 1920×1080. Often the number of horizontal pixels is implied from context and is omitted, as in the case of 720p and 1080p, "scanning system" is identified with the letter "p" for progressive scanning or "i" for interlaced scanning, and "frame rate" is identified as number of video frames per second. For interlaced systems an alternative form of specifying number of fields per second is often used. For purposes of this disclosure, "high-definition television" is deemed to include other high-definition analog or digital video formats, including ultra high definition television.

The term "internet television" (otherwise known as Internet TV, Online Television, or Online TV) is the digital distribution of television content via the Internet. It should not be confused with Web television—short programs or videos created by a wide variety of companies and individuals, or Internet protocol television (IPTV)—an emerging internet technology standard for use by television broadcasters. Internet Television is a general term that covers the delivery of television shows and other video content over the internet by video streaming technology, typically by major traditional television broadcasters. It does not describe a technology used to deliver content (see Internet protocol television). Internet television has become very popular through services such as RTÉPlayer in Ireland; BBC iPlayer, 4oD, ITV Player (also STV Player and UTV Player) and Demand Five in the United Kingdom; Hulu in the United States; Nederland 24 in the Netherlands; ABC iview and Australia Live TV in Australia; Tivibu in Turkey; and iWanTV! in the Philippines.

The term "internet protocol television" (IPTV) refers to a system through which television services are delivered using the Internet protocol suite over a packet-switched network such as the Internet, instead of being delivered through traditional terrestrial, satellite signal, and cable television formats. IPTV services may be classified into three main groups, namely live television, with or without interactivity related to the current TV show; time-shifted television: catch-up TV (replays a TV show that was broadcast hours or days ago), start-over TV (replays the current TV show from its beginning); and video on demand (VOD): browse a catalog of videos, not related to TV programming. IPTV is distinguished from Internet television by its on-going standardization process (e.g., European Telecommunications Standards Institute) and preferential deployment scenarios in subscriber-based telecommunications networks with high-speed access channels into end-user premises via set-top boxes or other customer-premises equipment.

The term "silo," as used herein, can be a logical representation of an input, source, or application. An input can be a device or devices (e.g., DVD, VCR, etc.) electrically connected to the television through a port (e.g., HDMI, video/audio inputs, etc.) or through a network (e.g., LAN WAN, etc.). Rather than a device or devices, the input could be configured as an electrical or physical connection to one or more devices. A source, particularly a content source, can be a data service that provides content (e.g., a media center, a file system, etc.). An application can be a software service that provides a particular type of function (e.g., Live TV, Video on Demand, User Applications, photograph display, etc.). The silo, as a logical representation, can have an associated definition or property, such as a setting, feature, or other characteristic.

The term "panel," as used herein, can mean a user interface displayed in at least a portion of the display. The panel may be interactive (e.g., accepts user input) or informational (e.g., does not accept user input). A panel may be translucent whereby the panel obscures but does not mask the underlying content being displayed in the display. Panels may be provided in response to a user input from a button or remote control interface.

The term "screen," as used herein, refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. For example, another screen may be included with a remote control unit that interfaces with the Intelligent TV.

The term "media" of "multimedia," as used herein, refers to content that may assume one of a combination of different content forms. Multimedia can include one or more of, but is not limited to, text, audio, still images, animation, video, or interactivity content forms.

The term "Intelligent TV," as used herein, refers to a television configured to provide one or more intuitive user interfaces and interactions based on a unique application platform and architecture. The Intelligent TV utilizes processing resources associated with the television to integrate Internet connectivity with parallel application functionality. This integration allows a user the ability to intuitively access various sources of media and content (e.g., Internet, over-the-top content, on-demand streaming media, over-the-air broadcast media, and/or other forms of information) via the Intelligent TV in a quick and efficient manner. Although the Intelligent TV disclosed herein may comprise one or more components of a "smart TV," it is an aspect of the Intelligent TV to provide expanded intuitive user interaction capability for navigating and executing the various features of the television. A "smart TV," sometimes referred to as a connected TV, or hybrid TV (not to be confused with IPTV, Internet TV, or with Web TV), describes a trend of integration of the Internet and Web 2.0 features into television sets and set-top boxes, as well as the technological convergence between computers and these television sets/set-top boxes. The smart TV devices have a higher focus on online interactive media, Internet TV, over-the-top content, as well as on-demand streaming media, and less focus on traditional broadcast media than traditional television sets and set-top boxes. As can be appreciated, the Intelligent TV encompasses a broader range of technology than that of the smart TV defined above.

The term "television" is a telecommunication medium, device (or set) or set of associated devices, programming, and/or transmission for transmitting and receiving moving images that can be monochrome (black-and-white) or colored, with or without accompanying sound. Different countries use one of the three main video standards for TVs, namely PAL, NTSC or SECAM. Television is most commonly used for displaying broadcast television signals. The broadcast television system is typically disseminated via radio transmissions on designated channels in the 54-890 MHz frequency band. A common television set comprises multiple internal electronic circuits, including those for receiving and decoding broadcast signals. A visual display device which lacks a tuner is properly called a video monitor, rather than a television. A television may be different from other monitors or displays based on the distance maintained between the user and the television when the user watches the media and based on the inclusion of a tuner or other electronic circuit to receive the broadcast television signal.

The term "Live TV," as used herein, refers to a television production broadcast in real-time, as events happen, in the present.

The term "standard-definition television" (SDTV) is a television system that uses a resolution that is not considered to be either high-definition television (HDTV 720p and 1080p) or enhanced-definition television (EDTV 480p). The two common SDTV signal types are 576i, with 576 interlaced lines of resolution, derived from the European-developed PAL and SECAM systems; and 480i based on the American National Television System Committee NTSC system. In the US, digital SDTV is broadcast in the same 4:3 aspect ratio as NTSC signals. However, in other parts of the world that used the PAL or SECAM analog standards, standard-definition television is now usually shown with a 16:9 aspect ratio. Standards that support digital SDTV broadcast include DVB, ATSC and ISDB. Television signals are transmitted in digital form, and their pixels have a rectangular shape, as opposed to square pixels that are used in modern computer monitors and modern implementations of HDTV. The table below summarizes pixel aspect ratios for various kinds of SDTV video signal. Note that the actual image (be it 4:3 or 16:9) is always contained in the center 704 horizontal pixels of the digital frame, regardless of how many horizontal pixels (704 or 720) are used. In case of digital video signal having 720 horizontal pixels, only the center 704 pixels contain actual 4:3 or 16:9 image, and the 8 pixel wide stripes from either side are called nominal analogue blanking and should be discarded before displaying the image. Nominal analogue blanking should not be confused with overscan, as overscan areas are part of the actual 4:3 or 16:9 image.

The term "video on demand (VOD)," as used herein, refers to systems and processes which allow users to select and watch/listen to video or audio content on demand. VOD systems may stream content, to view the content in real time, or download the content to a storage medium for viewing at a later time.

The term "satellite positioning system receiver" refers to a wireless receiver or transceiver to receive and/or send location signals from and/or to a satellite positioning system, such as the Global Positioning System (GPS) (US), GLONASS (Russia), Galileo positioning system (EU), Compass navigation system (China), and Regional Navigational Satellite System (India).

The term "display," as used herein, refers to at least a portion of a screen used to display the output of the television to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

The term "displayed image," as used herein, refers to an image produced on the display. A typical displayed image is a television broadcast or menu. The displayed image may occupy all or a portion of the display.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical.

The term "module," as used herein, refers to any known or later developed hardware, software, firmware, artificial intelligence, fuzzy logic, or combination of hardware and software that is capable of performing the functionality associated with that element.

The terms "determine," "calculate" and "compute," and variations thereof, as used herein, are used interchangeably and include any type of methodology, process, mathematical operation or technique.

The term "touch screen" or "touchscreen" refer to screen that can receive user contact or other tactile input, such as a stylus. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "web television" is original television content produced for broadcast via the World Wide Web. Some major distributors of web television are YouTube, MySpace, Newgrounds, Blip.tv, and Crackle.

The terms "instant message" and "instant messaging" refer to a form of real-time text communication between two or more people, typically based on typed text.

The term "internet search engine" refers to a web search engine designed to search for information on the World Wide Web and FTP servers. The search results are generally presented in a list of results often referred to as SERPS, or "search engine results pages". The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The terms "online community," "e-community," or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chatrooms and forums that use voice, video text or avatars.

The term "remote control" refers to a component of an electronics device, most commonly a television set, DVD player and/or home theater system for operating the device wirelessly, typically from a short line-of-sight distance. Remote control normally uses infrared and/or radio frequency (RF) signaling and can include WiFi, wireless USB, Bluetooth™ connectivity, motion sensor enabled capabilities and/or voice control. A touchscreen remote control is a handheld remote control device which uses a touchscreen user interface to replace most of the hard, built-in physical buttons used in normal remote control devices.

The term "satellite TV" refers to television programming delivered by the means of communications satellites and received by an outdoor antenna, usually a parabolic reflector generally referred to as a satellite dish, and as far as household usage is concerned, a satellite receiver either in the form of an external set-top box or a satellite tuner module built into a TV set.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can occur in one or more areas of the screen. A gesture region can be on the display, where it may be referred to as a touch sensitive display or off the display where it may be referred to as a gesture capture area.

The term "electronic address" refers to any contactable address, including a telephone number, instant message handle, e-mail address, Universal Resource Locator (URL), Universal Resource Identifier (URI), Address of Record (AOR), electronic alias in a database, like addresses, and combinations thereof.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 2D includes a fourth view of an embodiment of an intelligent television;

FIG. 9B is a bottom view of an embodiment of a remote control with the joystick in a lower position;

FIG. 9C is a bottom view of an embodiment of a remote control with the joystick in an upper position;

FIG. 11A is a front view of an embodiment of an Intelligent TV screen;

FIG. 11B is a front view of an embodiment of an Intelligent TV screen;

FIG. 11C is a front view of an embodiment of an Intelligent TV screen;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a network-enabled telecommunications device, such as a television, an electronic visual display device, or other smart device. The device can include one or more screens, or sections of a screen, that are configured to receive and present information from a number of sources. Further, the device can receive user input in unique ways. The overall design and functionality of the device provides for an enhanced user experience making the device more useful and more efficient.

Figure 1A:
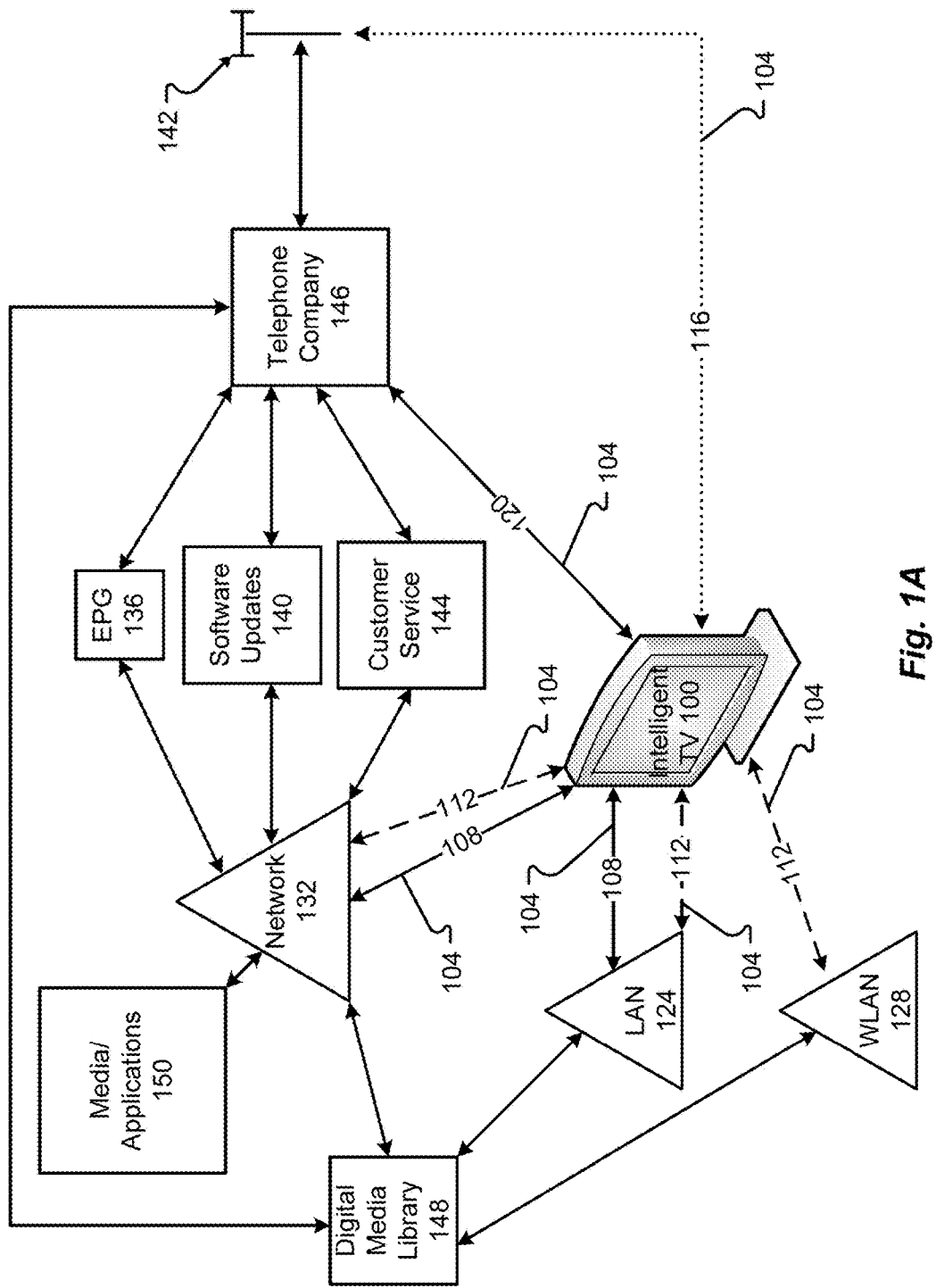
FIG. 1A includes a first view of an embodiment of an environment of an intelligent television.
Figure 1B:
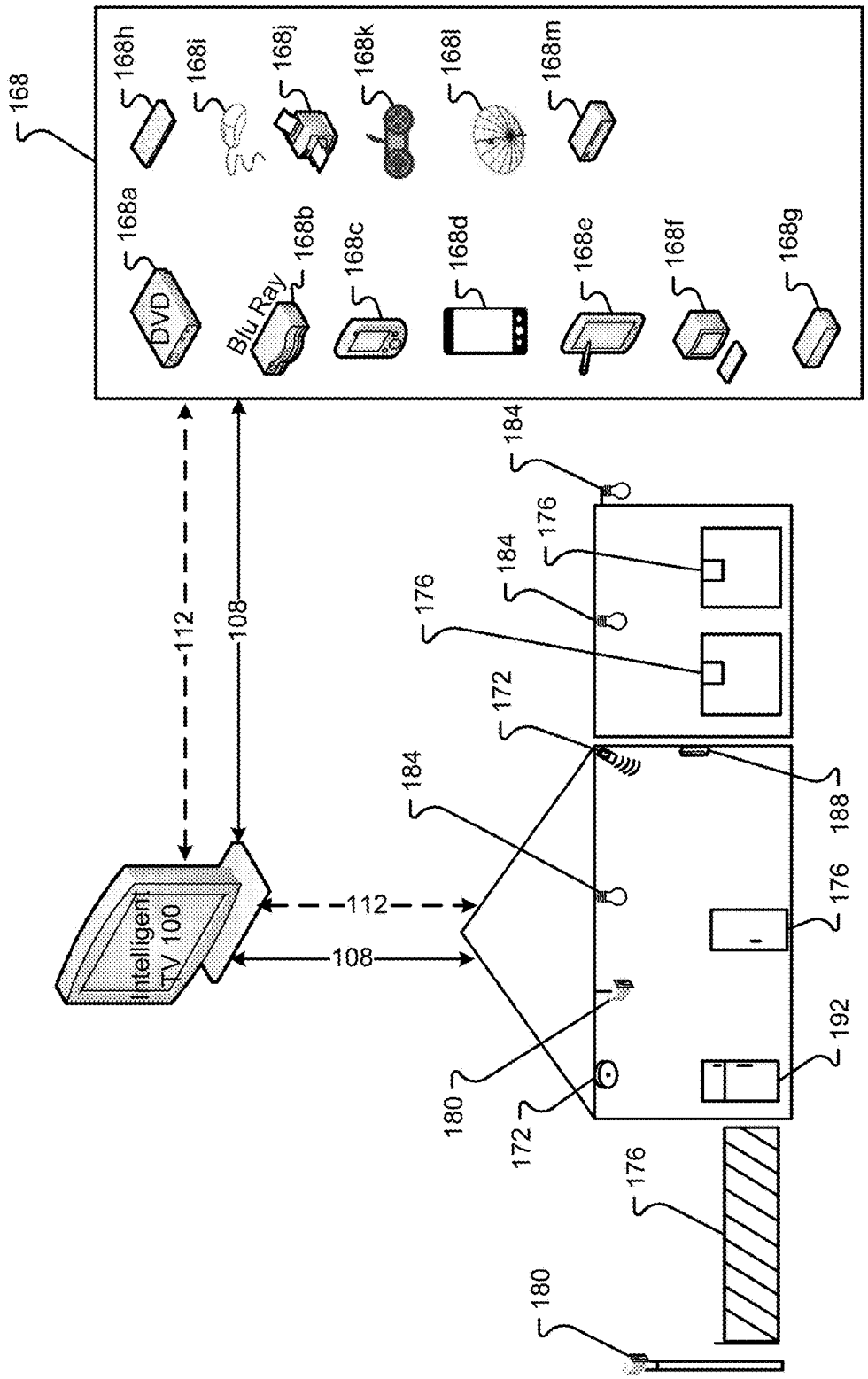
FIG. 1B includes a second view of an embodiment of an environment of an intelligent television.

Intelligent Television (TV) Environment:

Referring to FIGS. 1A and 1B, an Intelligent TV, or device, 100 is shown. It is anticipated that the Intelligent TV 100 may be used for entertainment, business applications, social interaction, content creation and/or consumption, and to organize and control one or more other devices that are in communication with the Intelligent TV 100. As can be appreciated, the Intelligent TV 100 can be used to enhance the user interactive experience whether at home or at work.

In some embodiments, the Intelligent TV 100 may be configured to receive and understand a variety of user and/or device inputs. For example, a user may interface with the Intelligent TV 100 via one or more physical or electrical controls, such as buttons, switches, touch sensitive screens/regions (e.g., capacitive touch, resistive touch, etc.), and/or other controls associated with the Intelligent TV 100. In some cases, the Intelligent TV 100 may include the one or more interactive controls. Additionally or alternatively, the one or more controls may be associated with a remote control. The remote control may communicate with the Intelligent TV 100 via wired and/or wireless signals. As can be appreciated, the remote control may operate via radio frequency (RF), infrared (IR), and/or a specific wireless communications protocol (e.g., Bluetooth™, Wi-Fi, etc.). In some cases, the controls, whether physical or electrical, may be configured (e.g., programmed) to suit a user's preferences.

Additionally or alternatively, smart phones, tablets, computers, laptops, netbooks, and other smart devices may be used to control the Intelligent TV 100. For example, control of the Intelligent TV 100 may be achieved via an application running on a smart device. The application may be configured to present a user with various Intelligent TV 100 controls in an intuitive user interface (UI) on a screen associated with the device 100. The screen may be a touch sensitive, or touch screen, display. Selections input by a user via the UI may be configured to control the Intelligent TV 100 by the application accessing one or more communication features associated with the smart device.

It is anticipated that the Intelligent TV 100 can receive input via various input devices including, but in no way limited to, video, audio, radio, light, tactile, and combinations thereof. Among other things, these input devices may be configured to allow the Intelligent TV 100 to see, recognize, and react to user gestures. For instance, a user may talk to the Intelligent TV 100 in a conversational manner. The Intelligent TV 100 may hear and understand voice commands in a manner similar to a smart device's intelligent personal assistant and voice-controlled navigator application (e.g., Apple's Siri, Android's Skyvi, Robin, Iris, and other applications).

The Intelligent TV 100 may also be a communications device which can establish network connections 104 through many alternate means, including wired 108 or wireless 112 means, over cellular networks 116 to connect via cellular base antenna 142 to telephone networks operated by telephone company 146, and by using a telephone line 120 to connect to telephone networks operated by telephone company 146. These connections 104 enable the Intelligent TV 100 to access one or more communication networks 132. The communication networks may comprise any type of known communication medium or collection of communication media and may use any type of protocols to transport messages or signals between endpoints. The communication networks may include wired and/or wireless communication technologies. The Internet is an example of a communication network 132 that constitutes an Internet Protocol (IP) network consisting of many computers, computing networks, and other communication devices located all over the world, which are connected through many telephone systems and other means.

Other examples of the communication network 132 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 132 need not be limited to any one network type, and instead may be comprised of a number of different networks and/or network types.

In some embodiments, the Intelligent TV 100 may be equipped with multiple communication means. The multiple communication means may allow the Intelligent TV 100 to communicate across Local Area Networks (LANs) 124, wireless local area networks (WLANs) 128, and other networks 132. The networks 132 may be connected in a redundant manner to ensure network access. In other words, if one connection is interrupted, the intelligent TV 100 can use an alternate communications path to reestablish and/or maintain the network connection 104. Among other things, the Intelligent TV 100 may use these network connections 104 to send and receive information, interact with an electronic program guide (EPG) 136, receive software updates 140, contact customer service 144 (e.g., to receive help or service, etc.), and/or access remotely stored digital media libraries 148. In addition, these connections can allow the Intelligent TV 100 to make phone calls, send and/or receive email messages, send and/or receive text messages (such as email and instant messages), surf the Internet using an internet search engine, post blogs by a blogging service, and connect/interact with social media sites and/or an online community (e.g., Facebook™, Twitter™, LinkedIn™, Pinterest™, Google+™, MySpace™, and the like) maintained by a social network service. In combination with other components of the Intelligent TV 100 described in more detail below, these network connections 104 also enable the Intelligent TV 100 to conduct video teleconferences, electronic meetings, and other communications. The Intelligent TV 100 may capture and store images and sound, using associated cameras, microphones, and other sensors. Additionally or alternatively, the Intelligent TV 100 may create and save screen shots of media, images, and data displayed on a screen associated with the intelligent TV 100.

Further, as shown in FIG. 1B, the Intelligent TV 100 can interact with other electronic devices 168 by either by the wired 108 and/or wireless 112 connections. As described herein, components of the Intelligent TV 100 allow the device 100 to be connected to devices 168 including, but not limited to, DVD players 168*a*, BluRay players 168*b*, portable digital media devices 168*c*, smart phones 168*d*, tablet devices 168*e*, personal computers 168*f*, external cable boxes 168*g*, keyboards 168*h*, pointing devices 168*i*, printers 168*j*, game controllers and/or game pads 168*k*, satellite dishes 168*l*, external display devices 168*m*, and other universal serial bus (USB), local area network (LAN), Bluetooth™, or high-definition multimedia interface (HDMI) compliant devices, and/or wireless devices. When connected to an external cable box 168g or satellite dish 168l, the Intelligent TV 100 can access additional media content. Also, as further described below, the Intelligent TV 100 is capable of receiving digital and/or analog signals broadcast by TV stations. The Intelligent TV 100 can be configured as one or more of a standard-definition television, enhanced television, and high-definition television. It may operate as one or more of cable, Internet, Internet Protocol, satellite, web, and/or smart television. The Intelligent TV 100 may also be used to control the operation of, and may interface with, other smart components such as security systems 172, door/gate controllers 176, remote video cameras 180, lighting systems 184, thermostats 188, refrigerators 192, and other appliances.

Figure 2A:
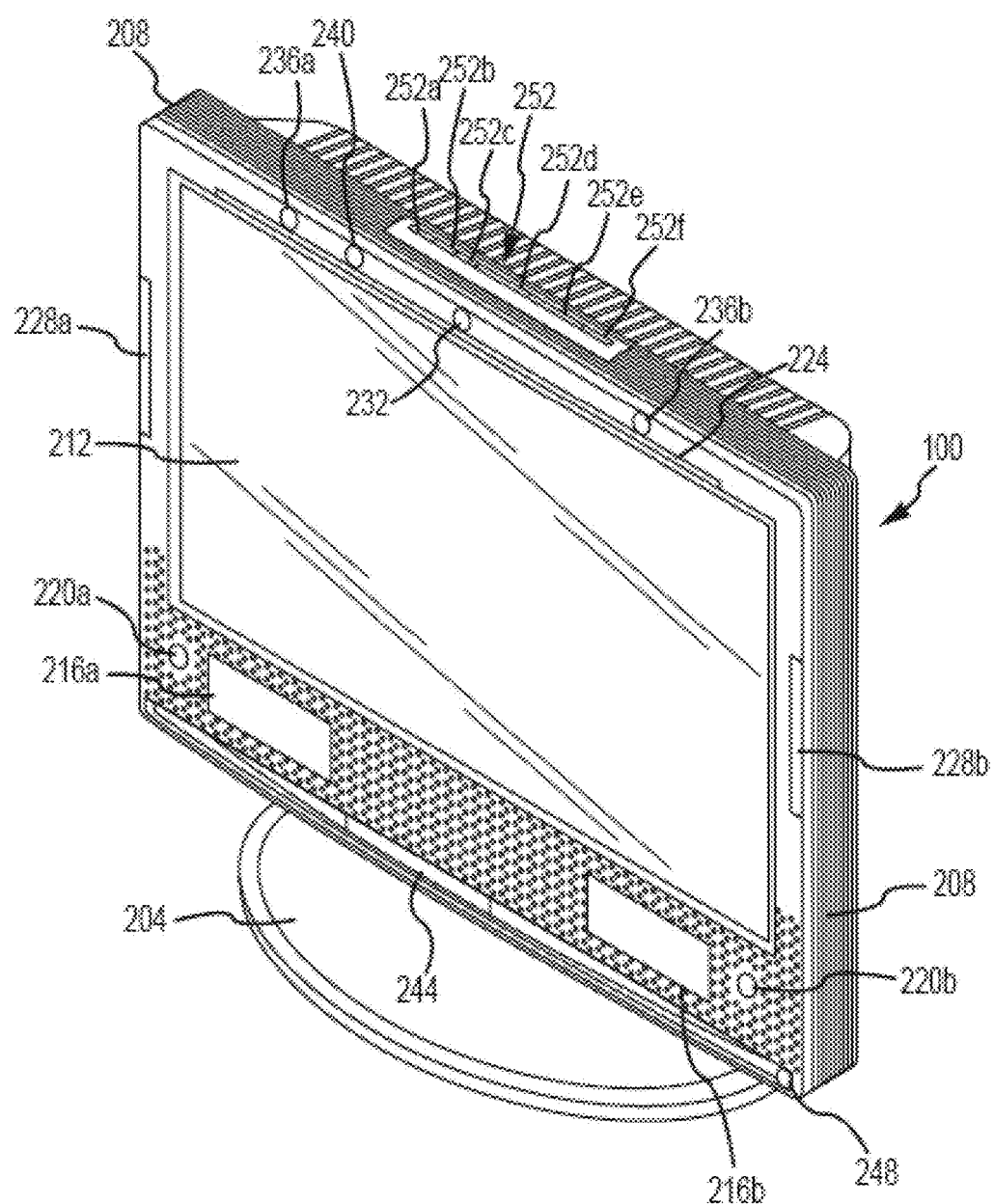
FIG. 2A includes a first view of an embodiment of an intelligent television.

Intelligent TV:

FIGS. 2A-2D illustrate components of the Intelligent TV 100. In general, as shown by FIG. 2A, the Intelligent TV 100 can be supported by a removable base or stand 204 that is attached to a frame 208. The frame 208 surrounds edges of a display screen 212, leaving a front surface of the display screen 212 uncovered. The display screen 212 may comprise a Liquid Crystal Display (LCD) screen, a plasma screen, Light Emitting Diode (LED) screen, or other screen types. In embodiments, the entire front surface of the screen 212 may be touch sensitive and capable of receiving input by the user touching the front surface of the screen 212.

The Intelligent TV 100 may include integrated speakers 216 and at least one microphone 220. A first area of the frame 208 may comprise a horizontal gesture capture region 224 and second areas comprise vertical gesture capture regions 228. The gesture capture regions 224, 228 may comprise areas or regions that are capable of receiving input by recognizing gestures made by the user, and in some examples, without the need for the user to actually touch the screen 212 surface of the Intelligent TV 100. However, the gesture capture regions 224, 228 may not include pixels that can perform a display function or capability.

One or more image capture devices 232, such as a camera, can be included for capturing still and/or video images. The image capture device 232 can include or be associated with additional elements, such as a flash or other light source 236 and a range finding device 240 to assist focusing of the image capture device. In addition, the microphone 220, gesture capture regions 224, 228, image capture devices 232, and the range finding device 240 may be used by the Intelligent TV 100 to recognize individual users. Additionally or alternatively, the Intelligent TV 100 may learn and remember preferences associated with the individual users. In some embodiments, the learning and remembering (i.e., identifying and recalling stored information) may be associated with the recognition of a user.

An IR transmitter and receiver 244 may also be provided to connect the Intelligent TV 100 with a remote control device (not shown) or other IR devices. Additionally or alternatively, the remote control device may transmit wireless signals via RF, light, and/or a means other than IR. Also shown in FIG. 2A is an audio jack 248, which may be hidden behind a panel that is hinged or removable. The audio jack 248 accommodates a tip, ring, sleeve (TRS) connector, for example, to allow the user to utilize headphones, a headset, or other external audio equipment.

The Intelligent TV 100 can also include a number of buttons 252. For example, FIG. 2A illustrates the buttons 252 on the top of the Intelligent TV 100, although the buttons could be placed at other locations. As shown, the Intelligent TV 100 includes six buttons 252a-f, which can be configured for specific inputs. For example, the first button 252a may be configured as an on/off button used to control overall system power to the Intelligent TV 100. The buttons 252 may be configured to, in combination or alone, control a number of aspects of the Intelligent TV 100. Some non-limiting examples include, but are not limited to, overall system volume, brightness, the image capture device, the microphone, and initiation/termination of a video conference. Instead of separate buttons, two of the buttons may be combined into a rocker button. This rocker button arrangement may be useful in situations where the buttons are configured to control features such as volume or brightness. In some embodiments, one or more of the buttons 252 are capable of supporting different user commands. By way of example, a normal press has a duration commonly of less than about 1 second and resembles a quick input. A medium press has a duration commonly of 1 second or more but less than about 12 seconds. A long press has a duration commonly of about 12 seconds or more. The function of the buttons is normally specific to the application that is active on the Intelligent TV 100. In the video conference application for instance and depending on the particular button, a normal, medium, or long press can mean end the video conference, increase or decrease the volume, increase a rate speed associated with a response to an input, and toggle microphone mute. Depending on the particular button, a normal, medium, or long press can also control the image capture device 232 to increase zoom, decrease zoom, take a photograph, or record video.

Figure 2B:
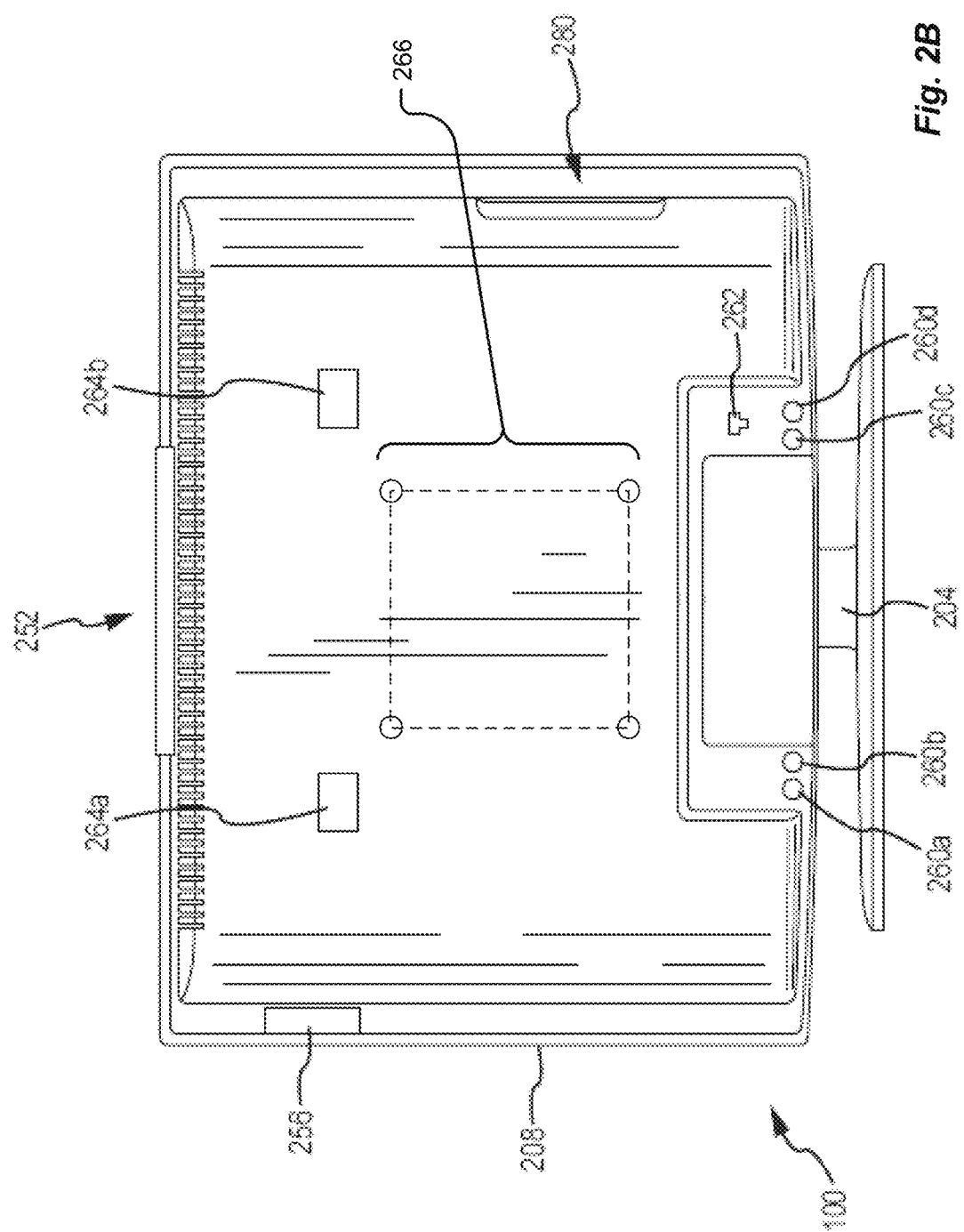
FIG. 2B includes a second view of an embodiment of an intelligent television.

In support of communications functions or capabilities, the Intelligent TV 100 can include one or more shared or dedicated antennae 256 and wired broadband connections 260 as shown in FIG. 2B. The antennae 256 also enable the Intelligent TV 100 to receive digital and/or analog broadcast TV channels. The wired broadband connections 260 are, for example, a Digital Subscriber Line (DSL), an optical line, an Ethernet port, an IEEE 1394 interface, or other interfaces. The Intelligent TV 100 also has a telephone line jack 262 to further provide communications capability.

In addition to the removable base 204, the Intelligent TV 100 may include hardware and mounting points 264 on a rear surface to facilitate mounting the Intelligent TV 100 to a surface, such as a wall. In one example, the Intelligent TV 100 may incorporate at least one Video Equipment Standards Association (VESA) mounting interface for attaching the device 100 to the surface.

Figure 2C:
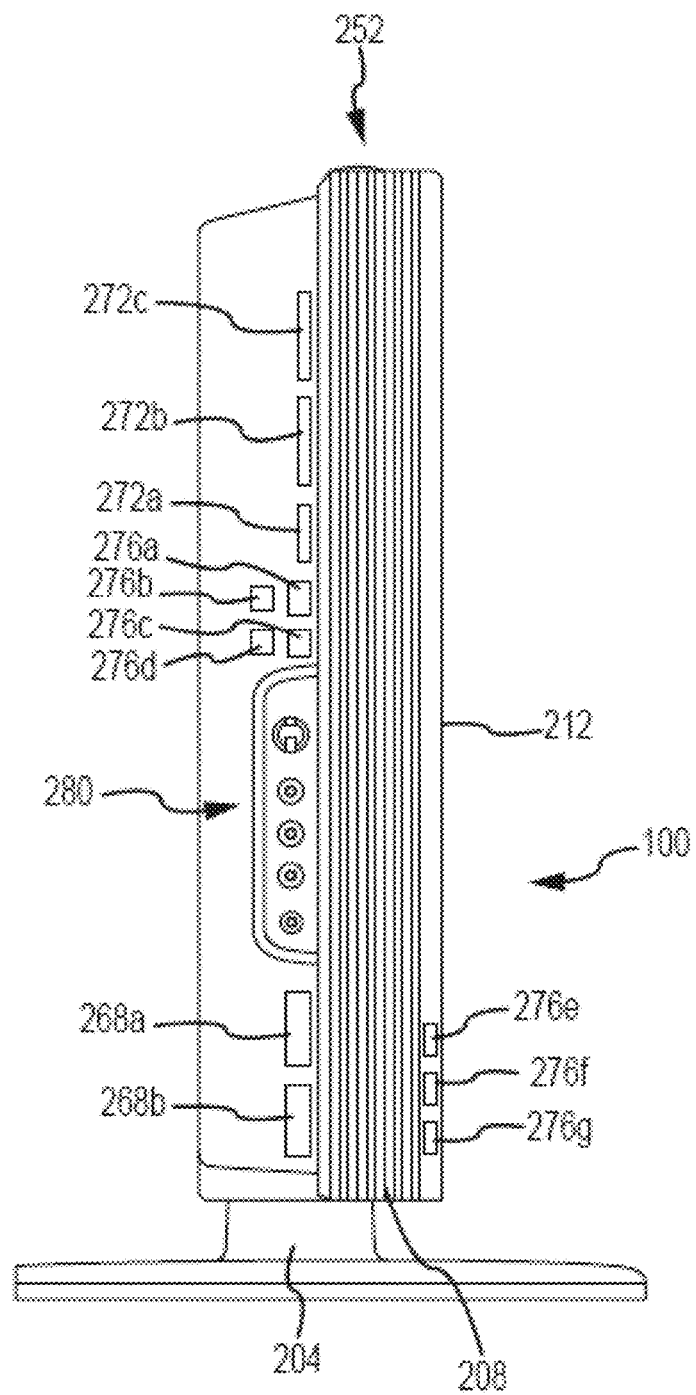
FIG. 2C includes a third view of an embodiment of an intelligent television.

As shown in FIG. 2C, the Intelligent TV 100 may include docking interfaces or ports 268. The docking ports 268 may include proprietary or universal ports to support the interconnection of the Intelligent TV 100 to other devices or components, which may or may not include additional or different capabilities from those integral to the Intelligent TV 100. In addition to supporting an exchange of communication signals between the Intelligent TV 100 and a connected device or component, the docking ports 268 can support the supply of power to the connected device or component. The docking ports 268 can also comprise an intelligent element that comprises a docking module for controlling communications or other interactions between the Intelligent TV 100 and the connected device or component.

The Intelligent TV 100 also includes a number of card slots 272 and network or peripheral interface ports 276. The card slots 272 may accommodate different types of cards including subscriber identity modules (SIM), secure digital (SD) cards, MiniSD cards, flash memory cards, and other cards. Ports 276 in embodiments may include input/output (I/O) ports, such as universal serial bus (USB) ports, parallel ports, game ports, and high-definition multimedia interface (HDMI) connectors.

An audio/video (A/V) I/O module 280 can be included to provide audio to an interconnected speaker or other device, and to receive audio input from a connected microphone or other device. As an example, the audio input/output interface 280 may comprise an associated amplifier and analog-to-digital converter.

Figure 3:
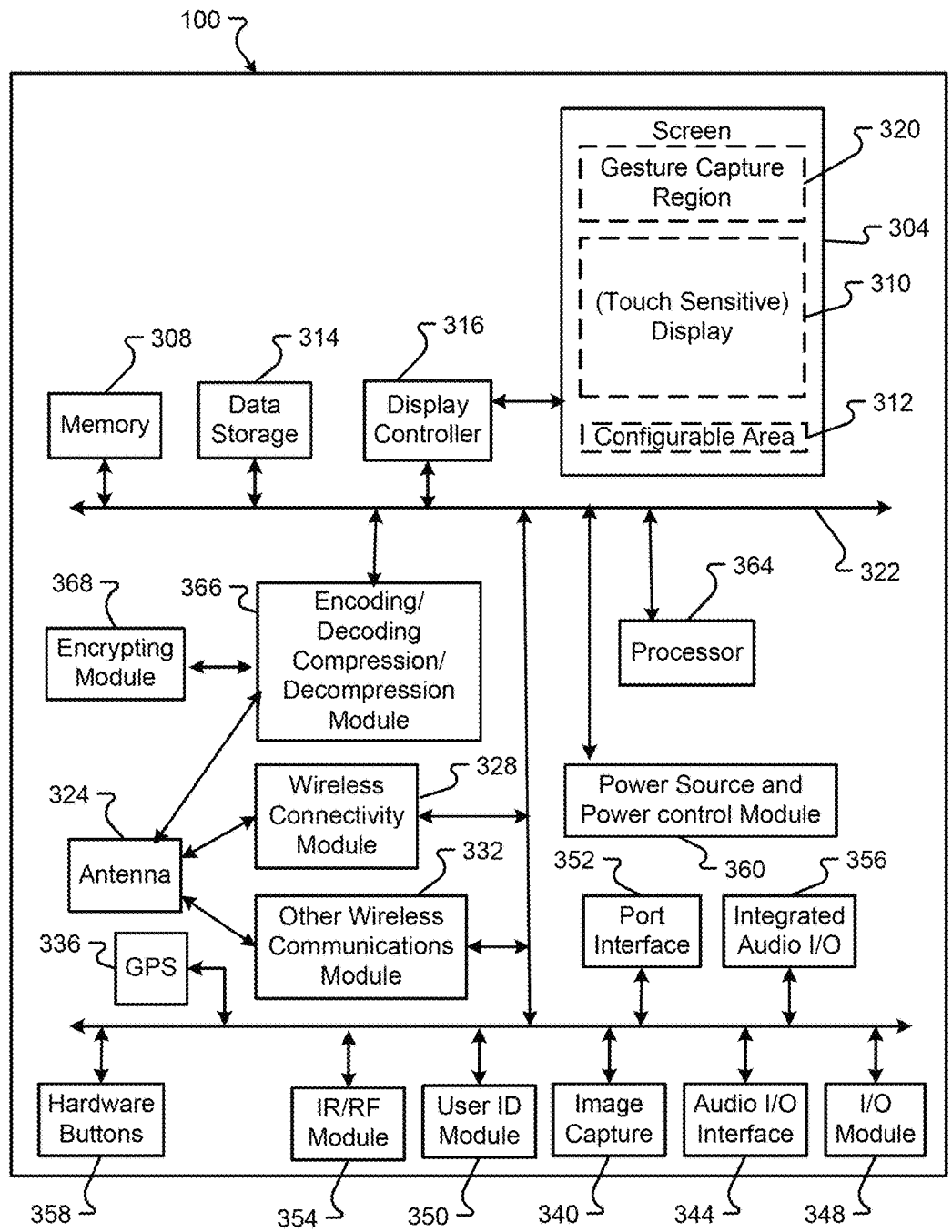
FIG. 3 is a block diagram of an embodiment of the hardware of an intelligent television.

Hardware Features:

FIG. 3 illustrates components of a Intelligent TV 100 in accordance with embodiments of the present disclosure. In general, the Intelligent TV 100 includes a primary screen 304. Screen 304 can be a touch sensitive screen and can include different operative areas.

For example, a first operative area, within the screen 304, may comprise a display 310. In some embodiments, the display 310 may be touch sensitive. In general, the display 310 may comprise a full color, display.

A second area within the screen 304 may comprise a gesture capture region 320. The gesture capture region 320 may comprise an area or region that is outside of the display 310 area, and that is capable of receiving input, for example in the form of gestures provided by a user. However, the gesture capture region 320 does not include pixels that can perform a display function or capability.

A third region of the screen 304 may comprise a configurable area 312. The configurable area 312 is capable of receiving input and has display or limited display capabilities. In embodiments, the configurable area 312 may present different input options to the user. For example, the configurable area 312 may display buttons or other relatable items. Moreover, the identity of displayed buttons, or whether any buttons are displayed at all within the configurable area 312 of a screen 304, may be determined from the context in which the Intelligent TV 100 is used and/or operated.

In an exemplary touch sensitive screen 304 embodiment, the touch sensitive screen 304 comprises a liquid crystal display extending across at least those regions of the touch sensitive screen 304 that are capable of providing visual output to a user, and a capacitive input matrix over those regions of the touch sensitive screen 304 that are capable of receiving input from the user.

One or more display controllers 316 may be provided for controlling the operation of the screen 304. The display controller 316 may control the operation of the touch sensitive screen 304, including input (touch sensing) and output (display) functions. The display controller 316 may also control the operation of the screen 304 and may interface with other inputs, such as infrared and/or radio input signals (e.g., door/gate controllers, alarm system components, etc.). In accordance with still other embodiments, the functions of a display controller 316 may be incorporated into other components, such as a processor 364.

The processor 364 may comprise a general purpose programmable processor or controller for executing application programming or instructions. In accordance with at least some embodiments, the processor 364 may include multiple processor cores, and/or implement multiple virtual processors. In accordance with still other embodiments, the processor 364 may include multiple physical processors. As a particular example, the processor 364 may comprise a specially configured application specific integrated circuit (ASIC) or other integrated circuit, a digital signal processor, a controller, a hardwired electronic or logic circuit, a programmable logic device or gate array, a special purpose computer, or the like. The processor 364 generally functions to run programming code or instructions implementing various functions of the Intelligent TV 100.

In support of connectivity functions or capabilities, the Intelligent TV 100 can include a module for encoding/decoding and/or compression/decompression 366 for receiving and managing digital television information. Encoding/decoding compression/decompression module 366 enables decompression and/or decoding of analog and/or digital information dispatched by a public television chain or in a private television network and received across antenna 324, I/O module 348, wireless connectivity module 328, and/or other wireless communications module 332. The television information may be sent to screen 304 and/or attached speakers receiving analog or digital reception signals. Any encoding/decoding and compression/decompression is performable on the basis of various formats (e.g., audio, video, and data). Encrypting module 368 is in communication with encoding/decoding compression/decompression module 366 and enables the confidentiality of all the data received or transmitted by the user or supplier.

In support of communications functions or capabilities, the Intelligent TV 100 can include a wireless connectivity module 328. As examples, the wireless connectivity module 328 can comprise a GSM, CDMA, FDMA and/or analog cellular telephony transceiver capable of supporting voice, multimedia and/or data transfers over a cellular network. Alternatively or in addition, the Intelligent TV 100 can include an additional or other wireless communications module 332. As examples, the other wireless communications module 332 can comprise a Wi-Fi, Blutooth™, WiMax, infrared, or other wireless communications link. The wireless connectivity module 328 and the other wireless communications module 332 can each be associated with a shared or a dedicated antenna 324 and a shared or dedicated I/O module 348.

An input/output module 348 and associated ports may be included to support communications over wired networks or links, for example with other communication devices, server devices, and/or peripheral devices. Examples of an input/output module 348 include an Ethernet port, a Universal Serial Bus (USB) port, Thunderbolt™ or Light Peak interface, Institute of Electrical and Electronics Engineers (IEEE) 1394 port, or other interface.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog-to-digital converter. Alternatively or in addition, the Intelligent TV 100 can include an integrated audio input/output device 356 and/or an audio jack for interconnecting an external speaker or microphone. For example, an integrated speaker and an integrated microphone can be provided, to support near talk or speaker phone operations.

A port interface 352 may be included. The port interface 352 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 352 can support the supply of power to or from the device 100. The port interface 352 also comprises an intelligent element that comprises a docking module for controlling communications or other interactions between the Intelligent TV 100 and a connected device or component. The docking module may interface with software applications that allow for the remote control of other devices or components (e.g., media centers, media players, and computer systems).

An Intelligent TV 100 may also include memory 308 for use in connection with the execution of application programming or instructions by the processor 364, and for the temporary or long term storage of program instructions and/or data. As examples, the memory 308 may comprise RAM, DRAM, SDRAM, or other solid state memory. Alternatively or in addition, data storage 314 may be provided. Like the memory 308, the data storage 314 may comprise a solid state memory device or devices. Alternatively or in addition, the data storage 314 may comprise a hard disk drive or other random access memory.

Hardware buttons 358 can be included for example for use in connection with certain control operations. One or more image capture interfaces/devices 340, such as a camera, can be included for capturing still and/or video images. Alternatively or in addition, an image capture interface/device 340 can include a scanner, code reader, or motion sensor. An image capture interface/device 340 can include or be associated with additional elements, such as a flash or other light source. The image capture interfaces/devices 340 may interface with a user ID module 350 that assists in identifying users of the Intelligent TV 100.

The Intelligent TV 100 can also include a global positioning system (GPS) receiver 336. In accordance with embodiments of the present invention, the GPS receiver 336 may further comprise a GPS module that is capable of providing absolute location information to other components of the Intelligent TV 100. As will be appreciated, other satellite-positioning system receivers can be used in lieu of or in addition to GPS.

Power can be supplied to the components of the Intelligent TV 100 from a power source and/or power control module 360. The power control module 360 can, for example, include a battery, an AC-to-DC converter, power control logic, and/or ports for interconnecting the Intelligent TV 100 to an external source of power.

Communication between components of the Intelligent TV 100 is provided by bus 322. Bus 322 may comprise one or more physical buses for control, addressing, and/or data transmission. Bus 322 may be parallel, serial, a hybrid thereof, or other technology.

Figure 4:
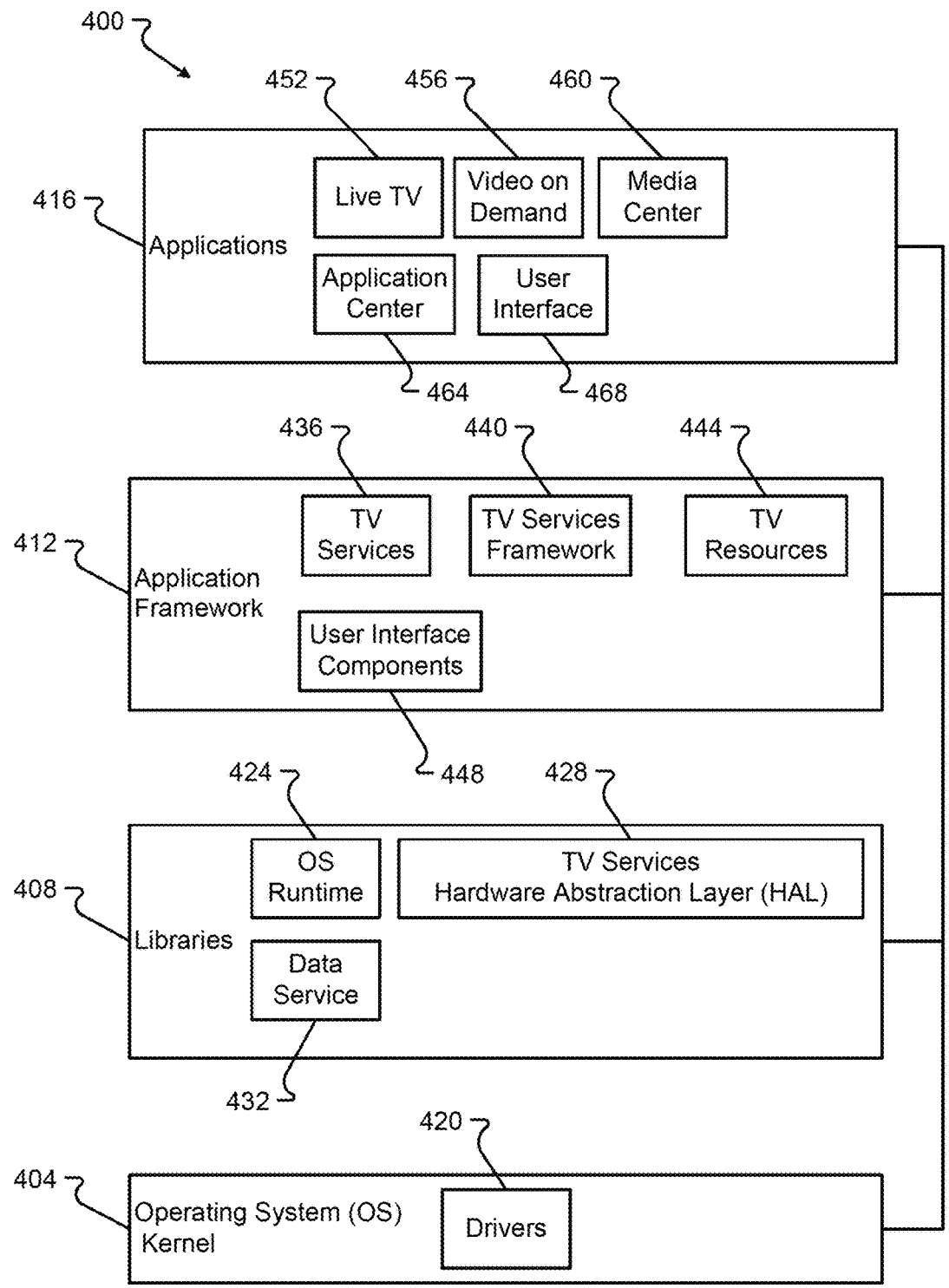
FIG. 4 is a block diagram of an embodiment of the intelligent television software and/or firmware.

Firmware and Software:

An embodiment of the software system components and modules 400 is shown in FIG. 4. The software system 400 may comprise one or more layers including, but not limited to, an operating system kernel 404, one or more libraries 408, an application framework 412, and one or more applications 416. The one or more layers 404-416 can communicate with each other to perform functions for the Intelligent TV 100.

An operating system (OS) kernel 404 contains the primary functions that allow the software to interact with hardware associated with the Intelligent TV 100. Kernel 404 can include a collection of software that manages the computer hardware resources and provides services for other computer programs or software code. The operating system kernel 404 is the main component of the operating system and acts as an intermediary between the applications and data processing done with the hardware components. Part of the operating system kernel 404 can include one or more device drivers 420. A device driver 420 can be any code within the operating system that helps operate or control a device or hardware attached to or associated with the Intelligent TV. The driver 420 can include code for operating video, audio, and/or other multimedia components of the Intelligent TV 100. Examples of drivers include display, camera, flash, binder (IPC), keypad, WiFi, and audio drivers.

Library 408 can contain code or other components that may be accessed and implemented during the operation of the software system 400. The library 408 may contain one or more of, but is not limited to, an operating system runtime library 424, a TV services hardware abstraction layer (HAL) library 428, and/or a data service library 432. The OS runtime library 424 may contain the code required by the operating system kernel 404 or other operating system functions to be executed during the runtime of the software system 400. The library can include the code that is initiated during the running of the software system 400.

The TV services hardware abstraction layer library 428 can include code required by TV services either executed in the application framework 412 or an application 416. The TV services HAL library 428 is specific to the Intelligent TV 100 operations that control different functions of the Intelligent TV. The TV service HAL library 428 can also be formed from other types of application languages or embodiments of different types of code or formats for code beyond the hardware abstraction layer.

Figure 6:
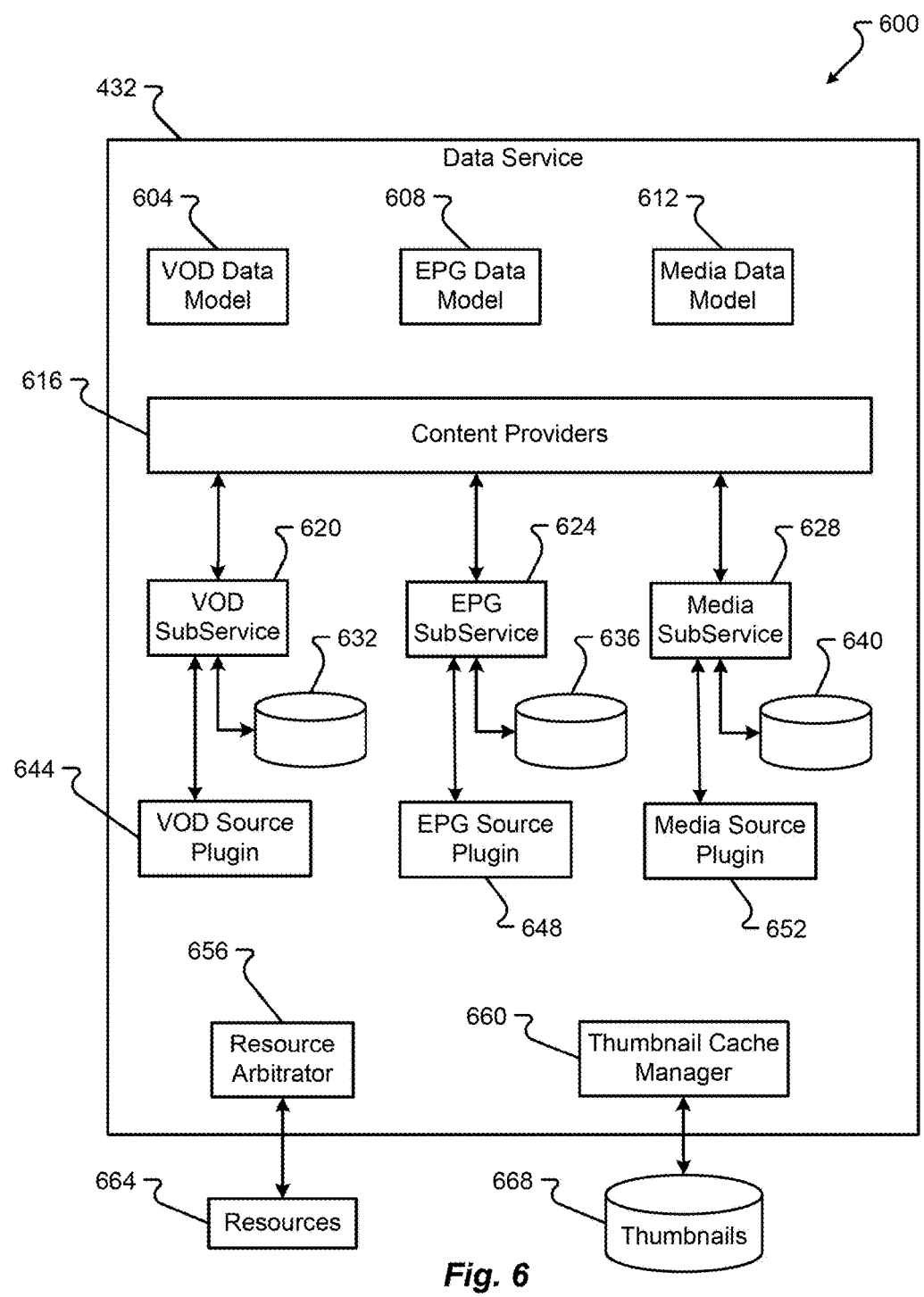
FIG. 6 is a third block diagram of an embodiment of the intelligent television software and/or firmware.

The data services library 432 can include the one or more components or codes to implement components for the data services function. The data services function can be implemented in the application framework 412 and/or applications layer 416. An embodiment of a function of the data services and the type of components that may be included is shown in FIG. 6.

The application framework 412 can include a general abstraction for providing functionality that can be selected by one or more applications 416 to provide specific application functions or software for those applications. Thus, the framework 412 can include one or more different services, or other applications, that can be accessed by the applications 416 to provide general functions across two or more applications. Such functions include, for example, management of one or more of windows or panels, surfaces, activities, content, and resources, The application framework 412 can include one or more, but is not limited to, TV services 434, TV services framework 440, TV resources 444, and user interface components 448.

The TV services framework 440 can provide an additional abstraction for different TV services. TV services framework 440 allows for the general access and function of services that are associated with the TV functionality. The TV services 436 are general services provided within the TV services framework 440 that can be accessed by applications in the applications layer 416. The TV resources 444 provide code for accessing TV resources 444 including any type of storage, video, audio, or other functionality provided with the Intelligent TV 100. The TV resources 444, TV services 436, and TV services framework 440 provide for the different implementations of TV functionality that may occur with the Intelligent TV 100.

One or more user interface components 448 can provide general components for display of the Intelligent TV 100. The user interface components 448 might be general components that may be accessed by different applications provided in the application framework 412. The user interface components 448 may be accessed to provide for panels and silos as described in conjunction with FIG. 5.

The applications layer 416 can both contain and execute applications associated with the Intelligent TV 100. Applications layer 416 may include one or more of, but is not limited to, a live TV application 452, a video on demand application 456, a media center application 460, an application center application 464, and a user interface application 468. The live TV application 452 can provide live TV over different signal sources. For example, the live TV application 452 can provide TV from input from cable television, over air broadcasts, from satellite services, or other types of live TV services. Live TV application 452 may then present the multimedia presentation or video and audio presentation of the live television signal over the display of the Intelligent TV 100.

The video on demand application 456 can provide for video from different storage sources. Unlike Live TV application 452, video on demand 456 provides for display of videos that are accessed from some memory source. The sources of the video on demand can be associated with users or with the Intelligent TV or some other type of service. For example, the video on demand 456 may be provided from an iTunes library stored in a cloud, from a local disc storage that contains stored video programs, or from some other source.

The media center application 460 can provide applications for different types of media presentation. For example, the media center 460 can provide for displaying pictures or audio that is different from, but still accessible by the user and different from live TV or video on demand. The media center 460 allows for the access of different sources to obtain the media in the display of such media on the Intelligent TV 100.

The application center 464 allows for the provision, storage and use of applications. An application can be a game, a productivity application, or some other application generally associated with computer systems or other devices, but may be operated within the Intelligent TV. An application center 464 may obtain these applications from different sources, store them locally and then execute those types of applications for the user on the Intelligent TV 100.

Figure 5:
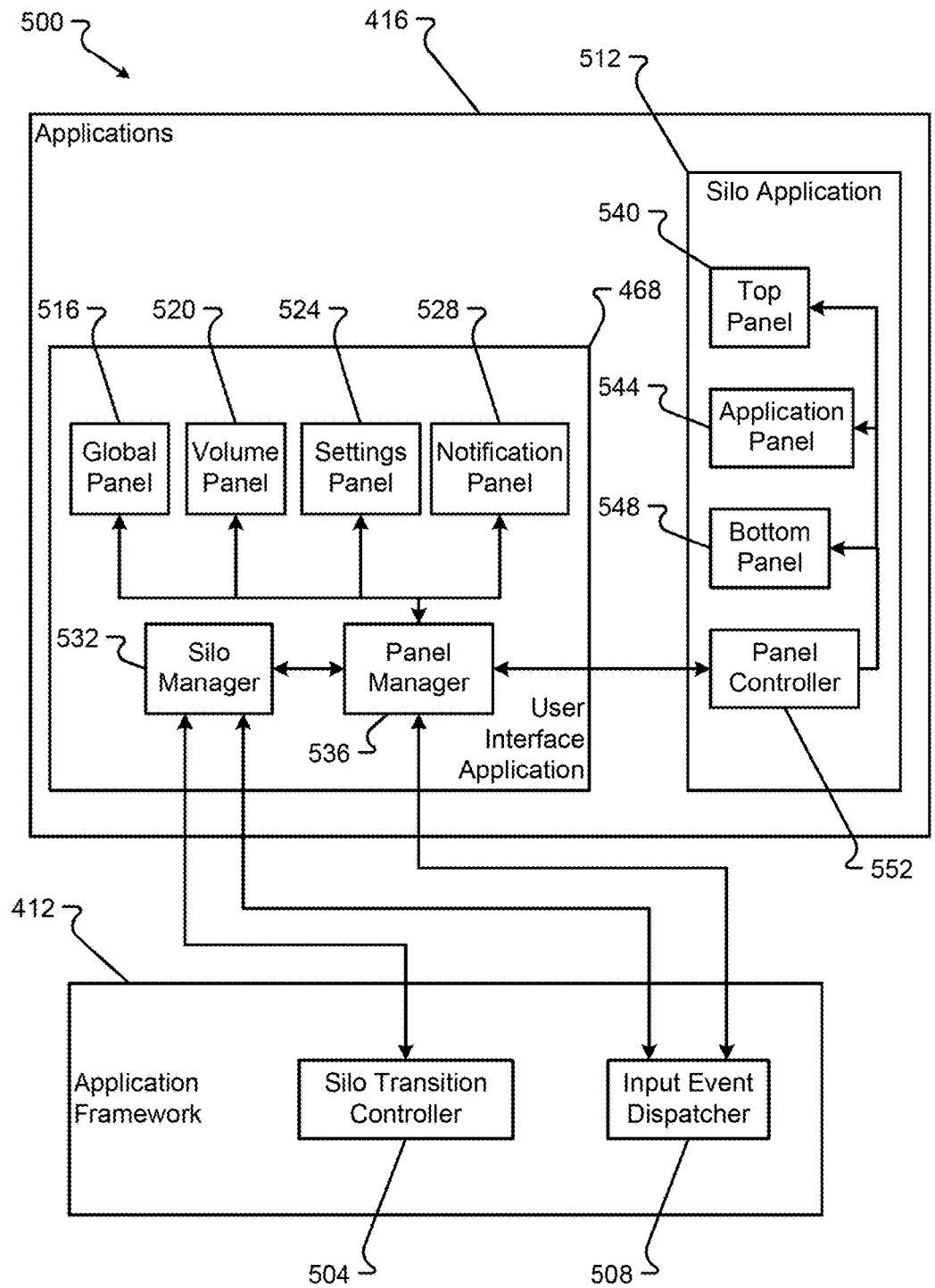
FIG. 5 is a second block diagram of an embodiment of the intelligent television software and/or firmware.

User interface application 468 provides for the specific user interfaces associated with the Intelligent TV 100. These user interfaces can include the silos and panels that are described in FIG. 5. An embodiment of the user interface software 500 is shown in FIG. 5. Here the application framework 412 contains one or more code components which help control the user interface events while one or more applications in the applications layer 416 affects the user interface use for the Intelligent TV 100. The application framework 412 can include a silo transition controller 504 and/or an input event dispatcher 508. There may be more or fewer code components in the application framework 412 than those shown in FIG. 5. The silo transition controller 504 contains the code and language that manages the transitions between one or more silos. A silo can be a vertical user interface feature on the Intelligent TV that contains information for user. The transition controller 504 can manage the changes between two silos when an event occurs in the user interface. The input event dispatcher 508 can receive user interface events that may be received from the operating system and provided to the input event dispatcher 508. These events can include selections of buttons on a remote control or on the TV or other types of user interface inputs. The input event dispatcher 508 may then send these events to a silo manager 532 or panel manager 536 depending on the type of the event. The silo transition controller 504 can interface with the silo manager 532 to affect changes in the silos.

The applications layer 416 can include a user interface application 468 and/or a silo application 512. The applications layer 416 can include more or fewer user interface applications as necessary to control the user interface of the Intelligent TV 100 than those shown in FIG. 5. The user interface application 468 can include a silo manager 532, a panel manager 536, and one or more types of panels 516-528. The silo manager 532 manages the display and/or features of silos. The silo manager 532 can receive or send information from the silo transition controller 504 or the input event dispatcher 508 to change the silos displayed and/or to determine types of input received in the silos.

A panel manager 536 is operable to display panels in the user interface to manage transitions between those panels or to affect user interface inputs received in the panel. The panel manager 536 may thus be in communication with different user interface panels such as a global panel 516, a volume panel 520, a settings panel 524, and/or a notification panel 528. The panel manager 536 can display these types of panels depending on the inputs received from the input event dispatcher 508. The global panel 516 may include information that is associated with the home screen or top level hierarchal information for the user. A volume panel 520 may display information about an audio volume control or other settings for volume. A settings panel 524 can include information displayed about the settings of the audio or video, or other settable characteristics of the Intelligent TV 100. A notification panel 528 can provide information about notifications to a user. These notifications can be associated with information, such as, video on demand displays, favorites, currently provided programs, or other information. Notifications can be associated with the media or with some type of setting, or operation or the Intelligent TV 100. The panel manager 536 may be in communication with the panel controller 552 of the silo application 512.

The panel controller 552 may operate to control portions of the panels of the types described previously. Thus, the panel controller 552 may be in communication with a top panel application 540, an application panel 544, and/or bottom panel 548. These types of panels may be differently displayed in the user interface of the Intelligent TV 100. The panel control thus may be based on the configuration of the system or the type of display being used currently, put the types of panels 516-528 into a certain display orientation governed by the top panel application 540, application panel 544, or bottom panel application 548.

An embodiment of the data service 432 and the operation of the data management is shown in FIG. 6. The data management 600 can include one or more code components that are associated with different types of data. For example, there may be code components within the data service 432 that execute and are associated with video on demand, the electronic program guide, or media data. There may be more or fewer types of data service 432 components than those shown in FIG. 6. Each of the different types of data may include a data model 604-612. The data models govern what information is to be stored and how that information will be stored by the data service. Thus, the data model can govern regardless of where the data comes from, how the data will be received or managed within the Intelligent TV system. Thus, the data model 604, 608, and/or 612, can provide a translation ability or affect the ability to translate data from one form to another to be used by the Intelligent TV 100.

The different types of data services (video on demand, electronic programming guide, media) each have a data subservice 620, 624, and/or 628 that is in communication with one or more internal and/or external content providers 616. The data subservices 620, 624, and 628 that communicate with the content providers 616 to obtain data that may then be stored in databases 632, 636, and 640. The subservices 620, 624, and 628 may communicate with and initiate or enable one or more source plug-ins 644, 648, and 652 to communicate with the content provider. For each content provider 616, there may be a different source plug-in 644, 648, and 652. Thus, if there is more than one source of content for the data, each of the data subservices 620, 624, and 628 may determine and then enable or initiate a different source plug-in 644, 648, and/or 652. The content providers 616 may also provide information to a resource arbitrator 656 and/or thumbnail cache manager 660. The resource arbitrator 656 may operate to communicate with resources 664 that are external to the data service 432. Thus, the resource arbitrator 656 may communicate with cloud based storage, network based storage, or other types of external storage in the resources 664. This information may then be provided through the content provider module 616 to the data subservices 620, 624, 628. Likewise, a thumbnail cache manager 660 may obtain thumbnail information from one of the data subservices 620, 624, 628 and store that information in the thumbnails database 668. Further, the thumbnail cache manager 660 may extract or retrieve that information from the thumbnails database 668 to provide to one of the data subservices 620, 624, 628.

Figure 13:
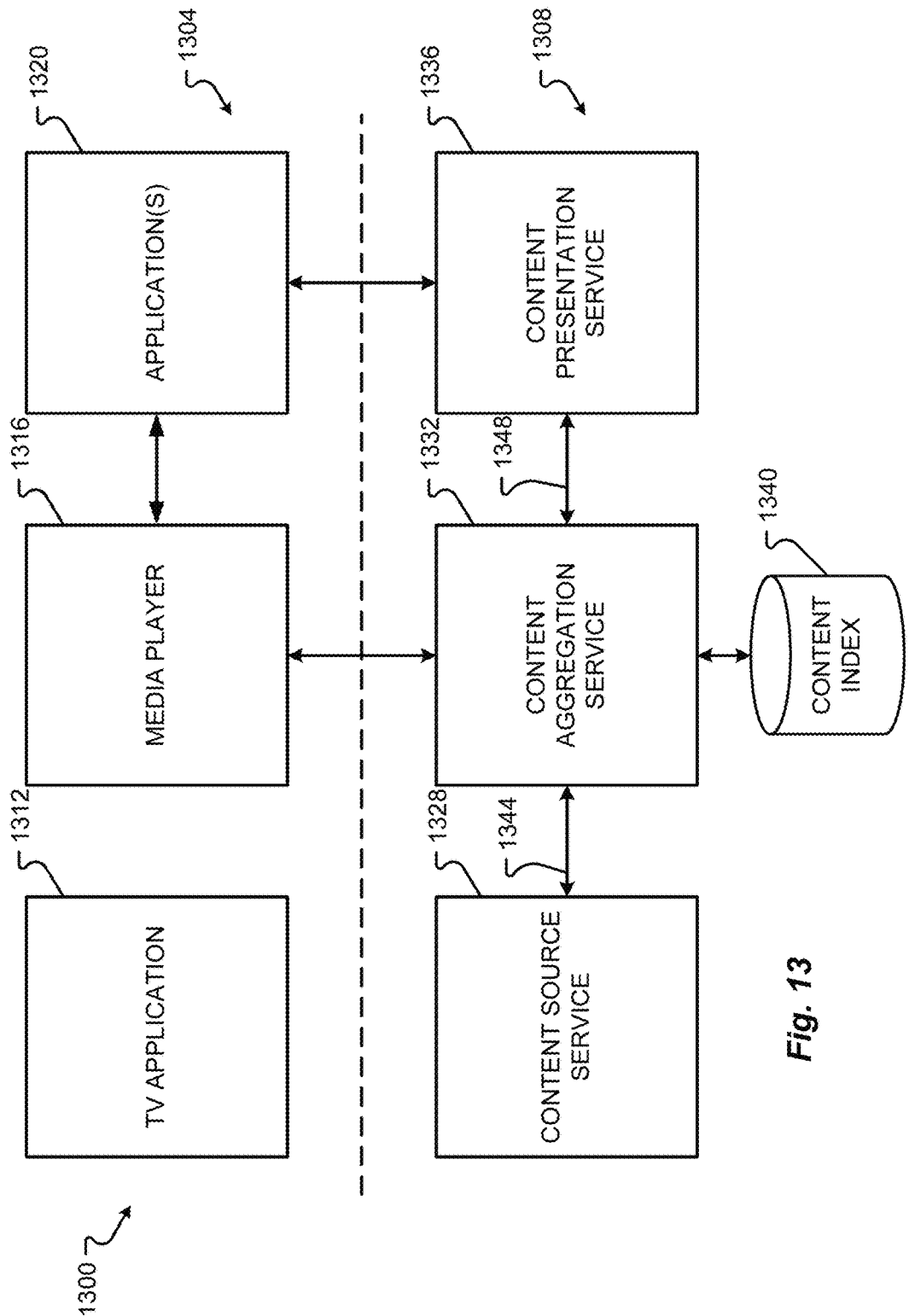
FIG. 13 is a block diagram of an embodiment of a content data service.

An exemplary content aggregation architecture 1300 is shown in FIG. 13. The architecture can include a user interface layer 1304 and a content aggregation layer 1308. The user interface layer 1304 may include a TV application 1312, media player 1316, and application(s) 1320. The TV application 1312 enables the viewer to view channels received via an appropriate transmission medium, such as cable, satellite, and/or the Internet. The media player 1316 views other types of media received via an appropriate transmission medium, such as the Internet. The application(s) 1320 include other TV-related (pre-installed) applications, such as content viewing, content searching, device viewing, and setup algorithms, and coordinates with the media player 1316 to provide information to the viewer.

The content source layer 1308 includes, as data services, a content source service 1328, a content aggregation service 1332 and a content presentation service 1336. The content source service 1328 can manage content source investigators, including local and/or network file system(s), digital network device manager (which discovers handheld and non-handheld devices (e.g., digital media servers, players, renderers, controllers, printers, uploaders, downloaders, network connectivity functions, and interoperability units) by known techniques, such as a multicast universal plug and play or UPnP discovery techniques, and, for each discovered device, retrieves, parses, and encodes device descriptors, notifies the content source service of the newly discovered device, and provides information, such as an index, on previously discovered devices), Internet Protocol Television or IPTV, digital television or DTV (including high definition and enhanced TV), third party services (such as those referenced above), and applications (such as Android applications).

Content source investigators can track content sources and are typically configured as binaries. The content source service 1328 starts content source investigators and maintains open and persistent channels for communications. The communications include query or command and response pairs. The content aggregation service 1332 can manage content metadata fetchers, such as for video, audio, and/or picture metadata. The content presentation service 1336 may provide interfaces to the content index 1340, such as an Android application interface and digital device interfaces.

The content source service 1328 can send and receive communications 1344 to and from the content aggregation service 1332. The communications can include notifications regarding new and removed digital devices and/or content and search queries and results. The content aggregation service 1332 can send and receive communications 1348 to and from the content presentation service 1336 including device and/or content lookup notifications, content-of-interest advisories and notifications, and search queries and results.

When a search is performed, particularly when the user is searching or browsing content, a user request may be received from the user interface layer 1300, by the content presentation service 1336, which responsively opens a socket and sends the request to the content aggregation service 1332. The content aggregation service 1332 first returns results from the local database 1340. The local database 1340 includes an index or data model and indexed metadata. The content source service 1328 further issues search and browse requests for all content source investigators and other data management systems. The results are forwarded to the content aggregation service 1332, which updates the database 1340 to reflect the further search results and provides the original content aggregation database search results and the data updates, reflecting the additional content source service search results, over the previously opened socket to the content presentation service 1336. The content presentation service 1336 then provides the results to one or more components in the user interface layer 1300 for presentation to the viewer. When the search session is over (e.g., the search session is terminated by the user or by an action associated with user), the user interface layer 1300 disconnects the socket. As shown, media can be provided directly by the content aggregation service 1332 to the media player 1316 for presentation to the user.

Figure 7:
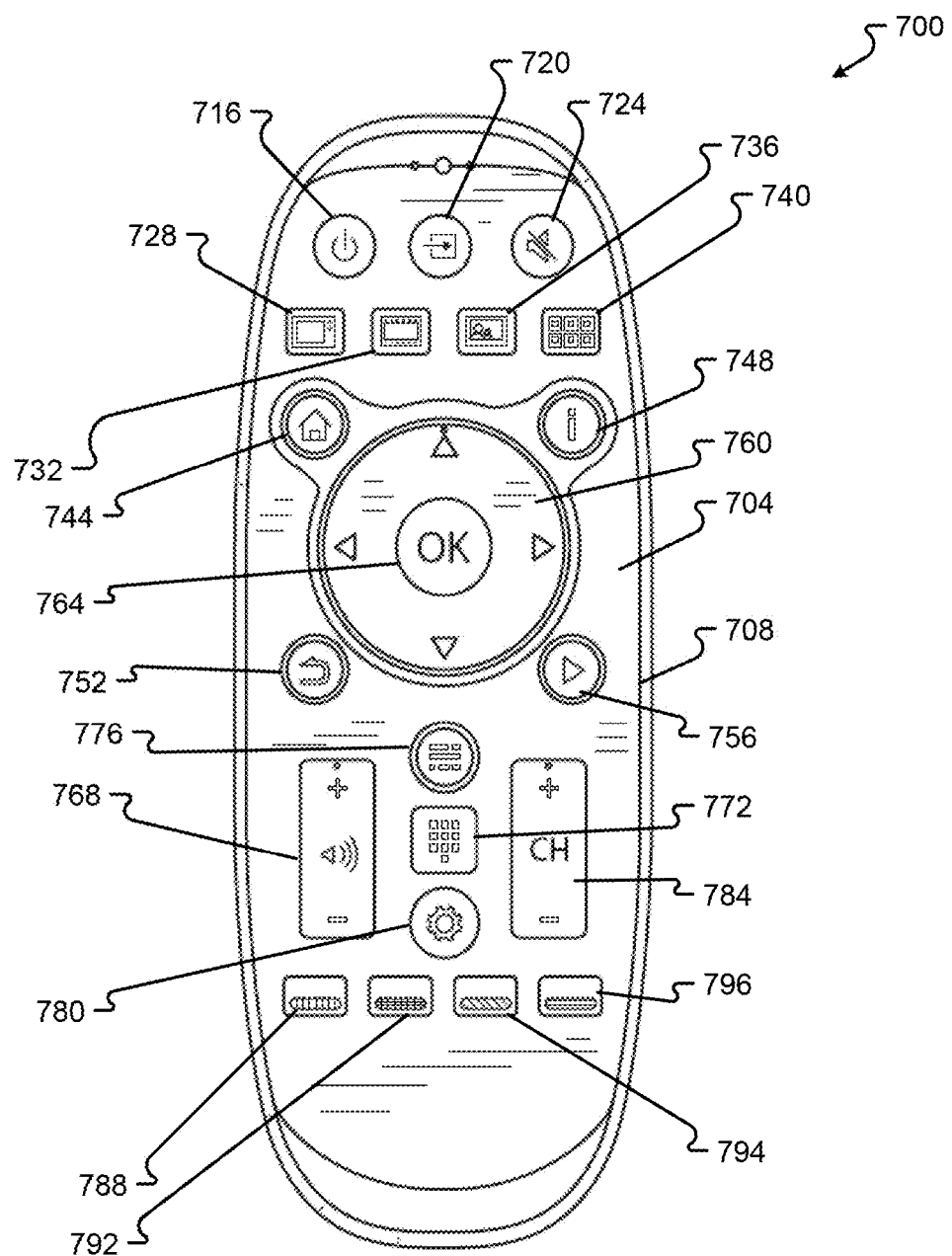
FIG. 7 is a plan view of an embodiment of a handheld remote control.
Figure 8:
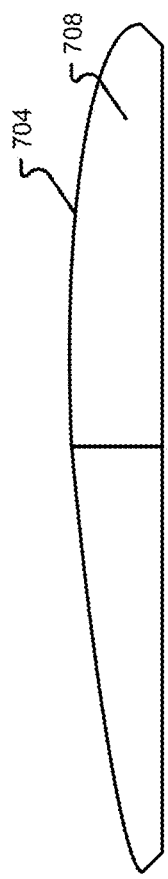
FIG. 8 is a side view of an embodiment of a remote control.

Remote Control:

A handheld remote control can be provided to enable user interaction with the Intelligent TV 100. An exemplary handheld remote control is shown in FIGS. 7-9. The remote control 700 can include one or more of, but is not limited to, top, side and bottom housings 704, 708, and 712, an (on/off) power button 716, an input source button 720 (to select input source such as Live TV, video on demand, media center, application center, high definition multimedia interface or HDMI, component or COMP, audio/Video or A/V, digital or analog television or DTV/ATV, and video graphics array (VGA)), a (volume) mute button 724, a Live TV button 728 (to activate or select the Live TV silo), a video on demand (VOD) button 732 (to activate or select the video on demand silo), a media center button 736 (to activate or select the media center application or silo, which access various types of media such as music, TV programming, videos, and the like), an application center button 740 (to activate or select the application center application or silo), a global panel button 744, an application panel button 748, a back button 752 (to select a prior user operation or Intelligent TV state and/or navigate up a hierarchy of any displayed image or object(s) (in which case the back button 752 does not navigate within application panels or across application silos), a play button 756 (to play or pause media), a D-pad 760 (which includes north, east, west, and south directional arrows to navigate among displayed images and/or move between levels of an application's or object's hierarchy such as application view navigation, panel navigation, and collection navigation), an OK (or select) button 764 (to select a highlighted displayed image (such as displayed speed control, rewind, forward, play, and pause objects and/or objects on menu bar or in a menu box) and/or navigate down a hierarchy of any displayed image or object(s)), a rocker-type volume-up and volume-down button 768 (to adjust the volume), a menu/guide button 772 (to select for display a menu or guide of programming), a 0-9 (number) button 776 (to display a number pad on the TV screen), a settings button 780 (which launches an application to access current and change TV settings (such as channel settings and settings used to adjust picture and sound effects (e.g., image mode (e.g., standard, playground, game, cinema, concert, and studio), brightness, contrast, saturation, color temperature, energy savings, 3D noise reduction, hue, sharpness, zoom mode (e.g., full screen, standard, smart zoom, and dot-to-dot), picture position, 3D mode, for picture, and sound retrieval system or SRS TruSurround, sound mode (e.g., standard, live 1, live 2, theatre, music, speech, user equalizer mode, Left/Right speaker balance, auto volume control, Sony/Philips Interconnect Format or S/PDIF (off, auto, pulse code modulation or PCM) for sound) and system settings (such as system (e.g., selected language for graphical user interface, user geographical and/or geopolitical location information, input method, area settings, and sleep time), network (e.g., WiFi, WiFi hotspot, WiFi direct, Point-to-Point Protocol over Ethernet or PPPoE (asymmetric digital subscriber line or ADSL), Ethernet) settings (e.g., enabled and disabled and selected and non-selected) and information (e.g., network information (e.g., electronic address such as Internet Protocol or IP address, subnet mask, gateway, domain name server information, domain name, Media Access Control or MAC address, service set identification or SSID, security information, and password information) and inline status), manage applications (e.g., currently installed applications, currently executing applications, and internal and external computer readable medium usage), and view user information regarding the Intelligent TV 100)), a rocker-type channel-up and channel-down button 784 (to increment or decrement the selected channel), and first, second, third and fourth hotkeys 788, 792, 794, and 796, and/or a moveable joystick 900 on a bottom of the remote control 700. The first, second, third, and fourth hotkeys are generally assigned different colors, which color indexing is depicted as visual indicia on a selected panel to show the currently assigned function, if any, for each hotkey. As can be seen, the actuator layout can provide a highly efficient, satisfactory, and easily usable experience to the end user.

Unlike the functional associations and functions of many of the actuators, those of some of the actuators are not readily apparent. A number of examples will now be discussed by way of illustration.

The media center button 736, when selected, can provide information regarding music, videos, photographs, collections or groupings of music, videos, and/or photographs, and internal and external computational devices (such as personal computers, laptops, tablet computers, wireless phones, removable computer readable media, and the like), which can be grouped in a selected manner (such as favorites, most recently viewed, most watched or viewed, and most recently added). The information can includes previews (which can include selected portions of the media content, duration, file size, date created, date last watched, times watched or viewed, and audio and/or video format information).

The application center button 740, when selected, may provide information regarding pre-installed and downloaded applications. Unlike downloaded applications, pre-installed applications cannot be removed by the user or manually updated. Exemplary pre-installed applications include web browser, settings control, and content search algorithms. By way of illustration, the application center button 740 can provide a scrollable graphical grid of icons (each icon being associated with an application) currently available in the application center.

The global panel button 744, when selected, can provide the user, via one or more panels or windows, with access to one or more of, but not limited to, silos, notifications, a web browser, system settings, and/or information associated therewith. For example, the global panel button 744 can enable the user to determine what external devices are currently connected to and/or disconnected from the Intelligent TV 100, determine what inputs (e.g., HDMI ports) are currently available for connecting to external devices, determine a connection and/or operational status of a selected external device and/or network (e.g., WiFi connected, Ethernet connected, and offline), assign a custom (or user selected) name to each input source, determine what content is currently being offered on Live TV, on demand, the media center, and/or the application center, access vendor messages and notifications to the user (e.g., system and/or application updates are available), activate the Internet browser, and/or access shortcuts on a displayed shortcut bar to more frequently used and desired applications. Common shortcuts are Internet browser (e.g., Internet search engine), system settings, and notifications. The common types of panels are for information (which is typically information related to a currently displayed image and/or content (e.g., title, date/time, audio/visual indicator, rating, and genre), browse requests, and/or search requests (such as search term field)). Each of the panel types may include a panel navigation bar, detailed information or relevant content to the panel function, operation and/or purpose, and a hotkey bar (defining currently enabled functional associations of hotkeys).

The application panel button 748, when selected, can display an application window or panel. One application panel may be an information panel regarding a selected (pre-installed or previously downloaded) application icon. The information panel can one or more of identify the selected application, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs), provide the option to launch, remove, update, and add to favorites the identified application, and provide a listing of selectable links of other (not yet downloaded) recommended applications that provide similar functionality to the identified application. The latter listing can, in turn, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs).

The functions of the first, second, third, and fourth hotkeys 788, 792, 794, and 796 can change depending on system state, context, and/or, within a selected screen and/or panel, based on a content or currently selected portion of (or relative cursor position on) the screen. Commonly, a currently assigned function of any of the first, second, third, and fourth hotkeys 788, 792, 794, and 796 depends on a currently accessed silo and/or panel (with which the user is currently interacting within the silo). In other words, a first function of one of the first, second, third, and fourth hotkeys 788, 792, 794, and 796 is activated by the respective hotkey in a first system state while a different second function is activated by the respective hotkey in a different second system state. In another example, a third function of one of the first, second, third, and fourth hotkeys 788, 792, 794, and 796 is activated by the respective hotkey when a user focus (or currently selected cursor position or screen portion) is at a first screen position while a different fourth function is activated by the respective hotkey when a user focus (or currently selected cursor position or screen portion) is at a different second screen position. The first screen position can, for instance, be within an icon while the second screen position is outside of the icon. Hotkey functionality that could be enabled when in the first screen position may be "configure" and "remove" and disabled is "add," and, when in the second position hotkey functionality enabled can be "add" and disabled is "configure" and "remove." Generally, the states of hotkeys can include normal (for enabled actions or functions), disabled (when an action or function is temporarily disabled), pressed (when selected by a user to command an action or function to be performed), and unavailable (when no association between the hotkey and an action or function is currently available). While examples of hotkey functions are discussed below, it is to be understood that these are not intended to be exhaustive or limiting examples.

The first hotkey 788, when selected in a first system state, can enable the user to assign, change, or edit a name of an input source. It is typically enabled only when the input source of HDMI, Comp/YPbPr (e.g., component video cables), video output, and VGA is in focus. When selected in a second system state, the first hotkey 788 can return the user to a top of a scrollable collection of objects, such as application icons.

The second hotkey 792 may show all or less. In other words, the hotkey 792 can allow the user to show all inputs, including the unconnected/undetected ones and to hide the unconnected/undetected inputs, e.g., to expand and collapse the silo/input list. Each input source can have one of two states, namely connected/detected and unconnected/undetected. Some input sources, including Live TV, video on demand, media center, and application center are always connected/detected.

Figure 9A:
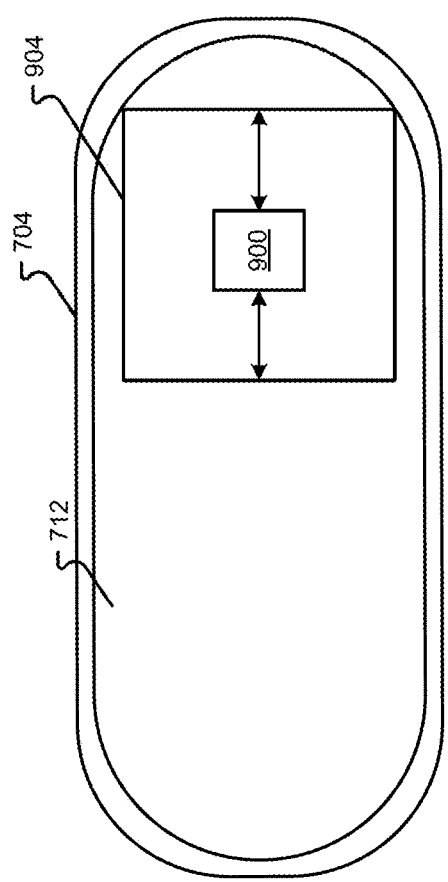
FIG. 9A is a bottom view of an embodiment of a remote control with a joystick in a neutral position.

The moveable joystick 900 on the bottom of the remote control 700, when manipulated, can cause a displayed image on the Intelligent TV 100 screen to be displaced a proportional amount. In other words, the displayed image is displaced substantially simultaneously with displacement of the joystick 900 within the joystick aperture 904 in the bottom housing 712 of the remote control. As shown in FIGS. 9B-C, the joystick 900 moves or slides between forward and reverse positions. Releasing the joystick 900 causes the joystick 900 to return to the center position of FIG. 9A, and the window to move or slide upwardly (when the joystick is released from the joystick position of FIG. 9B) or downwardly (when the joystick is released from the joystick position of FIG. 9C) until it disappears from view as shown in FIG. 11A. The effect on the screen of the Intelligent TV 100 is shown in FIGS. 11A-C. In FIG. 11A, video content, such as TV programming, a video, movie, and the like, is being displayed by front surface of the screen 212. In FIG. 11B, the joystick 900 is moved or slid to the upper position of FIG. 9B, and a drop down window or panel 1100 moves or slides down (at the substantially the same rate of joystick 900 movement) at the top of the screen 212. In FIG. 11C, the joystick 900 is moved or slid to the lower position of FIG. 9C, and a drop up window or panel 1100 moves or slides up (at the substantially the same rate of joystick 900 movement) at the bottom of the screen 212. The window 1100 partially covers the video content appearing on the remainder of the screen 212 and/or causes a portion of the screen 212 displaying video content to move and/or compress up or down the height of the window 1100.

The window 1100 can include one or more of information (which is typically information related to a currently displayed image and/or content (e.g., panel navigation bar, detailed information (e.g., title, date/time, audio/visual indicator, rating, and genre), and hotkey bar (defining current functional associations of hotkeys)), browse requests, and/or search requests. Commonly, the window 1100 includes suitable information about the content (such as name, duration, and/or remaining viewing duration of content), settings information, TV or system control information, application (activation) icons (such as for pre-installed and/or downloaded applications such as application center, media center and Web browser), and/or information about input source(s), When the joystick 900 is in either the forward or reverse position, the user can select an actuator on the front of the remote control, such as the OK button 764, and be taken, by displayed images on the screen 212, to another location in the user interface, such as a desktop. This process can be done in a nonintrusive manner and without affecting the flow of content that is pushed up or down. The joystick 900 could be moved, additionally or differently, from side-to-side to cause the window to appear at the left or right edge of the screen 212.

Figure 10:
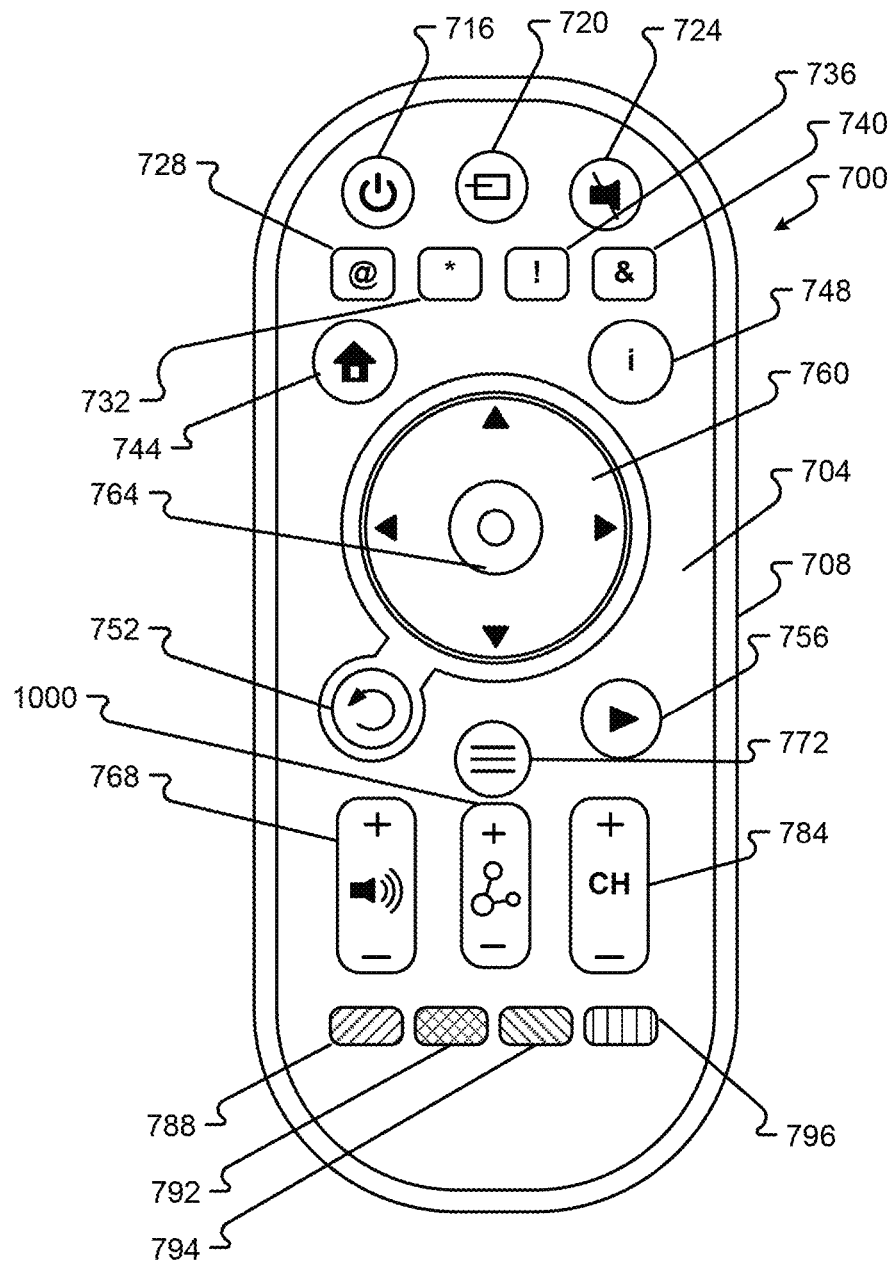
FIG. 10 is a plan view of another embodiment of a handheld remote control.

An alternative actuator configuration is shown in FIG. 10. The actuators are substantially the same as those of FIGS. 7-9 except that the social network button 1000, when selected, can automatically select content and publish, via a social network service or other social media, the content to a social network or online community. User or viewer comments and/or other messages can be included in the outbound message. For example, all or one or frames or portions of media content (such as a video, music, a photograph, a picture, or text) can be provided automatically to a predetermined or selected group of people via LinkedIn™, Myspace™, Twitter™, YouTube™, DailyMotion™, Facebook™, Google+™ or Second Life™. The user, upon activating the button 1000 could, in response, select a social forum or media upon which the selected content (which is the content displayed to the user when the social network button 1000 is activated) is to be posted and/or a predetermined group within that social media to which the content is to be posted. Alternatively, these selections could be preconfigured or preselected by the user.

The social network button can also be used to "turn up" or "turn down" a social volume visualization. The Intelligent TV 100 can create dynamically a visualization of aggregated connections (and inbound and/or outbound messages) from a variety of social networks. The aggregation (and inbound and outbound messages) can be depicted graphically on the screen as a volume of connections to influence the viewer user. With a social volume visualization, selected contents of each linked social network profile of a social contact (and inbound and/or outbound messages from or to the linked social network contact and/or current activity of the social contact (such as watching the same programming or content the viewer is currently watching) can be presented in a separate tile (or visually displayed object). The size of the tile can be related to any number of criteria, including a relationship of the linked social contact (e.g., a relative degree of importance or type of relationship can determine the relative size of the tile, a degree of influence of the linked social contact to the current viewer, a geographic proximity of the linked social contact to the current viewer, a degree to which the currently provided media content is of interest to both the viewer and linked social contact (e.g., both parties enjoy war movies, murder mysteries, musicals, comedies, and the like), an assigned ranking of the linked viewer by the viewer, a type of social network type linking the viewer with the linked social contact, a current activity of the social network contact (e.g., currently watching the same content that the viewer is currently watching), a current online or offline status of the linked social contact, and a social network grouping type or category to which both the viewer and linked social contact belong (e.g., work contact, best friend, family member, etc.).

The viewer can designate a portion of the screen to depict the social network aggregation. By turning the social volume up (+) or down (−), the viewer can increase the size and/or numbers of linked contact tiles provided to the viewer. In other words, by increasing the social volume the viewer can view, access, and/or push more social content from those of his or her social networks associated with him or her in a memory of the Intelligent TV. By decreasing the social volume, the viewer can view, access, and/or push less social content from his or her associated social networks. By selecting the mute button 724, the viewer can stop or pause any interactivity with his or her associated social networks (e.g., inbound or outbound messages). Social volume and/or mute can be separated into two (or more) volume settings for outbound and inbound social network activity. By way of illustration, a first volume setting, control, and/or button can control the volume for outbound social network activity (e.g., outbound social messages) while a second (different) volume setting, control, and/or button can control the volume for inbound social network activity (e.g., inbound social messages). By way of further illustration, a first mute setting, control, and/or button can stop or pause outbound social network activity (e.g., outbound social messages) while a second (different) mute setting, control, and/or button can stop or pause inbound social network activity (e.g., inbound social messages).

Figure 12:
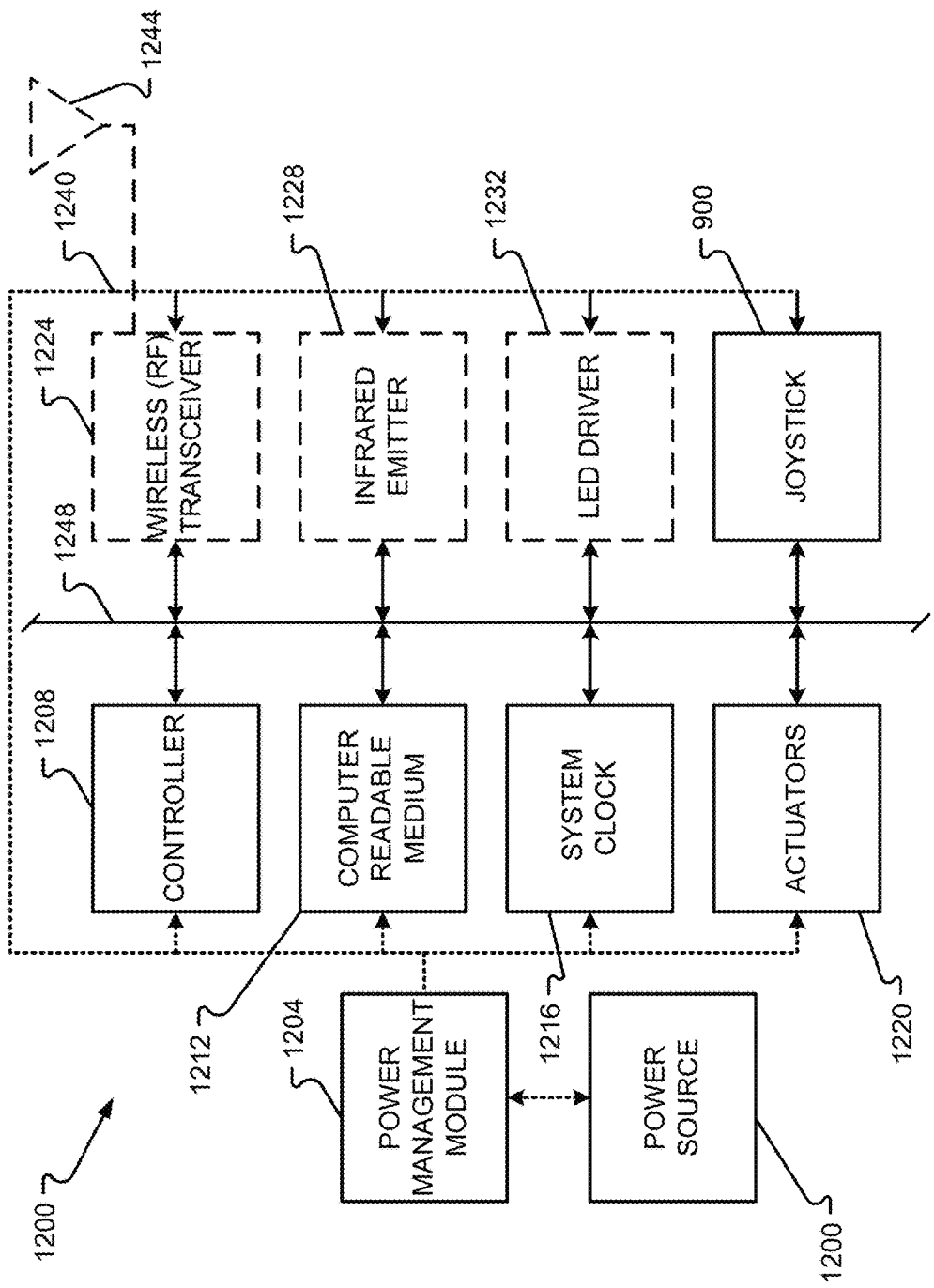
FIG. 12 is a block diagram of an embodiment of a handheld remote control of either FIG. 7 or 10.

A functional block diagram of the remote control is shown in FIG. 12. The remote control 700 includes a controller 1208 to control and supervise remote control operations, optional wireless (RF) transceiver 1224 and antenna 1244 to send and receive wireless signals to and from the Intelligent TV 100 and other external components, optional infrared emitter 1228 to emit infrared signals to the Intelligent TV 100, optional light emitting diode or LED driver 1232 to control LED operation to provide video-enabled feedback to the user, actuators 1220 (including the various buttons and other actuators discussed above in connection with FIGS. 7 and 10), and joystick 900, all interconnected via a bus 1248. An on board power source 1200 and power management module 1204 provide power to each of these components via power circuitry 1240. The infrared emitter 1228 and receiver (not shown) on the Intelligent TV system 100 can be used to determine a displayed object illuminated by the infrared signal and therefore adjust the displayed image, for example to indicate a focus of the user (e.g., illuminate a displayed object or show cursor position relative to displayed objects on the screen) and to determine and activate a desired command of the user. This can be done by tracking a position of the remote control in relation to infrared tracking reference points (e.g., a sensor bar or infrared LED's) positioned on or adjacent to the screen of the Intelligent TV 100. Motion tracking can further be augmented using position information received from a multi-axis gyroscope and/or accelerometer on board the remote control (not shown).

Figure 14:
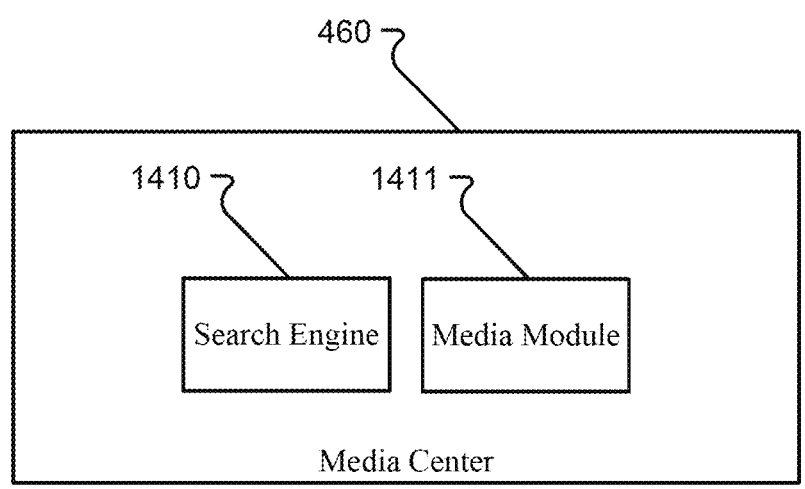
FIG. 14 is a diagram of a user interface for displaying a media center.

FIG. 14 is a diagram of a media center application 460. The media center application 460 comprises a search engine 1410 and a media module 1411. The search engine 1410 can be any hardware/software that can search devices for media, such as, files, networks, servers, social media sites, USB devices, disk drives, memories, and the like. The media that the search engine 1410 can search for can be any type of media, such as videos, photos, music, social media (i.e., a social media site), recordings, video calls, audio calls, text conversations, and the like. The media module 1411 can be any hardware/software that can process media, such as a Digital Signaling Processor (DSP), a media processor, an operating system, and/or the like.

The search engine 1410 searches a network (e.g., LAN 124, WLAN 128, the network 132, a combination of these, and the like) to identify media sources. A media source may be any type of device that can contain media. The search engine 1410 determines a number of media items (e.g., videos, music files, audio files, audio books, podcasts, photos, text media, live media (TV/Radio), media streams, and the like) associated with the media sources (e.g., Digital Media Library 148, devices 168, and the like). The search engine 1410 can search the network(s) in any manner. For example, the search engine 1410 can limit the search only to devices 168 that are connected to the WLAN 128 or the LAN 124. Alternatively, the search engine 1410 can search multiple networks, such as WLAN 128, a cellular network, the Internet, and/or the network 132.

The search engine 1410 can search devices 168 based on a profile. For example, a user may define a profile listing specific devices for the search engine 1410 to search. In other embodiments, the search engine may determine the device type. Based on the device type, the search engine 1410 may search the device 168 or not. For example, the search engine 1410 may search an audio device, such as an iPod™ when the iPod™ connects to WLAN 128. Alternatively, if the search engine 1410 determines that the device is a printer, the search engine 1410 may elect to not search the printer for media items. The search engine 1410 may only search for specific types of media items based on the device type. For example, if the search engine 1410 determines that the device 168 is a cellular phone with a camera, the search engine may only search the cell phone for photographs or videos.

The search engine 1410 can search the network in various ways, such as actively, periodically, upon detection of a device being added to the network, upon detection of a file being copied or moved, and/or the like. For example, the search engine 1410 can detect that a USB device (a media source) has been connected to a Personal Computer (PC) 168f that is connected to WLAN 128. Upon detecting that the USB device has been connected the to the PC, the search engine 1410 searches the USB device for media items, such as videos, music files, photos, text media, and/or the like.

The media sources can include a variety of devices. For example, the media sources may be a video server, an audio server, a Digital Video Recorder (DVR), a set-top box (external cable box 168g), a social media site, a voicemail server, a source marked by the user, a content provider, a Compact Disk (CD) player, a Digital Video Device (DVD)

player 168*a*, a blue ray player 168*b*, a cellular telephone, a smart phone 168*d*, a personal digital assistant, a notebook, an audio player, a document server, a Personal Computer (PC) 168*f*, a Really Simple Syndication (RSS) feed, a social media site, a USB device, a portable digital media device 168*c*, a tablet device 168*e*, an email server, an Instant Messaging device, a Tweet service, and/or the like.

The media module 1411 identifies metadata associated with the determined number of media items. The determined metadata may include a variety of information in a variety of formats. For example, the metadata may include information, such as a title, a length, a release date, an author, a composer, a list of actors and cast members, a rating, artwork associated with an album or video, a location of the media item, a genre, a director, a poster (the person who posted information on a blog site), a source of an audio recording, a person speaking on an audio recording, a caption, a caller name, and/or the like. The metadata can be in various formats, such as Extended Markup Language (XML), Hypertext Markup Language (HTML), text files, and/or the like. The metadata is stored in the memory 308.

The user interface 468 receives a request from a user to display one or more of the media items. The one or more media items are displayed to the user based on the stored metadata. The request to display the one or more media items can be accomplished in various ways, such as via a touch screen, a voice command, a gesture, a selection with a remote control device or mouse, and/or the like. The request to display the media items can be a request to display all the media items, a subset of the media items (e.g., only videos or photos), a specific media item, a grouping of media items (e.g., a series of a show, a photo album, or a grouping of blog posts on a specific subject), a combination of these, and/or the like.

The displayed media item(s) may be displayed to the user based on the metadata in various ways. For example, a video may be displayed using artwork associated with the video, a music file may be shown based on an artwork associated with an album, a photo may be displayed with a date taken, a blog posting may be shown with an author and/or date, a video recording may be displayed with a length, a voicemail may be shown with caller ID, an email may be shown with a date/sender, a music file may be shown with a device where the music file is located, a video game may be show with an artwork associated with a video game, and/or the like.

The user can optionally select an option to have a media item translated when accessed in the future. For example, the user can select that the next time a video is accessed that the video use subtitles or is translated to text or voice of another language.

Figure 15:
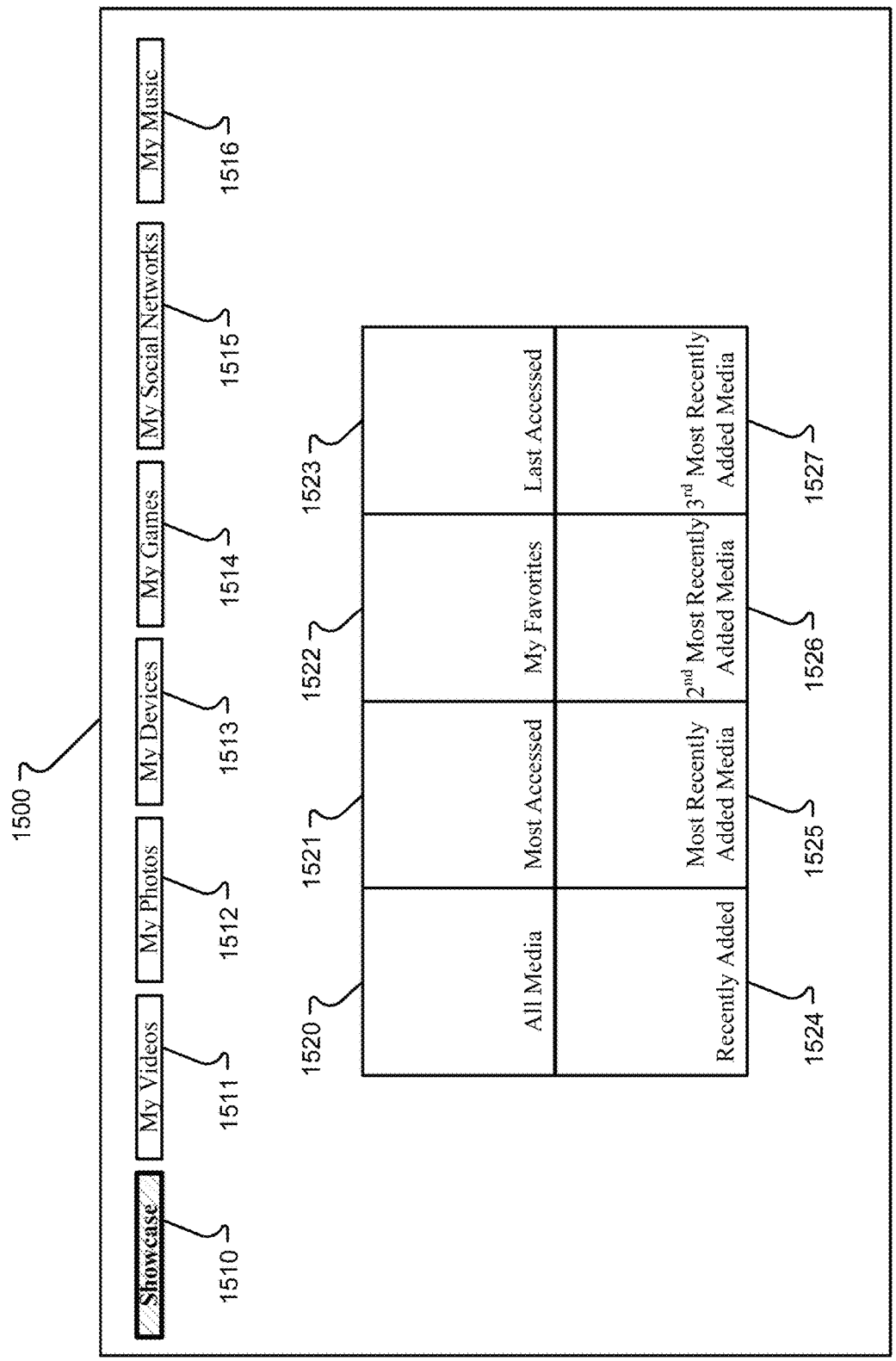
FIG. 15 is a diagram of a user interface for displaying a collection of media items.

FIG. 15 is a diagram of a user interface 1500 for displaying a media center application 460. The user interface 1500 for displaying the media center application 460 is one illustrative example of a way to show the media center application 460. However, one of skill in the art would recognize that there can be a variety of other ways that the media center application 460 can be displayed. The user interface 1500 comprises a showcase button 1510, a my videos button 1511, a my photos button 1512, a my devices button 1513, a my games button 1514, a my social networks button 1515, and a my music button 1516. In addition, the user interface 1500 includes an all media tile 1520, a most accessed tile 1521, a my favorites tile 1522, a last accessed tile 1523, a recently added tile 1524, a most recently added media tile 1525, a $2^{nd}$ most recently added media tile 1526, and a $3^{rd}$ most recently added media tile 1527.

The showcase button 1510 allows a user to view all the user's media items. In this example, the user has selected the showcase button 1510 (indicated by the grey highlight). When the user selects the showcase button 1510, the tiles 1520-1527 are shown. In this embodiment, all the tiles 1520-1527 are shown. However, in other embodiments, any number of the tiles 1520-1527 may be shown. The number of tiles shown can be based on a user or administrator configuration. The tiles 1520-1527 can show various types of lists, artwork, icons, and the like to allow the user to access the user's various media items.

Figure 16:
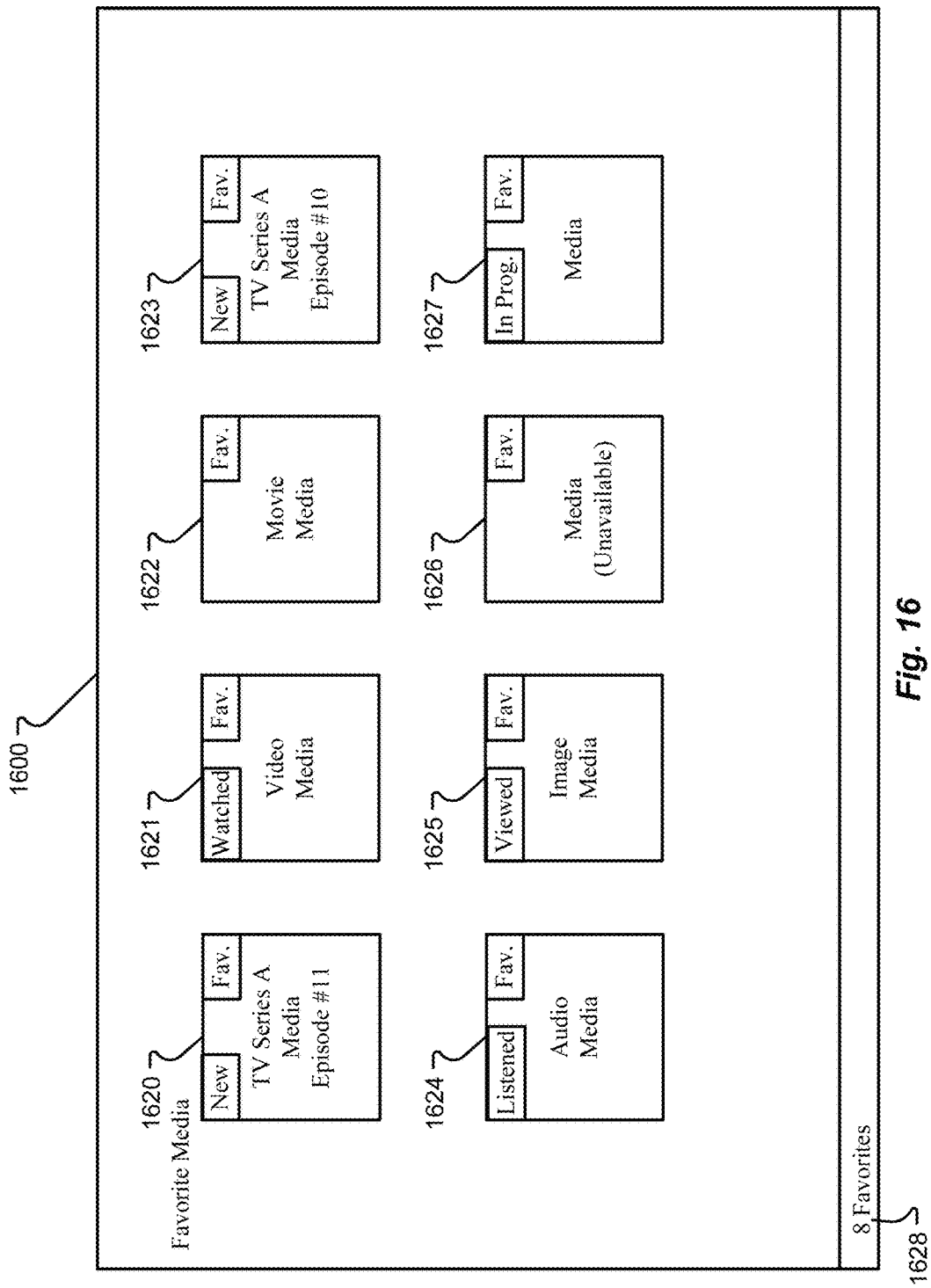
FIG. 16 is a diagram of a user interface for displaying favorite media items.

The user, by selecting the all media tile 1520, can view all the user's media items (video, voice, music, text, multimedia, etc.) that were determined by the search engine 1410 (i.e., using a similar view as shown in FIG. 16). By selecting the most accessed tile 1521, the user can view the most recently accessed media items (i.e., using a similar view as shown in FIG. 16). By selecting the my favorites tile 1522, the user can view the user's favorite media (i.e., using a view as shown in FIG. 16). By selecting the last accessed tile 1523 the user can view the last accessed media(s). In this example, the last accessed tile 1523 may show information associated with last accessed media item(s), such as artwork associated with the media, a text of a blog posting (or the blog site), and/or the like.

By selecting the recently added tile 1524, the user can view the most recently added media items (i.e., using a similar view as shown in FIG. 16). The recently added media items can be based on new media that the user copied to a device, a new device being add to the network, a new posting to a blog site, receiving a new voicemail, receiving an email, taking a picture with a device connected to the network, a user making a recording on a device connected to the network, receiving an attachment in an email, a recorded voice or video call, a live voice or video call, a detection of a start of a RSS feed or video feed, and/or the like.

The user, by selecting the most recently added media tile 1525 can view a list (or single media item) of the most recently added media items (i.e., using a similar view as shown in FIG. 16). Likewise, the user can select the second most recently added media tile 1526 and the $3^{rd}$ most recently added media tile 1527 to display a list (or single media item) of the second and third most recently added media items (i.e., using a similar view as shown in FIG. 16).

If the user selects the my videos button 1511, a similar view of user selectable tiles can be displayed. For example, an all videos tile, a most viewed tile, a my favorites tile, a last viewed tile, a recently added tile, a most recently added video tile, a $2^{nd}$ most recently added video and a $3^{rd}$ most recently added video tile can be displayed in a similar manner as shown in FIG. 15. A my movies tile may also be displayed.

If the user selects the my photos button 1512, a similar view of user selectable tiles can be displayed. For example, an all photo albums tile, a most viewed tile, a my favorites tile, a last viewed tile, a most recently added tile, a most recently added album tile, a $2^{nd}$ most recently added album and a $3^{rd}$ most recently added album tile can be displayed in a similar manner as shown in FIG. 15.

Figure 17:
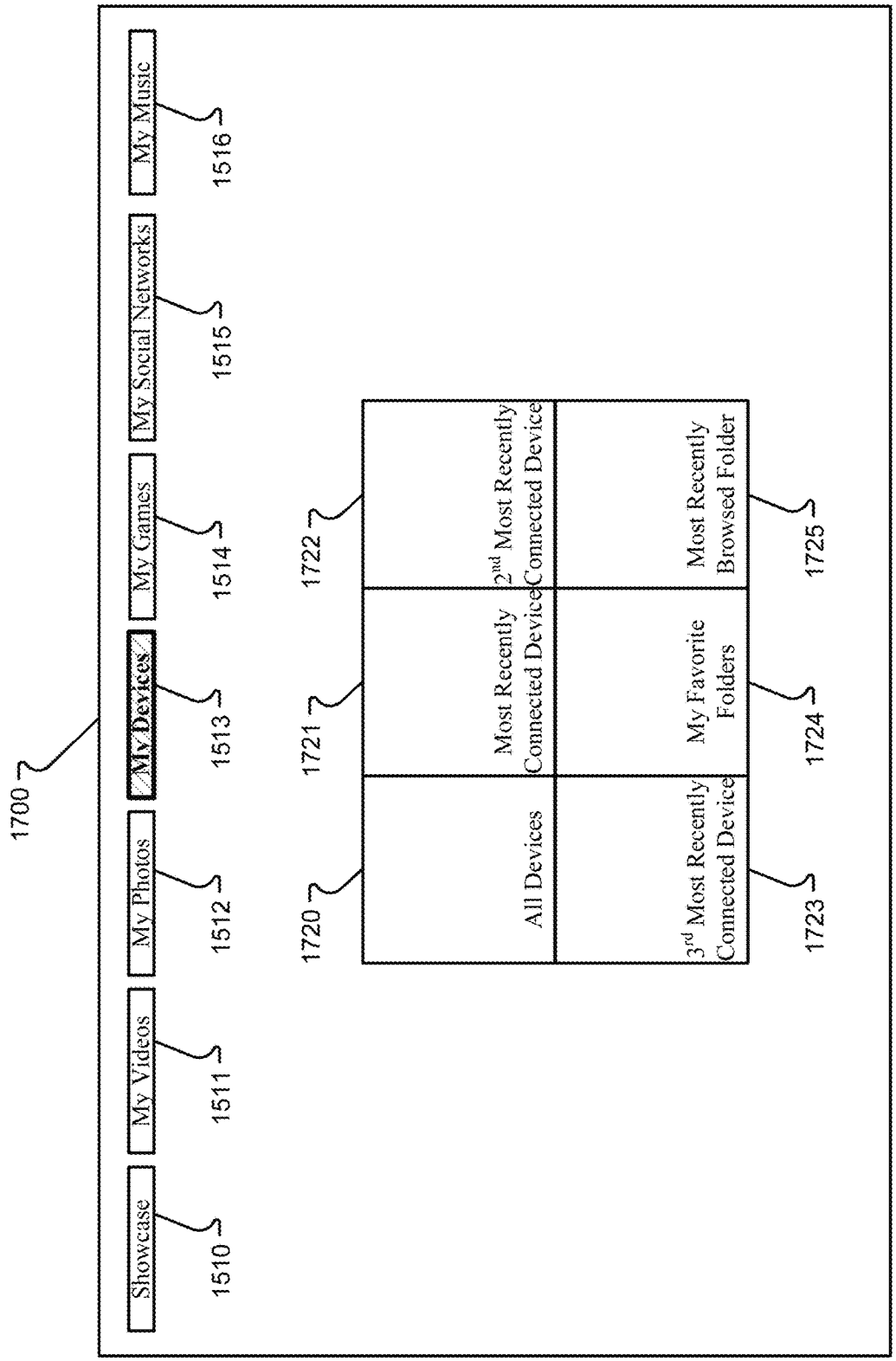
FIG. 17 is a diagram of a user interface for displaying a collection of devices in a media center.

If the user selects the my devices button 1513, a similar view of user selectable tiles can be displayed. For example, an all devices tile, a most recently connected device tile, a 2nd most recently connected device tile, a 3rd most recently connected device tile, a my favorites tile, and a most recently browsed tile can be displayed in a manner as shown in FIG. 17.

If the user selects the my games button 1514, a similar view of user selectable tiles can be displayed. For example, an all games tile, a most played tile, a my favorites tile, a last played tile, a most recently added tile, a most recently played tile, a $2^{nd}$ most recently played tile and a $3^{rd}$ most recently played tile can be displayed in a similar manner as shown in FIG. 15.

If the user selects the my social networks button 1515, a similar view of user selectable tiles can be displayed. For example, an all posts tile, a most posted tile, a my favorites tile, a most recently accessed tile, a most recently added tile, a most recently posted tile, a $2^{nd}$ most recently posted tile a $3^{rd}$ most recently added posted tile, a last viewed tile, and a recently added tile can be displayed in a similar manner as shown in FIG. 15. For example, selecting the most recently posted tile links (via a URL) the user to a recent posting by the user. Selecting the most recently added tile can link the user to the most recently accessed social media site. Selecting the my favorites tile can bring up a list of favorite social media sites or postings that the user can use to link to the site or posting. Selecting the recently added tile can bring up a list of newly added social media sites or postings that allows the user to link to the social media site or posting. Selecting the recently viewed tile can link the user to the last viewed social media site.

If the user selects the my music button 1516, a similar view of user selectable tiles can be displayed. For example, an all music tile, a most played tile, a my favorites tile, a last played tile, a most recently added tile, a most recently played tile, a $2^{nd}$ most recently played tile and a $3^{rd}$ most recently played tile can be displayed in a similar manner as shown in FIG. 15.

In another embodiment, other types of media can be accessed. For example, a button may be provided to access radio stations (e.g., accessed over the network 132), voicemail, email, instant messaging, instant messaging groups, tweets, and/or the like in a similar manner as shown in FIG. 15.

FIG. 16 is a diagram of a user interface 1600 for displaying a collection of media items. In this illustrative example, the user has selected the my favorites tile 1522 in FIG. 15 to display the user's favorite media as shown in user interface 1600. The user interface 1600 shows eight media items (1620-1627). However, the number of media items displayed can be any number, including zero media items. The media items 1620-1627 can be represented to the user in various ways. For example, the media items 1620-1627 can be based on an artwork of a video, artwork of music album, text of a posting on a blog, an icon of a voicemail system, and/or the like. The media items 1620-1627 can be ordered in various orders, such as based on alphabetical order, based on recently accessed, based on media type, and/or the like. The user interface 1600 may display a media count 1628 of the total number of media items in the collection.

The media items 1620-1627 in this example are media items that have been tagged by the user as favorites (also indicated by the Fav. box in each of the media items 1620-1627). The user can tag the media items 1620-1627 in various ways, such as by selecting the media item 1620-1627 to bring up an information panel (described below) that allows the user to tag the media item as a favorite media item. Alternatively, the user could add the media items 1620-1627 as favorites based on a gesture, a voice command, a selection from a menu, and/or the like.

In this example, media item 1621 is a video media item that was previously watched by the user. Media items 1620 and 1623 are new media items. Media item 1624 is an audio media item that has been listened to by the user (e.g., a podcast, a song, a recording, or audio book). Media item 1625 is a photograph that has been viewed. Media item 1626 is a media item that is unavailable. For example, the media item 1626 may be on a media device that is currently not connected to the network. Media item 1627 is a media item that is in progress. For example, the media item may be a live TV show, a live radio stream, or a media item that the user is currently viewing or listening to.

The media items can include additional information, such as a number of times watched, a number of times played, a number of times accessed, a freshness (i.e., a time since being added to the media center), and/or the like. The media items can be added on a temporary basis (e.g., a guest mode). For example, the media items 1620-1627 can be added only when the device is connected and removed when the device disconnects from the network. The guest mode can be used to connect a friend's device to the network to temporarily access the media items from the friend's device. This process may be controlled based on a user profile, based on the user indicating that the device is a temporary device, and/or defined rules.

If the user wants to view, play, and/or link to the media item, the user can select an individual media item. For example, the user can select the media item 1625 to view the video media item.

The user interface 1600 is shown using different media types. However, if the user had selected the my videos button 1511, a user interface with different tiles would be displayed as discussed above. If the user selected the my favorites tile (for videos), a similar user interface as shown in FIG. 15 would be displayed listing the user's favorite videos. Likewise, a similar user interface would be shown for photos, games, social networks, and music.

FIG. 17 is a diagram of a user interface 1700 for displaying a collection of devices in a media center. The user interface 1700 comprises the showcase button 1510, the my videos button 1511, the my photos button 1512, the my devices button 1513, the my games button 1514, the social networks button 1515, and the my music button 1516. In addition, the user interface 1700 comprises an all devices tile 1720, a most recently connected device tile 1721, a $2^{nd}$ most recently connected tile 1722, a $3^{rd}$ most recently connected device tile 1723, a my favorite folders tile 1724, and a most recently browsed folder 1725.

Figure 18:
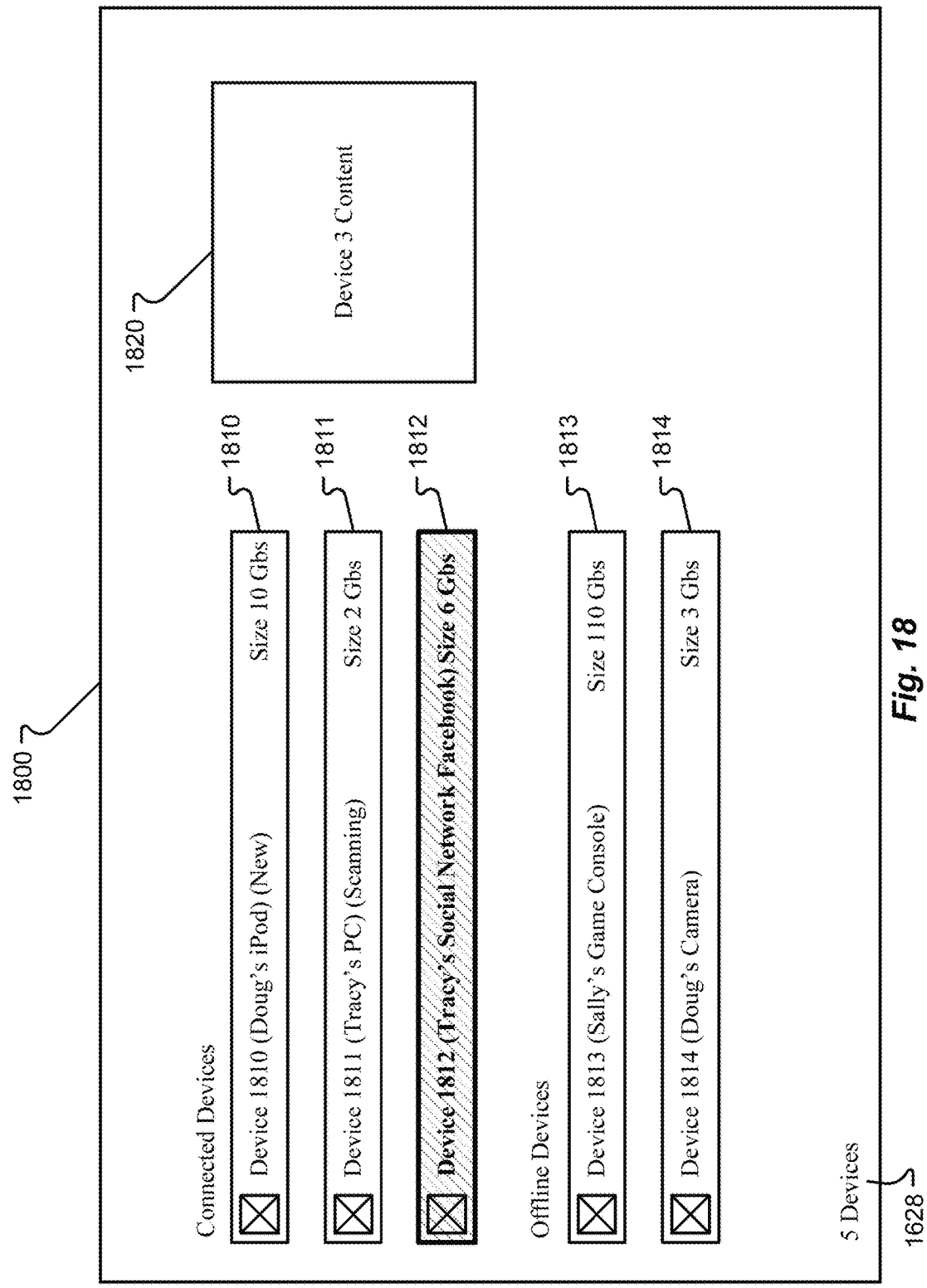
FIG. 18 is a diagram of a user interface for displaying a state of devices in a media center.

When the user selects the my devices button 1513 (as indicated by the grey color), the user is presented with the tiles 1720-1725. In this illustrative embodiment, six tiles 1720-1725 are shown. However, in other embodiments, more or less tiles may be shown. The all devices tile 1720 may contain a listing of all the devices that were searched. This can include devices that are currently connected, plugged in (e.g., a thumb drive) and devices that at one point in time were connected or plugged in, but no longer are connected/plugged in. The devices can be listed in various ways, such as by a list, icons, groupings, and/or the like. Alternatively, the user can select the all devices tile 1720 to display a list of all the devices 168 (i.e., as shown in FIG. 18).

The most recently connected device tile 1721 displays the most recently connected device. The user can select the most recently connected device tile 1721 to browse media items in the device 168. Likewise, the user can select the $2^{nd}$ most recently connected device tile 1722 and the $3^{rd}$ most recently connected device tile 1723 to access media items on the respective devices 168.

The my favorite folders tile 1724 displays a list of the user's favorite folders. The user can select folders from a list, from icons, and/or the like to bring the user's favorite folders. The user, in one embodiment, can add a folder to the favorites as the user browses folders in a device (e.g., folders in a PC or game console) using an information panel (described below).

The most recently browsed folder tile 1725 displays the most recently browsed folder. The user can select the most recently browsed folder tile 1725 to view the media items in the most recently browsed folder.

When a new device connects to the network the user can optionally approve the media source for searching and displaying. For example, if a new wireless scanner attaches to the WLAN 128 or the LAN 124, the user may be asked if this is a media source that the user wants searched.

FIG. 18 is a diagram of a user interface 1800 for displaying a state of devices in the media center application 460. In this embodiment, the user interface 1800 is displayed when the user selects the all devices tile 1720 in FIG. 17. However, in other embodiments, the user interface 1800 may be displayed differently. The user interface 1800 comprises a listing of connected devices 1810-1812, a list of offline devices 1813-1814, a device content tile 1820, and a media count 1628 of the total number of devices in the collection.

The connected device 1810 is a new device that was just recently connected to the network and scanned. In this example, the new device is an iPod™ owned by Doug. The connected device 1811 is also new and is in the process of being scanned for media items and metadata. The connected device 1811 is Tracy's PC. The connected device 1812 is a server at a social networking site (Facebook® in this example). The offline device 1813 is Sally's game console. The offline device 1814 is Doug's camera.

The user can select the connected devices to access the media items in the connected devices. In this example, the connected device 1812 has been selected (indicated by the grey color). When the user selects the connected device 1812 in this example, the device content tile displays posts of the user on Facebook®. The user can then browse the postings by selecting individual postings displayed in the device content tile 1820. In another embodiment, selecting the device content tile may display a separate user interface that allows the user to browse various media content in the device.

The user may select one of the offline devices 1813-1814. The metadata from the search is used to display the media items in the selected offline device. If the user sees a media item that the user wants to access, the user can connect the offline device to access the media item. For example, assume that the offline device is a blue ray player 168b that the user plays various movies on. The user, by selecting the offline blue ray player 168b can see the list of movies that the user has played in the blue ray player 168b. The user can power up the blue ray player 168b and insert one of the played movies (or a new movie). The offline blue ray player 168b will now show up in the list of connected devices. The user can select the now connected blue ray player 168b and select the device content tile 1820. When the user selects the device content tile 1820, the user can be presented with a list of all the movies that the user played in the blue ray player 168b. Only the inserted movie will be listed as available, while the other movies will be listed as unavailable. The available move can be displayed at the top of the list. The user can then select the inserted movie from the list to play the movie.

Figure 19:
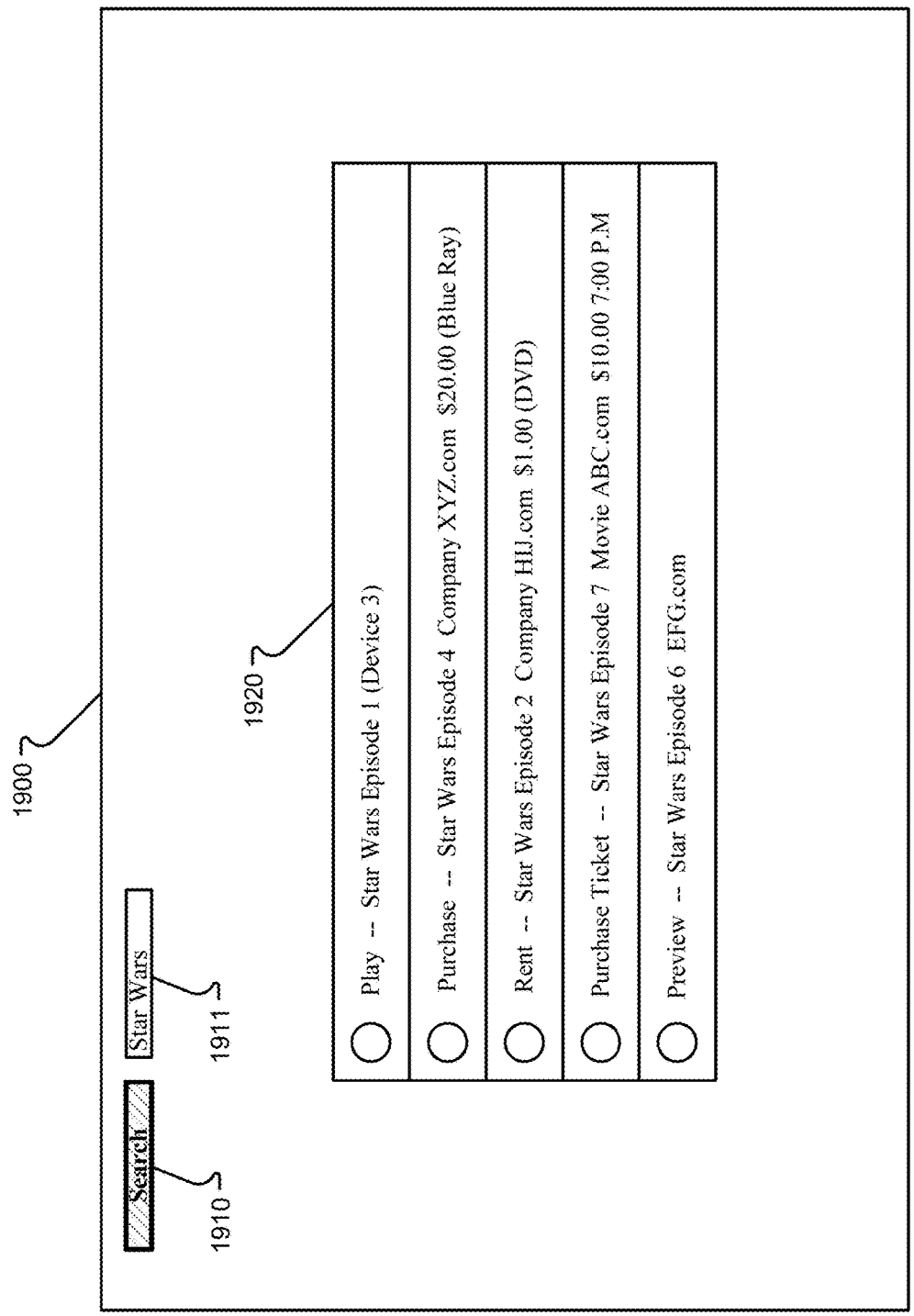
FIG. 19 is a diagram of a user interface for identifying media sources that have media items.

FIG. 19 is a diagram of a user interface 1900 for identifying media sources that have media items. The user interface 1900 comprises a search button 1910, a search field 1911, and a list of media items 1920. The list of media items 1920 is a list where the user may access the searched media item entered in the search field. If the user wants to find a specific media item, the user can enter the name of the search item (e.g., the term "Star Wars" in this example) in the search field 1911. The user can then select the search button 1910 to perform a search for possible locations of the media item entered in the search field 1911. In this example, the search engine 1410 has identified five options in the list of media items 1920 where the user can access the searched for media item. In this example, the search engine 1410 has identified that the user has a copy of Star Wars Episode 1 on device 3. The search engine 1410 has identified that the user can purchase a blue ray of Star Wars Episode 4 from Company XYZ at CompanyXYZ.com. The search engine 1410 has identified that the user can rent a DVD of Star Wars Episode 2 from Company HIJ at CompanyHIJ.com for $1.00. The search engine 1410 has identified that the user may purchase a ticket to Star Wars Episode 7 from the company MovieABC.com for $10.00 at 7:00 P.M. today. The search engine 1410 has identified that the user can preview Star Wars Episode 6 at EFG.com.

If the user selects the play offer, the system will play Star Wars Episode 1 from device 3. If the user selects the purchase offer, the user will be directed to the web site of Company XYZ to purchase Star Wars Episode 4. If the user selects the Rent offer, the user will be directed to the web site of Company HIJ to rent the video of Episode 2. If the user selects the purchase ticket offer, the user will be directed to the Movie ABC.com web site in order to purchase a ticket to Star Wars Episode 7. Likewise, if the user selects the preview offer, the user will be directed to the EFG.com website to preview Star Wars Episode 6.

Based on a type of the media item, the user may be offered various options. For example, the offer may be an offer to play the individual media item, an offer to view the individual media item, a pay per view offer to view the individual media item, an offer to rent the individual media item, an offer to purchase a ticket to a movie theater showing the individual media item, an offer to purchase the individual media item, a trial access offer to the individual media item, and an offer to access the individual media item on a social media site.

The user may optionally select which sites/devices (media sources) the search engine 1410 will search when doing a search for a media item. For example, the user may define the sites to purchase, rent and get movie tickets based on a preference. The list may be organized based on a user preference in a user profile.

When a media item has focus, a user may activate one or more media center panels to provide the user with more information about the media item or to locate other related media items. Media centre panels such as information panels, favorite panels, last viewed panels, most viewed panels, search panels, and new panels may be activated by the user depending on the type of media item with focus. The user may activate a panel through various commands, such as by moving focus to a media item displayed in the media center application 460 and then selecting media center button 736, touching the touch sensitive display screen 212, by speaking a voice command, by providing a gesture using the gesture capture regions 224, 228, by operating a pointing device 168i, and/or the like. The input event dispatcher 508 can receive the request from the user to activate a panel and, as discussed above, the input event dispatcher may then be sent the activation request to the panel manager 536 to display the panel on the screen of the Intelligent TV 100. After the user has activated a panel, the user may request a new panel type by navigating left or right using various commands.

Figure 21:
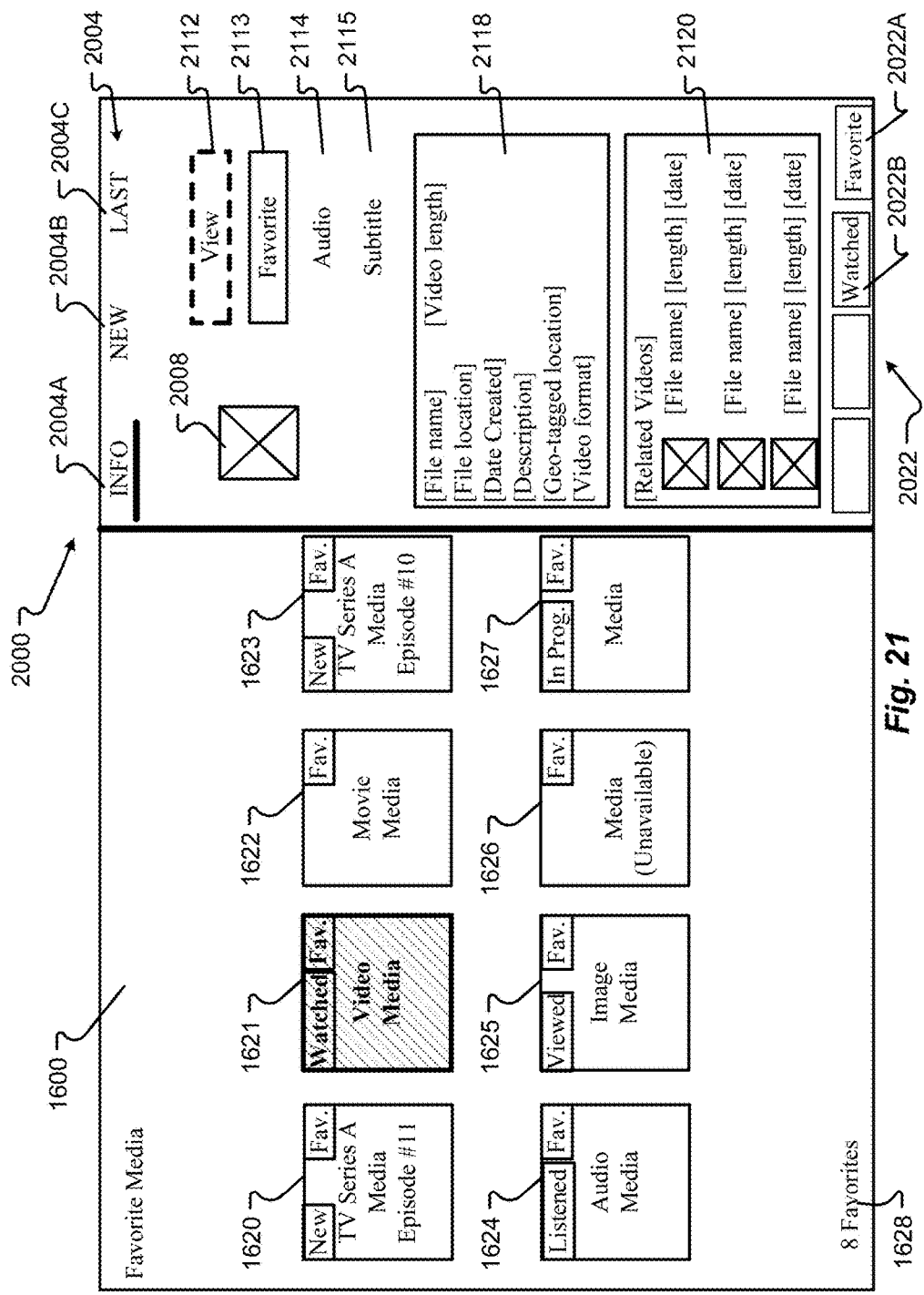
FIG. 21 is a visual representation of an embodiment of an information panel.

The panel manager 536 may display a media center panel without disrupting the active view of the Intelligent TV 100. That is, the panel may be displayed by the panel manager 536 in such a manner as to provide a user the ability to view the current content displayed by the Intelligent TV 100 and the requested panel. For example, the panel manager 536 may display the panel as translucent in nature such that the content displayed by the Intelligent TV 100 is displayed (i.e., still viewable to a user) behind the panel 2000. In some embodiments, the panel manager 536 may compress the current content when the panel manager displays the panel so that the current content remains visible as illustrated in FIG. 21. If the current content is a movie or television program that is playing or running when the panel is activated, the current content may continue to play or run as the user navigates the panel.

Figure 20:
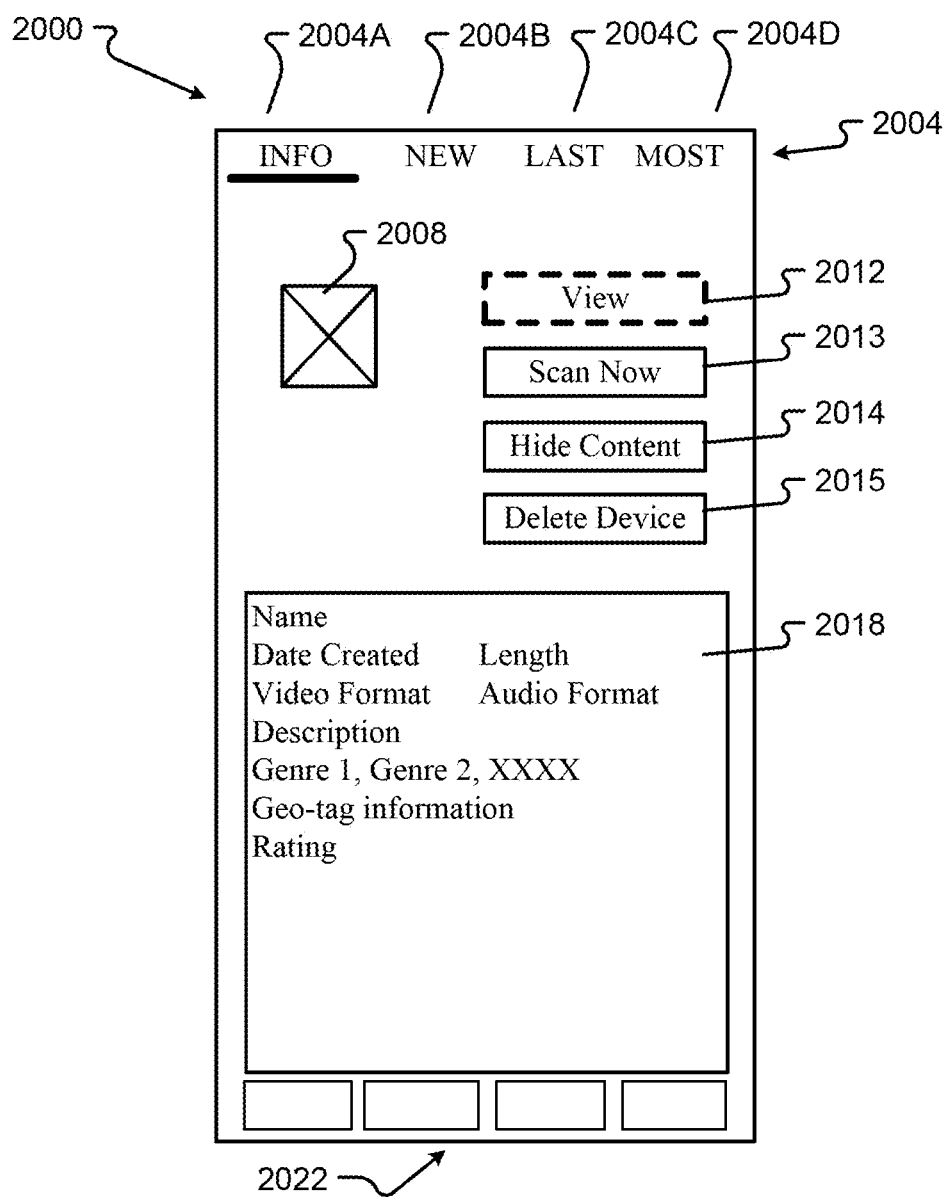
FIG. 20 is a visual representation of an embodiment of a media center panel.

Referring now to FIG. 20, an exemplary view of an information panel 2000 in accordance with embodiments of the present disclosure is illustrated. The information displayed and organization of the information panel 2000 may change depending on the type of media that has focus when the information panel 2000 is launched. For example, the information panel 2000 may present more or less media information and different types of media information when photos, photo albums, videos, movies, TV episodes or series, storage devices, media folders, or content collections have focus when the information panel 2000 is launched. The panel manager 536 may also change the arrangement and organization of the information panel 2000 depending upon whether a media item is running or not running.

The information panel 2000 may include a navigation bar 2004 with one or more tabs to indicated other types of media center panels a user can activate. In this example, tabs for media center panel types "Information" 2004A, "New" 2004B, "Last" 2004C, and "Most" 2004D are displayed. However, FIG. 20 illustrates just one example of a navigation bar 2004 and in some embodiments, and for some media types, a navigation bar may have more tabs and may have different tabs corresponding to other media center panel types that may be activated by the user for the media type. For example, tabs for "Favorite" panels, "Last Viewed" panels, and "Search" media center panels, may be displayed by the navigation bar 2004. The tabs may also be arranged in different orders and different combinations than illustrated in the figures.

The information panel may include a thumbnail 2008 or icon. The thumbnail or icon may represent the media item that had focus when the user activated the information panel 2000 and may be retrieved from the thumbnail database 668 by the panel manager 536 or memory 308.

The information panel 2000 may have one or more action buttons 2012-2015 depending upon the type of media item which had focus when the user activated the information panel. The action buttons may be used by navigating focus to one of the action buttons and pressing the select button 764 on the remote control. This is illustrated in FIG. 20 where focus has been navigated to the action button "View" 2012 as indicated by the dashed box. In some embodiments, when the information panel 2000 is activated, the "View" action button 2012 may have initial focus.

An information area 2018 may be displayed by the information panel 2000 to display information about the media item with focus. As will be appreciated, the information displayed in the information area 2018 may change depending on the type of media item that had focus when the user activated the information panel 2000. For example, if the media item is a movie, the information area 2018 may display information such as a name of the movie, a director, a list of cast members, a review of the movie, one or more genres, a list of awards won by the movie, etc. If the media item is a photo, the information area 2018 may display information such as a camera type, a lens type, a focal length, an F-stop, an exposure, a date taken, etc.

The information panel 2000 may also display one or more hot keys 2022. The number and functionality of the hot keys 2022 for different media types.

The user may dismiss the information panel 2000 by selecting the back button 752 of the remote control, by speaking a voice command, by providing a gesture using the gesture capture regions 224, 228, by operating a pointing device 168i, and/or the like.

FIG. 21 illustrates an information panel 2000 that may be displayed when a video media item is in focus. In this illustrative example, the user has activated the information panel 2000 after navigating focus to the video media item 1621 of user interface 1600. The user interface 1600 has been compressed by the panel manager 536 to display the information panel 2000 without disrupting the information displayed by user interface 1600.

The navigation bar 2004 displays the tabs "INFO" 2004A, "NEW" 2004B, and "LAST" 2004C. The user may use the left and right button of the D-Pad of the remote control to navigate to different panel types corresponding to the tabs displayed by the navigation bar 2004. As the user navigates focus between tabs displayed in the navigation bar 2004, more tabs may be displayed as will be discussed below. The "INFO" 2004A tab is underlined to indicate that an information panel 2000 is currently displayed.

The information panel 2000 displayed when a video media item has focus may display a thumbnail 2008 of the media item.

For a non-active video, the action buttons "View" 2112 and "Favorite" 2113 may be displayed. Selecting the "View" 2112 button may dismiss the information panel 2000 and cause the Intelligent TV to display video 1621 on the screen. Selecting the "Favorite" 2113 button may mark a video as a favorite if it is not already marked as a favorite. If the video is already marked as a favorite, selecting button 2113 will remove the video from the favorites list. In the example of FIG. 21, selecting button 2113 will remove video 1621 from the favorites list.

Different action buttons may be displayed or receive focus if the video media item is active when the information panel 2000 is activated. For example, because the video 1621 was not active when the information panel 2000 was activated, action buttons that are not normally displayed or may not receive focus for a non-active video media item are illustrated in FIG. 21 as words without a box. When a video media item is active when the information panel 2000 is activated, the "Favorite" button 2113 and an "Audio" button 2114 and a "Subtitle" button 2115 may be displayed and may receive focus. The "View" button 2112 may not receive focus for an active video. The "Audio" button 2114 may be displayed if there are multiple audio tracks associated with the video that the user can select. When there are multiple audio tracks and the "Audio" button 2114 is selected, a list of audio tracks that are available will be displayed and the user may make a selection of a desired audio track to play with the video. If there are more than three audio tracks available for the user to select, the information panel may display a scrollable list of the audio tracks and the user may navigate through the list using the up and down buttons of the D-Pad. If subtitles in one or more language are available for an active video, the "Subtitle" button 2115 may be displayed. When a user selects the "Subtitle" button 2115, a list of available subtitle languages is presented to the user and may include an option to turn subtitles off. If there are more than three subtitle tracks or options available, the list of tracks may be scrollable. In some embodiments, a default subtitle setting is "subtitles off" and the user may turn on a subtitle by navigating to a listed subtitle language option and selecting a desired subtitle language.

Information area 2118 may display metadata related to video 1621 media item identified by the search engine 1410. Information such as a file name, a file size, a file location, a date created, a video length, a long description, a short description, a number of times watched, a date last watched, a location, an audio format, a list of subtitle languages available, a parental rating, one or more genres, a studio, a director, a cast list, a reviewer's rating, a user's rating, a parental rating, a time of progress for in-progress videos, a video format, and other metadata associated with the media item located by the media module 1411 may be provided. The file location may display a full path to the video including the name of the device the file is stored on and a folder and/or subfolders. The date created may be a date the video was created. In some embodiments, other date information may be displayed such as the date the video was first indexed by the search engine 1410. The video length may display a length of the video in minutes. The description and the short description may be the description tag from the video's metadata if available. If a description is not available, a description may not be displayed. The location may display a geo-tagged location of where the video was created, if available. The geo-tagged location may be coordinates or may be a location, such as "Central Park" or "Denver." A video format may also be displayed to describe a resolution of the video.

The information panel 2000 may display a list 2120 of one or more related videos identified by the search engine 1410. The list may include thumbnails of the one or more related videos and information about the videos such as a file name, a length, and a date the video was created. More information may be provided about the related videos as determined by the user in a settings panel 524. In one embodiment, the videos in the list 2120 of one or more related videos may be from the same folder as video 1621 and selected by the panel manager 536 based on a creation date closest to the creation date of video 1621. In another embodiment, a user may use the settings panel 524 to set criteria the panel manger 536 may use to select videos to display in the list 2120. In another embodiment, the list 2120 may include media items not stored on the Intelligent TV. In this embodiment, the data service 632 may provide electronic programming guide data retrieved from the electronic program guide database 636, and/or obtained by the electronic program guide subservice 624 from a content provider 616 and/or from an electronic program guide source plug-in 648. The list 2120 of one or more related videos may also display media items that the search engine has identified that the user may purchase or rent from one or more content providers as illustrated by FIG. 19. If a user selects a related media item available from the one or more content providers, the user will be connected with the content provider to rent or purchase the selected media item and then the Intelligent TV will display the selected media item.

A user can navigate focus to a related video and select a related video to activate a new information panel 2000 with information about the related video that had focus. If a user presses the play button on the remote control when focus is on a related video, the panel manager 536 may dismiss the information panel 2000 and launch the related video.

One or more hot keys 2022 may be displayed in the information panel 2000, including a "Favorite" hot key 2022A and a "Watched" hot key 2022B. The "Favorite" 2022A hot key has the same functionality as the "Favorite" button 2113 described above. Selecting the "Watched" hot key 2022B may toggle a status for a video between "Watched" and "Not Watched." Because the video 1621 already has a status of "Watched," selecting the "Watched" hot key 2022B will change the status to "Not Watched" and may remove the "Watched" icon from user interface 1600 for media item 1621.

A user may dismiss the information panel 2000 by pressing the back button of the remote control. In the example illustrated in FIG. 21, pressing the back button will return the user to user interface 1600.

Figure 22:
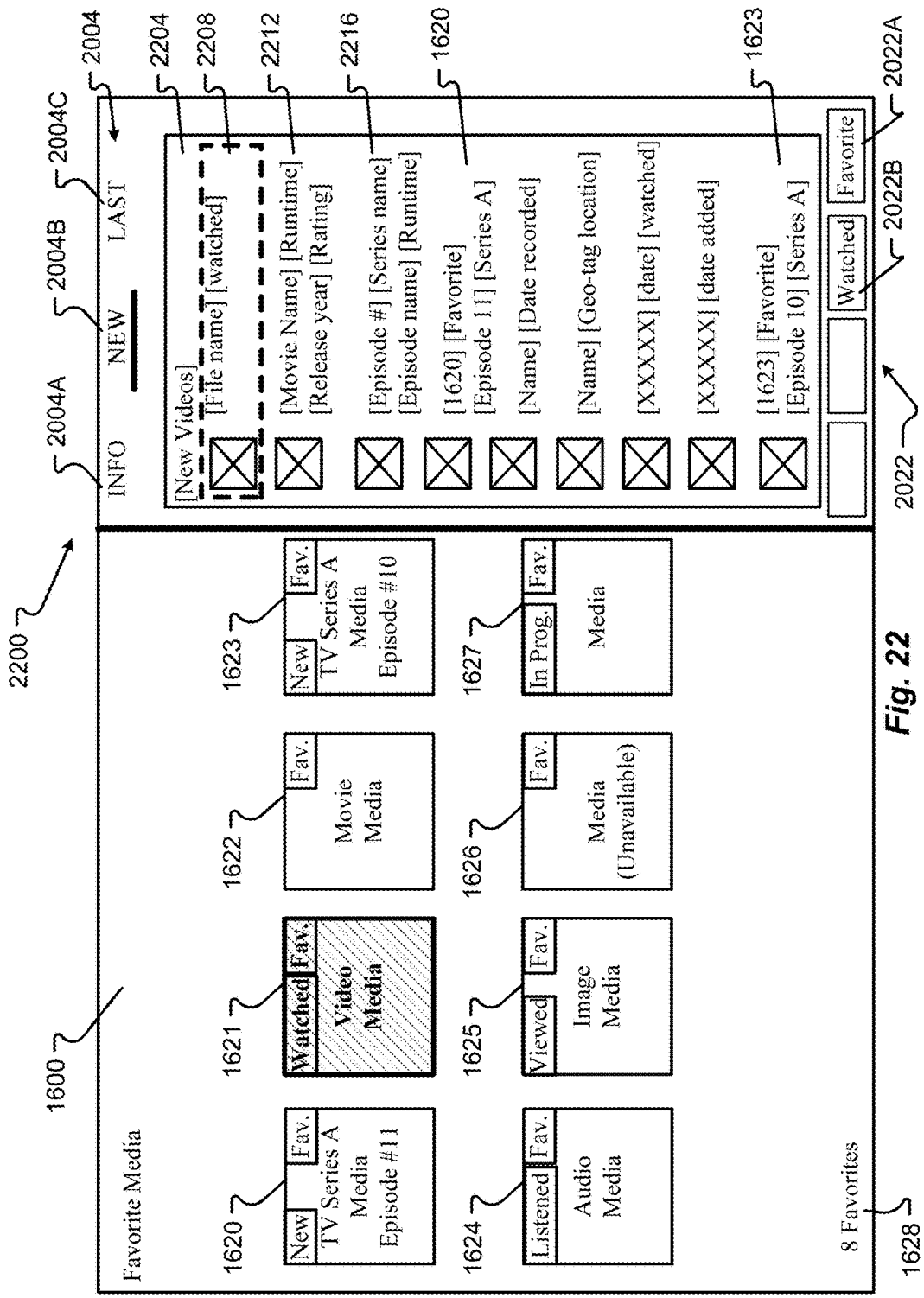
FIG. 22 is a visual representation of an embodiment of a new panel.

If a user navigates right using, for example, the D-Pad, a hand gesture, or a voice command, a new panel 2200 may be displayed as illustrated in FIG. 22. The new panel 2200 may display a navigation bar 2004 with one or more tabs. In this example, the "New" tab 2004B is underlined to indicate that a new panel 2200 is displayed. The new panel 2200 may display a list 2204 of one or more new videos. The videos may be the videos most recently found by the search engine 1410. The list 2204 may include movies 2212 and TV episodes 2216 as well as video files 2208 of all other types. The video most recently indexed by the search engine 1410 may be displayed at the top of list 2204 and may have an initial focus as indicated in FIG. 22 by the dashed box around video 2208. Video items 1620 and 1623 are included in the list because they are tagged as new items in user interface 1600. Video 1620 is positioned higher in the list than video 1623 to indicate that video 1620 was added to media center application 460 more recently than video 1623. Videos 1620, 1623 may be two individual episodes, episodes 11 and 10, of a series "A" that has been marked as a favorite and set to record all episodes automatically.

The list 2204 may include information about each video displayed. For example, the list may include a file name, a length, a date created, a movie name, a runtime, a release year, a rating, an episode number, a series name, an episode name, a date recorded, a geo-tag location, a date added, or other metadata indentified by the media module 1411 and stored in memory 308, and may include any type of information displayed in area 2118 described in FIG. 21.

The user may navigate focus up and down within the list 2204 using the D-Pad of the remote control. Selecting a video item with focus may activate an information panel 2000 for the item with focus. For example, if a user presses the select button 764 while focus is on video 2208, an information panel 2000 may be displayed in a similar manner as shown in FIG. 21 to provide more detailed information about video 2208. The user may also press the play button 756 on the remote control when a video displayed in the list 2204 has focus and the new panel 2200 may be dismissed and the video with focus may be played.

The new panel 2200 may also include one or more hot keys 2022. In the example of FIG. 22, a "Watched" hot key 2022B and a "Favorite" hot key 2022A are illustrated. Hot keys 2022A and 2022B have the same functionality as described in conjunction with FIG. 21 for videos that have focus. For example, pressing the hot key of the remote control that corresponds to the "Watched" hot key 2022B while video 2208 has focus may remove the watched tag from video 2208.

Although nine media items are displayed in list 2204, more or fewer media items may be displayed. For example, the Intelligent TV can establish a default number of 10 new media items to display in the list 2204; however, the user can change this default number in the settings panel 524 to increase or decrease the number of new media items that may be displayed. The list may be scrollable if the list 2204 includes a large number of new media items.

The user may use the settings panel 524 to change the criteria used by the panel manager to select new media items to display in the new panel 2200. For example, the user can select a maximum age so that media items older than the maximum age may not be displayed in the list 2204. The user may also select other criteria that may be used to add or remove media items from the list. In one embodiment, the user may select a setting so that media items that are marked as "Watched" or marked as "Favorite" may or may not be displayed in the list 2204. The user may also select a setting to limit the types of media items that will be displayed in the list 2204 to include, or exclude, a certain type of media items, such as videos with a certain parental rating, videos in certain languages, videos below or above a certain user rating, etc.

Figure 23:
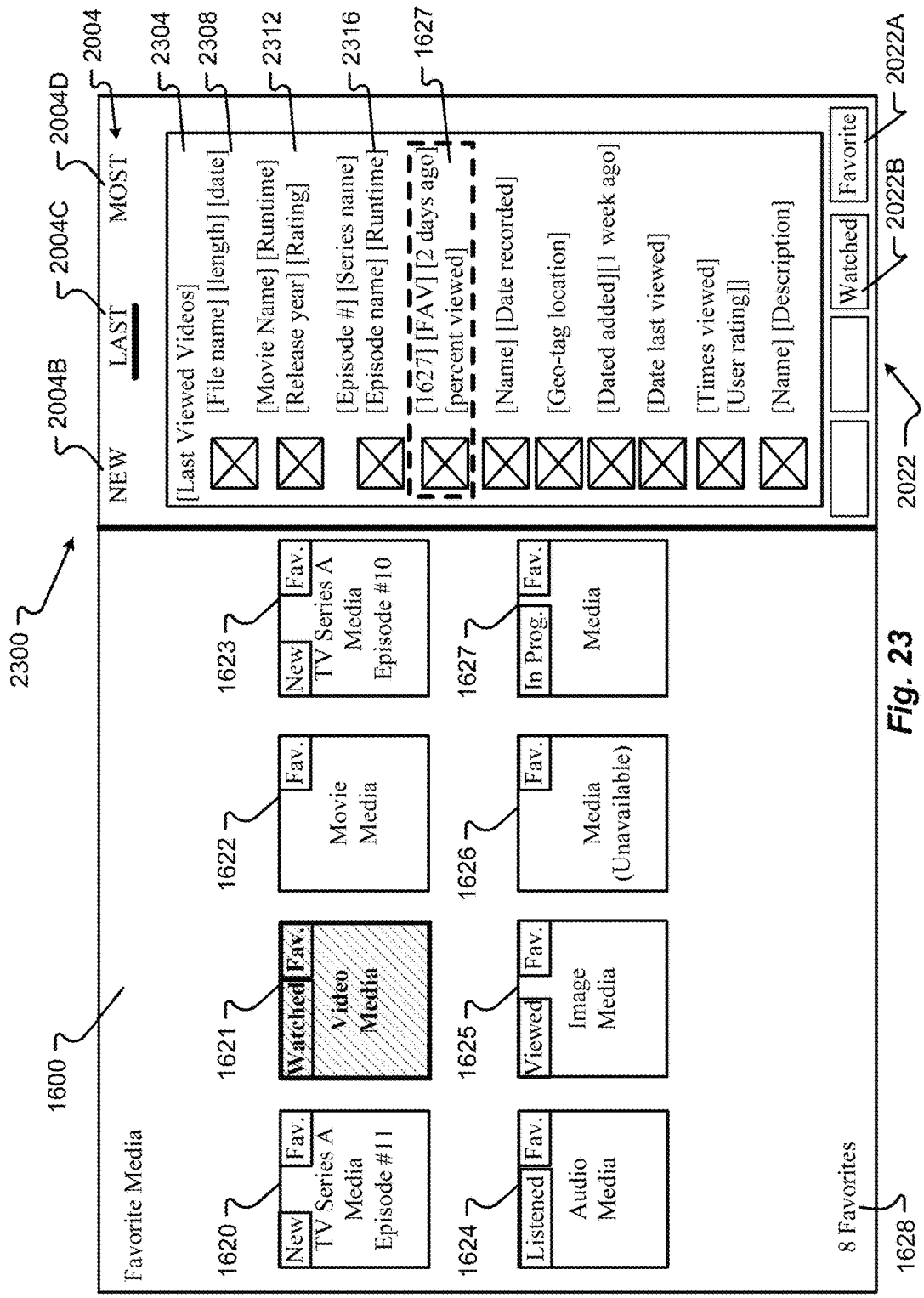
FIG. 23 is a visual representation of an embodiment of a last viewed panel.

A user may dismiss the new panel 2200 by pressing the back button 752 on the remote control. The user may also return to the information panel 2000 by navigating left or may activate a last viewed panel 2300 by navigating right. FIG. 23 illustrates an example of a last viewed panel 2300 that may be displayed for a video media item.

The last viewed panel 2300 may display a navigation bar 2004 with one or more tabs. The list of tabs has scrolled to the left compared to FIG. 22 and the "Information" tab 2004A is no longer visible and a new "Most" tab 2004D is visible. The "Last" tab 2004C may be underlined or otherwise highlighted to indicate that a last viewed panel 2300 is displayed.

The last viewed panel 2300 may display a list 2304 of one or more recently viewed videos. The videos selected by the panel manager 536 to display in list 2304 may be the most recently watched videos based on metadata collected by the media module 1411 and stored in memory 308.

As discussed above in connection with FIGS. 2A-2D, the Intelligent TV 100 may recognize individual users by using the microphone 220, gesture capture regions 224, 228, image capture devices 232, and the range finding device 240. If a user is using a smart phone or other connected device to control the Intelligent TV, the connected device may identify the individual user. Users may also login or otherwise sign in to identify themselves to be recognized by the Intelligent TV 100.

When the Intelligent TV 100 recognizes an individual user, the metadata stored in memory may include information specific to recognized individual users. For example, the media center application 460 may store metadata for each recognized user to customize all media center panels for a recognized user. Lists, such as favorites lists, last viewed lists, most viewed lists, and searches performed by individual recognized users may display information specific to the recognized user. When an individual is recognized, the last viewed list 2304 may be a list of the videos most recently viewed by the recognized user.

The list 2204 may include all types of video media including movies 2312 and TV episodes 2316 as well as any other video file 2308. The most recently viewed video may be displayed at the top of list 2304 and may have an initial focus; however, in the example of FIG. 23, the user has navigated focus down to video item 1627 as indicated by the dashed box around video 1627. Video item 1627 is included in list 2304 because it was recently viewed. Media item 1625 is tagged as "viewed" in user interface 1600 but is not included in list 2304 because item 1625 is a picture file. Video item 1621 may not be included in the list 2304 although it is tagged as "Watched" because it may not have been watched within the time period used by the panel manager 536 to select media items for display in the list.

The list 2304 may include information about each video displayed in a manner similar to list 2204 described in conjunction with FIG. 22. List 2304 may also include additional information such as a date last viewed, a number of times viewed, a percent viewed or progress for videos in progress such as video 1627, or other metadata stored in memory 308.

A default number of 10 recently viewed videos may be displayed in the list 2304. However, list 2304 may display more or fewer recently viewed videos and a default may be changed by a user in a manner similar to list 2204 using the settings panel 524. The list 2304 may also be scrollable if the list 2304 includes a large number of videos.

A user may also use the settings panel 524 to change the default criteria the panel manager 536 uses to select videos to display in list 2304 in a similar manner as described in conjunction with FIG. 22. For example, a user may select an option that prohibits videos with a user rating below a certain level from being displayed in list 2304. For example, a user may select an option such that videos with a rating of "1" out of "5" are not displayed. A user may also select an option that filters videos by a language, parental rating, and/or length. These are just a few examples and those of skill in the art will recognize that other criteria may be selected by a user to further filter the list of videos displayed in list 2304.

A user may navigate focus up and down within the list 2304 using the D-Pad and select videos displayed in a similar manner as described in FIG. 22. Selecting a video item with focus may activate an information panel 2000 for the item with focus. The user may also press the play button 756 on the remote control when a video displayed in the list 2304 has focus to dismiss the last viewed panel 2300 and play the video with focus.

The last viewed panel 2300 may also include one or more hot keys 2022. Two hot keys 2022A and 2022B are illustrated in FIG. 23 and have the same functionality for videos in list 2304 with focus as described in FIG. 22. For example, selecting the "Favorite" hot key 2022A while video 1627 has focus will remove video 1627 from the favorite media list.

Figure 24:
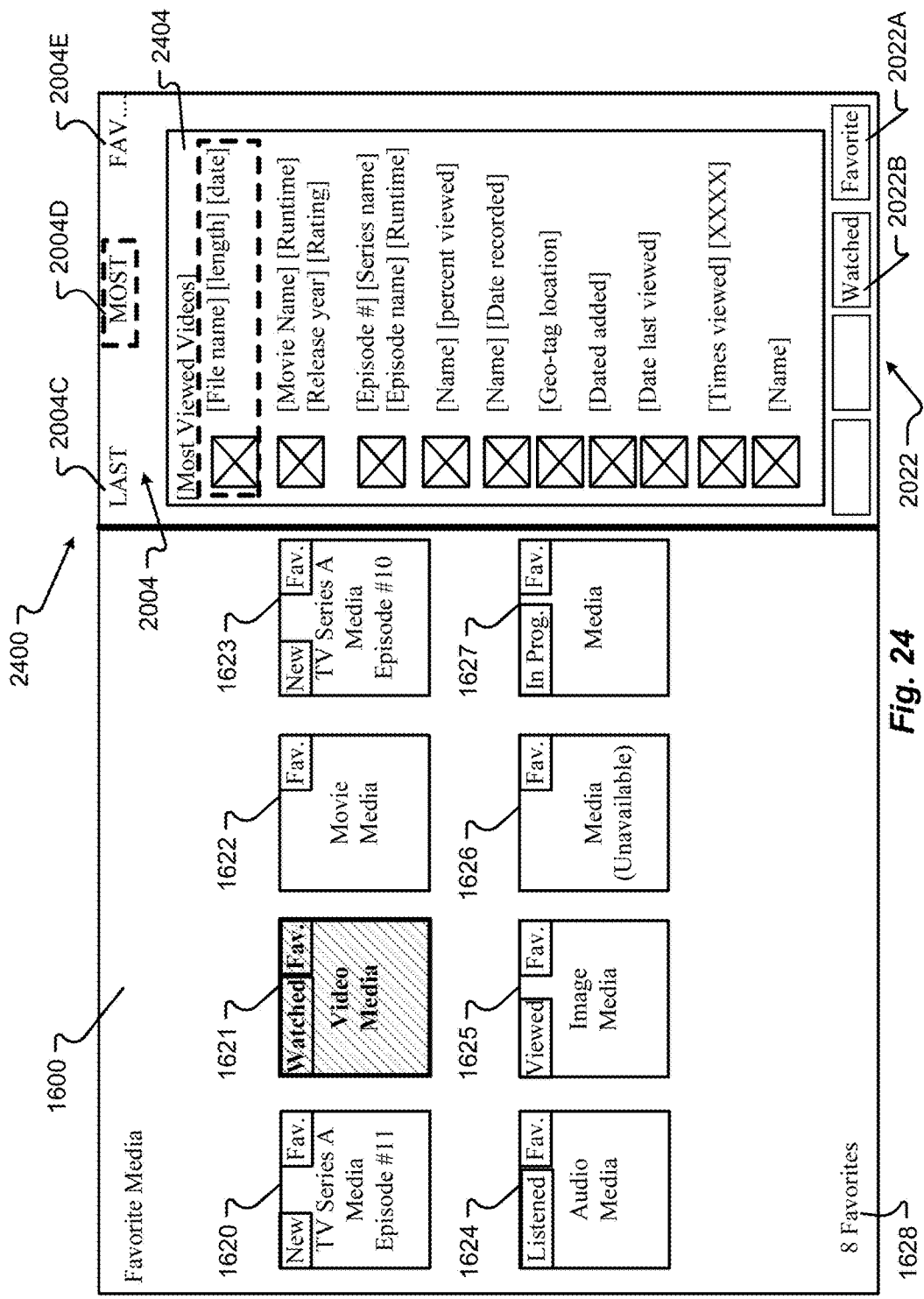
FIG. 24 is a visual representation of an embodiment of a most viewed panel.

When a last viewed panel 2300 is active, the user may activate a most viewed panel 2400 by navigating right using the D-Pad or other means such as by speaking a voice command, by gesturing to the right, or by using a pointer connected to the Intelligent TV. An example of a most viewed panel 2400 is illustrated in FIG. 24. A navigation bar 2004 may be displayed and FIG. 24 illustrates an example where the list of tabs has scrolled to the left compared to FIG. 23. In this example, the "Most" tab 2004D is highlighted with a dashed box to indicate illustrate another means of showing the type of active panel displayed. A "Favorite" tab 2004E is partially displayed.

The most viewed panel 2400 may display a list 2404 of one or more videos of all types (such as video files, movies, or television episodes) that have been most frequently viewed by a user based on metadata collected by the media module 1411. The order of list 2404 and information displayed about videos in list 2404 is similar to the lists 2204 and 2304. A most viewed video may be displayed at the top of the list. A user may navigate focus up and down in the list 2404. A user may change default settings to increase or decrease the number of videos displayed in list 2404. The user may also change settings to increase or decrease the amount and type of information displayed about each video and may modify criteria used to select videos to display in list 2404, including adding or removing filter criteria such as a user rating, language, video format, etc.

One or more hot keys 2022 may be displayed and have the functionality described in conjunction with FIGS. 21-23.

Figure 25:
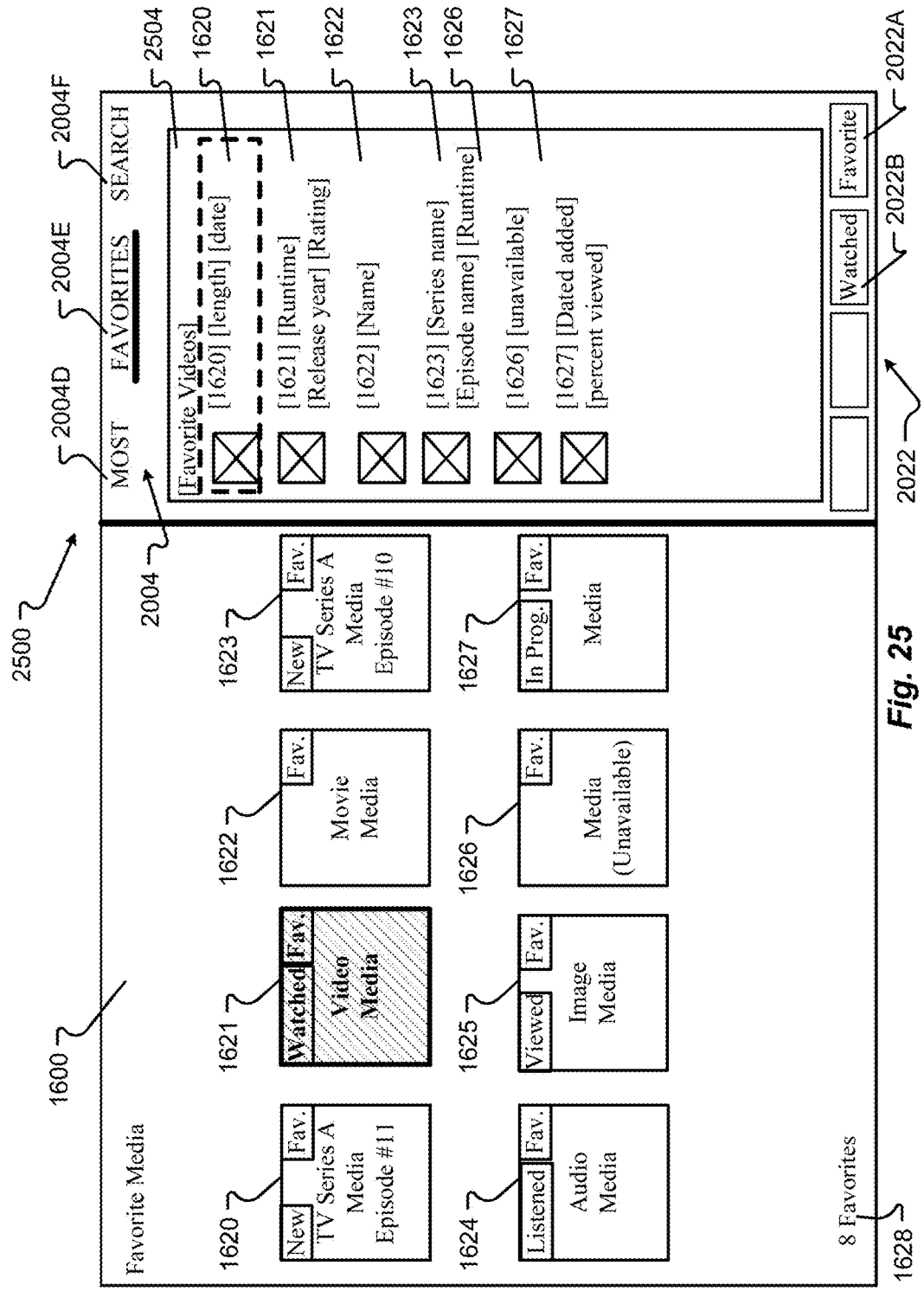
FIG. 25 is a visual representation of an embodiment of a favorites panel.

FIG. 25 illustrates an example of a favorites panel 2500. The favorites panel 2500 may include a navigation bar 2004 which may be displayed in a manner similar to the navigation bars illustrated in FIGS. 20-24. One or more videos of all types that have been tagged or marked as a favorite may be displayed in a list 2504. For example, in FIG. 25, media items 1620-1623 and 1626-1627 are included in list 2504 because they have previously been marked as a favorite by a user and were displayed in user interface 1600 illustrated in FIG. 16. Media item 1624 is not included in list 2504 because it is an audio media item. Item 1625 is not displayed in list 2504 because it is an image media item. List 2504 may display the media items in an order similar to the order of user interface 1600. The media items may also be arranged from most recently added to a favorites list to least recently added to the favorites list. Although FIG. 25 illustrates an example of a favorites panel 2500 with 6 media items in list 2504, more or fewer favorite media items may be included in list 2504 up to the maximum number of video media items tagged as a favorite by a user. List 2504 may be vertically scrollable to accommodate a larger number of video media items.

List 2504 may display information about the video media items in a manner similar to lists 2204, 2304, and 2404 described above. A user may navigate focus to a video displayed by list 2504 and press the select button 764 of the remote control to open an information panel 2000 to obtain more information about the video. A user may also launch a video with focus by pressing the play button 756 of the remote control. In another embodiment, pressing the select button will play a video with focus.

Figure 26:
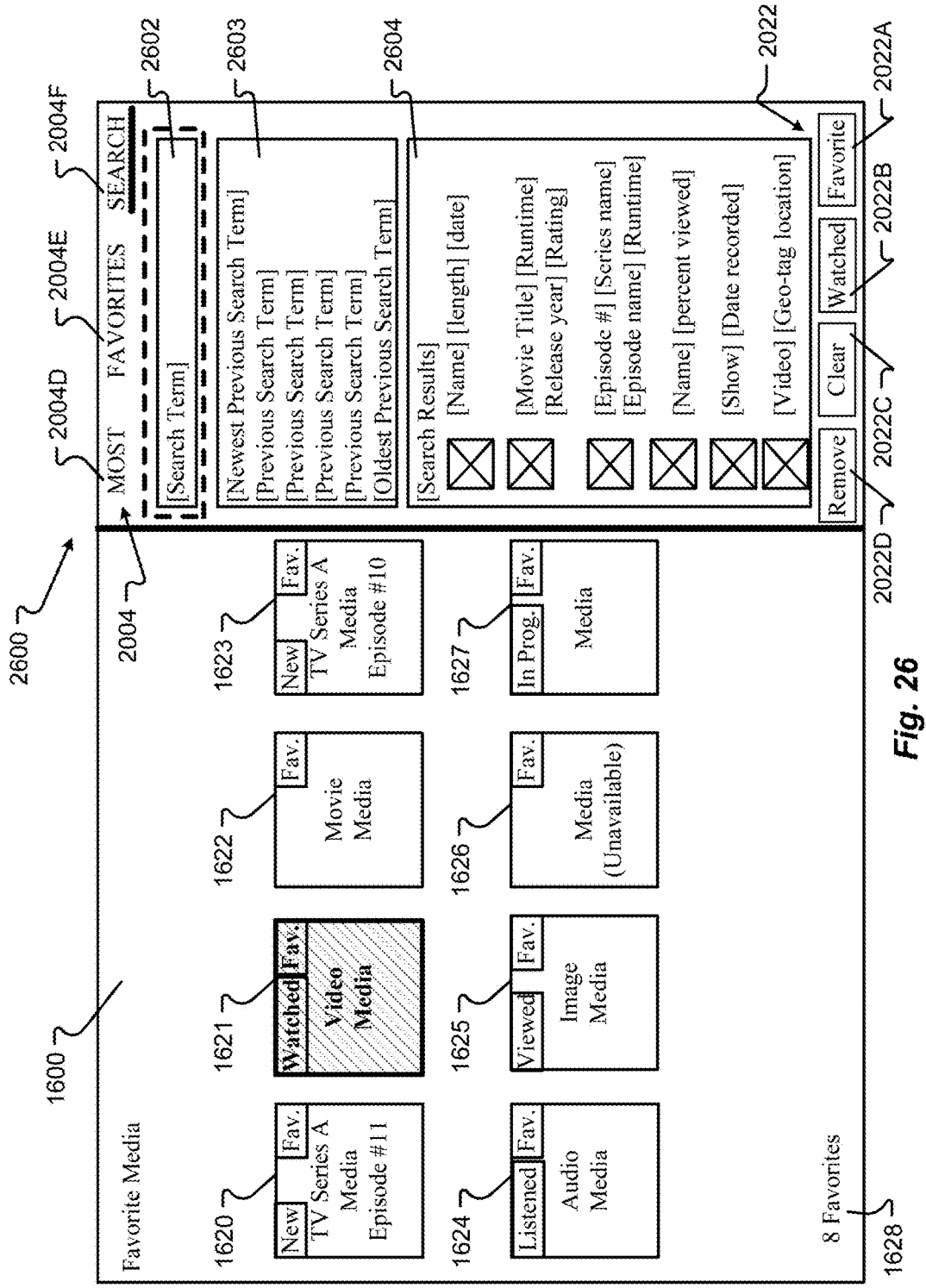
FIG. 26 is a visual representation of an embodiment of a search panel.

An example of a search panel 2600 is illustrated in FIG. 26. The search panel 2600 may display a navigation bar 2004 with one or more of tabs 2004A-2004F. An area 2602 for entering a search term may be displayed. The search area 2602 may have initial focus as illustrated by the dashed box surrounding search area 2602. When the search area 2602 has focus, a user may press the select button of the remote control to activate an on-screen keyboard that the user may use to enter a search term. The user may also speak search terms which may be received by the microphone 220 and recognized by the Intelligent TV 100. The user may also use an external wired or wireless keyboard 168h. In an embodiment, a user may activate a smart search panel that has a plurality of search fields such as a title field, a director field, a media type field, a date field, a rating field, a video format field, a video type field (such as a movie, a TV series, or a video file), a language field, a subject field, a field for terms to exclude from the search, a match all field, and a match any field. This is only one illustrative example, and one of skill in the art would recognize that there may be a variety of other ways to select search criteria to quickly and efficiently organize a search.

The search panel 2600 may display a list 2603 of one or more previous search terms. List 2603 may be ordered from the most recently used search term at the top to the oldest search term at the bottom. A user may navigate focus to and select one of the previously used search terms displayed in list 2603 which may cause the Intelligent TV to perform the previously used search. When this happens, the selected previously used search would be moved to the top of list 2603 because the selected previously used search would become the most recently used search.

After the user has entered a search term in the area 2602, the user may then select the enter button on the remote control to perform a search. The search engine 1410 will perform a search based on the criteria entered in the area 2602 by the user.

One or more search results found by the search engine 1410 may be displayed by list 2604 which may include video media of all types. List 2604 may display information about the video media items in a manner similar to lists 2204, 2304, 2404, and 2504 described above. List 2604 may be arranged with a most relevant search result at the top. In another embodiment, the list may be arranged by media type, in a chronological order, an alphabetical order, or in a variety of other ways known to one of skill in the art. In another embodiment of the search panel 2600, the previous search term list 2603 and the search result list 2604 may be displayed in separate panels.

A user may navigate focus to a video displayed in list 2604 and push the select button on the remote control to launch an information panel 2000 to obtain more information about the video. The user may also press the play button on the remote when a video in list 2604 has focus to play the video with focus.

The search panel 2600 may also include one or more hot keys. In the example illustrated by FIG. 26, four hot keys 2022A-2022D are provided. The "Favorite" hot key 2022A and the "Watched" hot key 2022B have the same functionality as previously described in conjunction with FIGS. 21-25. If the "Clear" hot key 2022C is selected, the list 2603 of previously used search terms may be erased. The "Remove" hot key 2022D may be used to remove an individual search term with focus from the list 2603.

Figure 27:
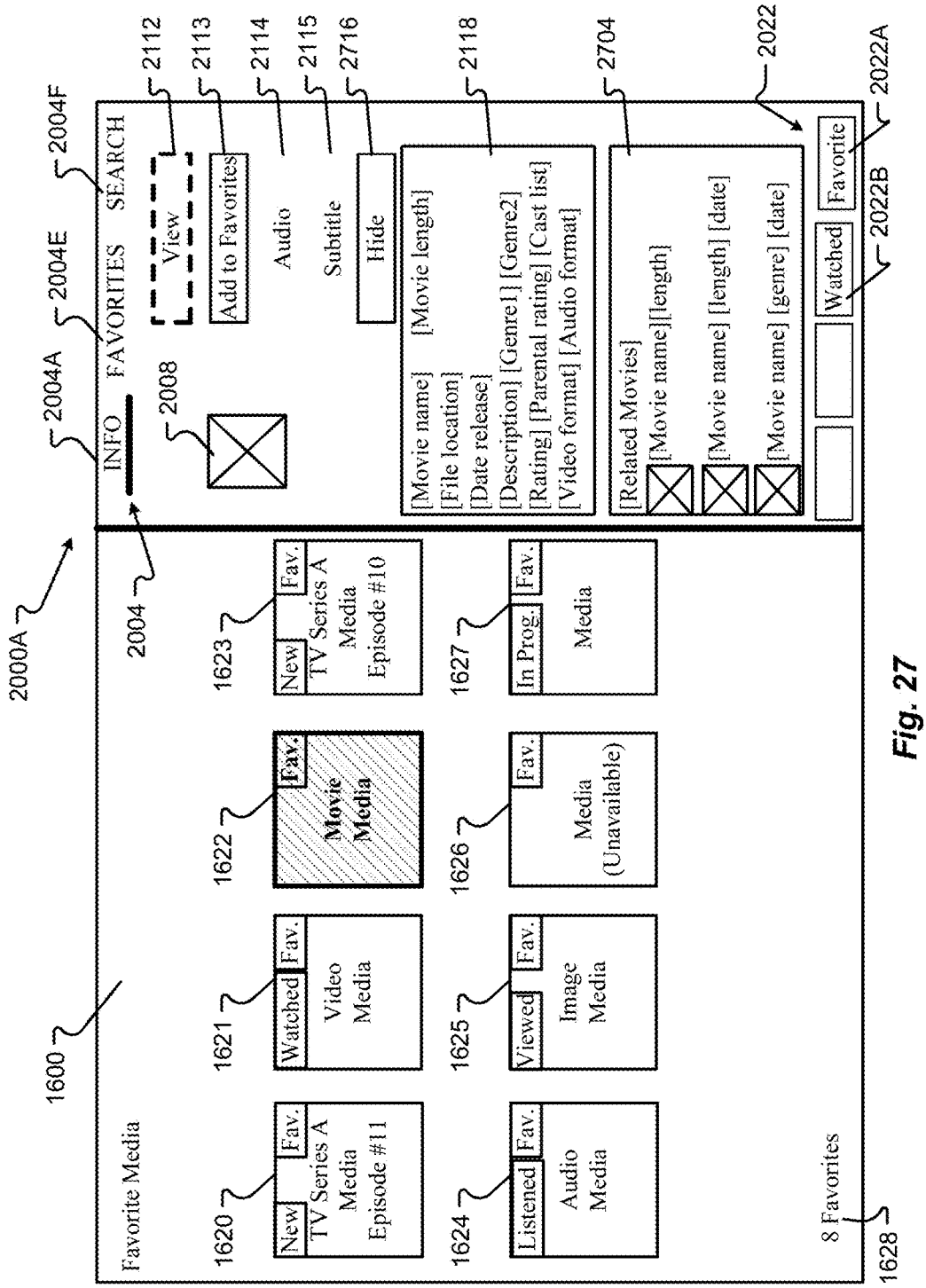
FIG. 27 is a visual representation of an embodiment of an information panel presented for a movie media item.

FIG. 27 illustrates an embodiment of an information panel 2000A that may be displayed for a non-active movie. In this example, the user activated the information panel 2000A when movie 1622 had focus (as emphasized). An information panel 2000A activated when a non-active movie has focus may be very similar to the information panel 2000 illustrated in FIG. 21 but may be modified to provide information more relevant to a movie media item.

Information panel 2000A may display a navigation bar 2004 with one or more tabs. The navigation bar 2004 of FIG. 21 displays three tabs 2004A, 2004E, and 2004F to illustrate that the order of tabs displayed by a navigation bar 2004 of all embodiments may be changed.

A thumbnail 2008 of movie 1622 may be displayed in information panel 2000A.

Action buttons 2112-2115 may be displayed and have same functions as described in conjunction with FIG. 21. The action buttons 2114 and 2115 may only be displayed when a movie is playing as described above. Information panel 2000A may also display a "Hide" action button 2716 for both non-active and active movies. Selecting the "Hide" button 2716 may remove the movie from all media center views and memory 308 and may dismiss information panel 2000A. The movie is not deleted from the storage location and may still be displayed in a device view and/or watched if the user navigates to the storage location of the movie file.

The information area 2118 of information panel 2000A may display information that is relevant to a movie including the information displayed by lists 2204, 2304, 2404, and 2504 described above. For example, the information area 2118 may display a movie name, movie length, a file location, a date of release, a short and/or a long description, one or more genres that describe the movie, a rating, a parental rating, a video format, a file type, and an audio format. A scrollable list of cast members may be displayed and detailed information may be provided about the cast members when a user selects the name of an individual cast member. The information displayed in area 2118 may be scrollable.

A list 2704 of one or more related movies may be displayed. The movies in the list 2704 may be selected by the panel manager 536 by comparing the name of movie 1622 to all movies identified by the search engine 1410. A user can use the settings panel 524 to select different criteria that may be used by the panel manager 536 to select movies to display in list 2704. List 2704 may be vertically or horizontally scrollable if necessary to display all related movies identified by the panel manager 536. List 2704 may display information about the related movies in a manner similar to lists 2204, 2304, 2404, and 2504. A user may navigate to a movie displayed in list 2704 and press the select button to launch a new information panel with information about the selected movie. The user may also navigate focus to a movie displayed in list 2704 and press the play button to dismiss the information panel 2000A and start the selected movie.

Information panel 2000A may also display one or more hot keys. In the example of FIG. 27, hot keys 2022A and 2022B are illustrated and have the same functionality as described for FIG. 21.

Figure 28:
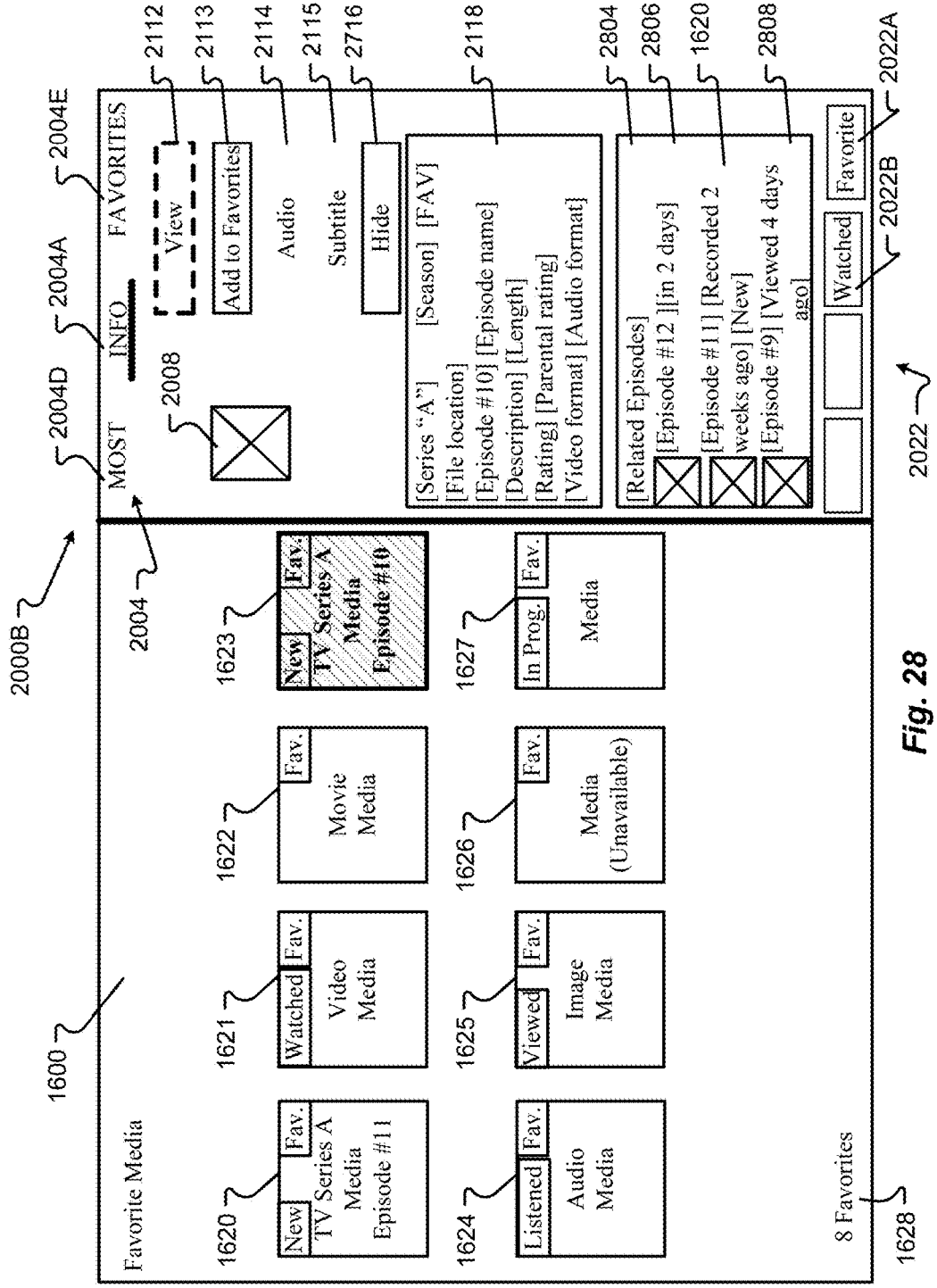
FIG. 28 is a visual representation of an embodiment of an information panel presented for a TV episode.

Another embodiment of an information panel 2000B may display information for an individual episode of a TV series and is illustrated in FIG. 28. Information panel 2000B was activated when an episode 1623 of a TV series "A" had focus. Information panel 2000B may display a navigation bar 2004 with one or more of tabs 2004A-2004F displayed. In the illustrated embodiment, tabs 2004A, 2004D, and 2004E are displayed. Information panel 2000B may also display a thumbnail 2008 and one or more action buttons 2112, 2113, 2114, 2115, and/or 2716 which may have the same functions as described in conjunction with FIGS. 21 and 27. Information area 2118 may provide information specific to an individual TV episode and similar to the information provided by lists 2204, 2304, 2404, and 2504.

A related episodes list 2804 may display information on one or more episodes from the same series. The list may include upcoming episodes 2806 as well as previously recorded episodes, such as episode #11 for media item 1620 and episodes that have already been viewed 2808. A user may select a setting in the settings panel 524 to change the criteria the panel manager 536 uses to select episodes to display in the list 2804. For example, a user could select a setting to remove previously watched episodes or to remove upcoming episodes from the list 2804. List 2804 may display information similar to the information displayed by lists 2204, 2304, 2404, and 2504. In addition, list 2804 may display information about how recently a media item was recorded, when an upcoming item will be recorded, and when a media item was watched. In an embodiment, the list 2804 of related or next episodes may display up to three subsequent episodes of the currently active episode. In other embodiments, more next episodes may be displayed in the list 2804. In still another embodiment, if no next episode is available, the last watched episodes may be displayed. If no last watched episodes are available, then the list 2804 may not be displayed. Information panel 2000B may display one or more hot keys 2022 which may have the same functionality as described in FIG. 21.

Figure 29:
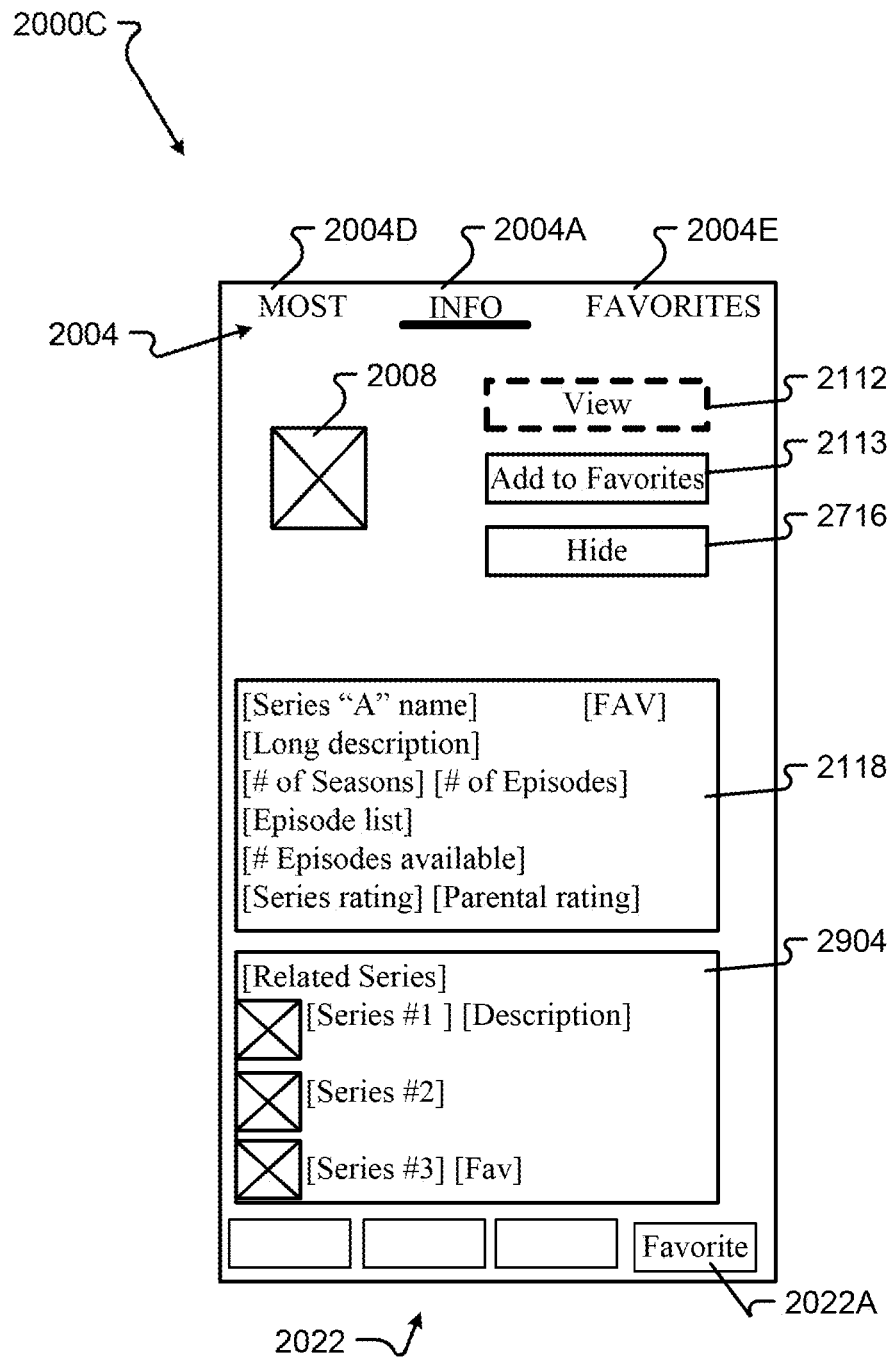
FIG. 29 is a visual representation of an embodiment of an information panel presented for a TV series.

A user may also activate an information panel 2000C while a TV series has focus in a media center application 460 as illustrated in FIG. 29. In this embodiment of an information panel 2000C, the information area 2118 may provide information about the entire series, such as a long description, a scrollable list of seasons, a total number of episodes, and a scrollable list of episodes available that have been found by the search engine 1410. A user may navigate focus to an individual episode listed to watch the episode or to launch an episode information panel 2000B to view more information about the chosen individual episode. A list 2904 of one or more related TV series may also be displayed. The list 2904 may be selected by the panel manager based on criteria such as a series title, a genre, cast members, directors, or producers. A user may learn more information about a related series in the list 2904 by navigating focus to a series in list 2904 and pressing the select button on the remote control which may launch a new TV series information panel 2000C with information about the series selected from list 2904. A user may also navigate focus to a series in list 2904 and press the play button to dismiss information panel 2000C and play the first unwatched episode of the series with the lowest episode number and season number. If all episodes of the selected series have been watched, the most recently watched episode may be displayed.

Figure 30:
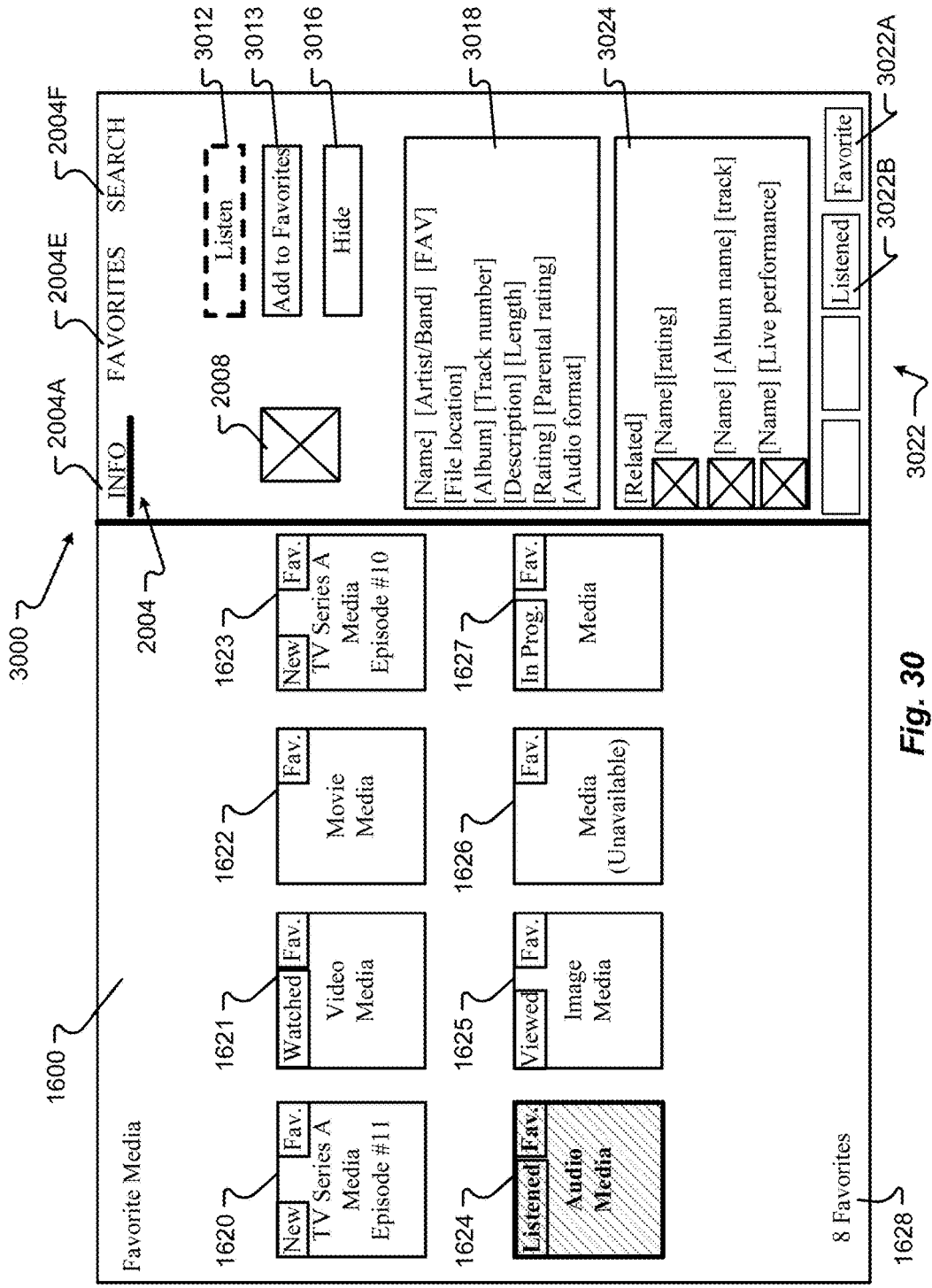
FIG. 30 is a visual representation of an embodiment of an information panel presented for an audio media item.

FIG. 30 illustrates an embodiment of an information panel 3000 that may be displayed when an audio media item has focus. In the example illustrated in FIG. 30, the audio media item 1624 had focus when the information panel was activated (as emphasized). Information panel 3000 is similar to information panel 2000 but may present information more relevant to an audio file. Information panel 3000 may display a navigation bar 2004 with one or more tabs, such as an "Information" tab 2004A, a "Favorites" tab 2004E, and a "Search" tab 2004F. Additional tabs for "New" 2004B, "Last" 2004C, and "Most" 2004D may also be displayed. Information panel 3000 may display a thumbnail 2008. The thumbnail 2008 may be an album cover view or a picture of the musical artist or band for the audio media item which had focus when the information panel 3000 was activated. Action buttons for "Listen" 3012, "Add to Favorites" 3013 and "Hide" 3016 may be displayed. Selecting the "Listen" 3012 button may dismiss panel 3000 and cause the Intelligent TV to start playing the audio file with focus. The "Add to Favorites" 3013 button may tag the audio file as a favorite or may remove the favorite tag from an audio file that is already in a favorites list. Selecting the "Hide" button 3016 may cause the panel manager 536 to remove metadata about the audio file from memory 308.

An information area 3018 may display information about the audio item including information displayed by lists 2204, 2304, 2404, and 2504 described above which is relevant. Area 3018 may also display an artist or band name, an album name, a track number, an audio format, a director, a rating, a parental rating, a recording date, a recording studio, a record studio and other meta data collected by the media module 1411 and stored in memory 308. If the audio media item is an audio-book, the information area 3018 may display information such as a title of the book, an author of the book, a name of the person voicing the audio-book, a total time in hours and minutes, and any other available meta data collected by the media module. If the audio media item is a podcast, the area 3018 may display a name of the pod-cast, a recording date, an episode number, a title of the episode, a run-time of the episode, a file type, a recording quality, and a genre.

A list 3024 of one or more related audio files may be displayed in the information panel 3000. The list 3024 may display audio files by the same musician, by the same author, from the same genre, or other criteria selected by the user in settings panel. A user may navigate focus to a file displayed in the list 3024 and press the play button of the remote control to begin playing the audio file. The user may also press the select button for a related audio file with focus to activate an information panel 3000 for the audio file with focus. The list 3024 may display information for the related audio files similar to the information displayed in area 3018.

One or more hot keys 3022 may be displayed. A "Listened" hot key 3022B may be selected to tag an audio file as already listened to. If an audio file is already tagged as listened to, selecting the hot key will remove the tag. For example, if hot key 3022B is selected while audio file 1624 has focus, the "Listened" tag for item 1624 in user interface 1600 may be removed. A "Favorite" hot key 3022A may be displayed and has the same functionality as the "Favorite" hot key 2022A.

When an audio media item has focus, a user may also launch a new panel that is similar to the new panel 2200 but may list audio files of all types instead of video files. A last listened panel may also be launched for audio files which may be similar to the last viewed panel 2300. The audio last listened panel may include a list of one or more audio media items that have been listened to similar to list 2304. The user may change the criteria used by the panel manager to select items to display in the last listened to list using the preferences panel. The last listened list may provide information about the audio media items similar to the information provided by information area 3018.

A most listened panel for audio may be arranged in a manner similar to the most viewed panel 2400 but may display information on the most viewed audio files found by the search engine 1410. The most listened panel may include a list of one or more most listened to audio media items and provide information about those items similar to the information provided in information area 3018.

A favorites panel for audio files may also be activated that may display information related to audio files marked as a favorite in a manner similar to the video favorites panel 2500. The audio favorites panel may include a list of all the audio media items that have been tagged as a favorite and may provide information about them similar to the information provided in information area 3018. Finally, a search panel for audio files may also be activated to search for audio files and may have a functionality similar to search panel 2600. The user may navigate between the information panel, new panel, last listened panel, most listened panel, favorites panel, or the search panel that are specific to audio media items by navigating left or right using the D-Pad or means described above.

Figure 31:
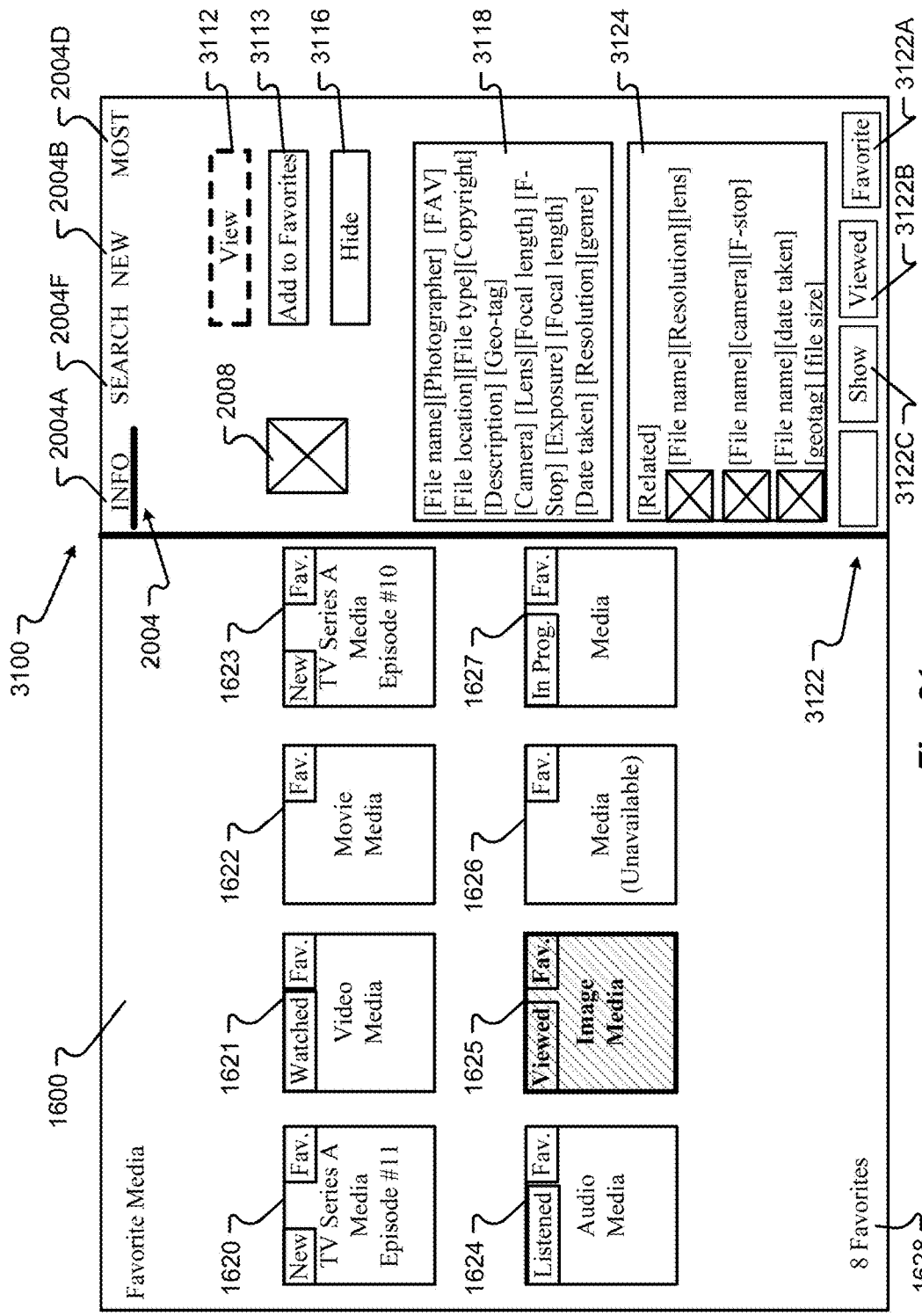
FIG. 31 is a visual representation of an embodiment of an information panel presented for an image media item.

An embodiment of an information panel 3100 activated when an image media item has focus is illustrated in FIG. 31. The information panel 3100 was activated when image media 1625 had focus (as emphasized). The information panel 3100 for an image media item is similar to information panels 2000 and 3000, but may display information more relevant to an image media item. A navigation bar 2004 with one or more tabs may be displayed. In the example illustrated by FIG. 31, four tabs are displayed in the navigation bar for "Information" 2004A, "Search" 2004F, "New" 2004B, and "Most" 2004D. The information panel 3100 may include a thumbnail 2008 of the image 1625.

One or more action buttons may be displayed. The "View" button 3112 has focus as indicated by the dashed box. Pressing the select button 764 on the remote control while the "View" button 3112 has focus may dismiss information panel 3100 and a full screen view of the image may be displayed on the screen. The user may navigate focus to the "Add to Favorites" button 3113 and then press the select button of the remote control to tag a media item with focus to be added to the user's favorites list. In the example illustrated by FIG. 31, because media item 1625 is already tagged as a favorite, if button 3113 is selected, the media item 1625 may be removed from the user's favorites list. Selecting the "Hide" button 3116 may cause the panel manager 536 to remove metadata about image media item 1625 from memory 308.

A user may press the play button of the remote control to dismiss the information panel 3100 and launch a slide show of all the image media items in the same folder as the image media item 1625 that had focus when the information panel 3100 was activated. Pressing the back button on the remote control may dismiss the information panel 3100 and display user interface 1600.

An information area 3118 may display information about the image media item including any information displayed by lists 2204, 2304, 2404, and 2504 described above which is relevant to an image media item. Area 3118 may also display a photographer's name, copyright information, a geotagged location, a camera type, a lens type, a focal length, an F-stop, an exposure, a date taken, an image resolution, an image file type, a file size, a genre, and any other meta data collected by the media module 1411 and stored in memory 308.

A list 3124 of one or more related images may be displayed. The list 3124 may display image media items by the same photographer, from the same genre, or from the same folder as the image media item that had focus when the information panel 3100 was activated. Other criteria may be selected by the user in the settings panel to filter the related images selected by the panel manager. A user may navigate focus to an image item displayed in the list 3124 and press the play button of the remote control to view the image. The user may also press the select button when focus is on a related image item to activate an information panel 3100 for the image item with focus. The list 3124 may display information for the related audio files similar to the information displayed in area 3118.

One or more hot keys 3122 may be displayed. A "Favorite" hot key 3122A may be displayed and has the same functionality as the "Favorite" hot key 2022A. A "Viewed" hot key 3122B may be selected to tag or untag an image media item as having been viewed or not viewed. If an image media item is already tagged as viewed, selecting the hot key will remove the tag. Selecting the "Show" hot key 3122C may launch a slide show of all the image media items in the same folder as the image media item 1625 that had focus when the information panel 3100 was activated.

A user may also launch other panel types for image media items. A new panel that is similar to new panel 2200 may be activated and may display a list of new image media items of all types indexed by the search engine 1410. The list of new image media items may display information about the media items in the list similar to the information provided by information area 3118. The new image panel may include hot keys for Favorite, Viewed, and Show that have the same function as hot keys 3122A, 3122B, and 3122C.

A last viewed panel may also be launched for image media items to display a list of recently viewed image media items and which may be similar to the last viewed panel 2300. The last viewed image panel may also include a list of recently viewed image media items and may display information about the media items in the list similar to the information provided by information area 3118. Hot keys with the same function as hot keys 3122A, 3122B, and 3122C may also be displayed.

A most viewed panel for image media items may be arranged in a manner similar to the most viewed panel 2400 but may display information on the most viewed image media items found by the search engine 1410. The most viewed image panel may include a list of most viewed images that provides information similar to the information area 3118 about the images in the most viewed list. The most viewed information panel may also have hot keys with the same functions as hot keys 3122A, 3122B, and 3122C.

A favorites panel for image media items may also be activated that may display information related to images marked as a favorite in a manner similar to the video favorites panel 2500. The favorite image panel may also have one or more hot keys with the same functions as hot keys 3122A, 3122B, and 3122C.

A search panel for image media items may also be activated to search for images. The image search panel may have an arrangement similar to search panel 2600 and may include a search field area to enter a search term similar to 2602, a list of previously used search terms, and a search result list. The image search panel may include one or more hot keys for "Clear," "Show," and "Favorite." The "Clear" hotkey may have the same function as hotkey 2022C and may be used to clear a search term and show a keyword history. The "Show" hotkey may be used to dismiss the image search panel and start a slideshow of images media items in the same folder as image media item 1625 that had focus when the panel was opened. The "Favorite" hotkey has the same function as hotkey 2022A.

The user may navigate to the new panel, last viewed panel, most viewed panel, most viewed panel, favorites panel, or the search panel that are specific to image media items by navigating left or right using the D-Pad or means described above such as by a voice command or a gesture command.

Figure 32:
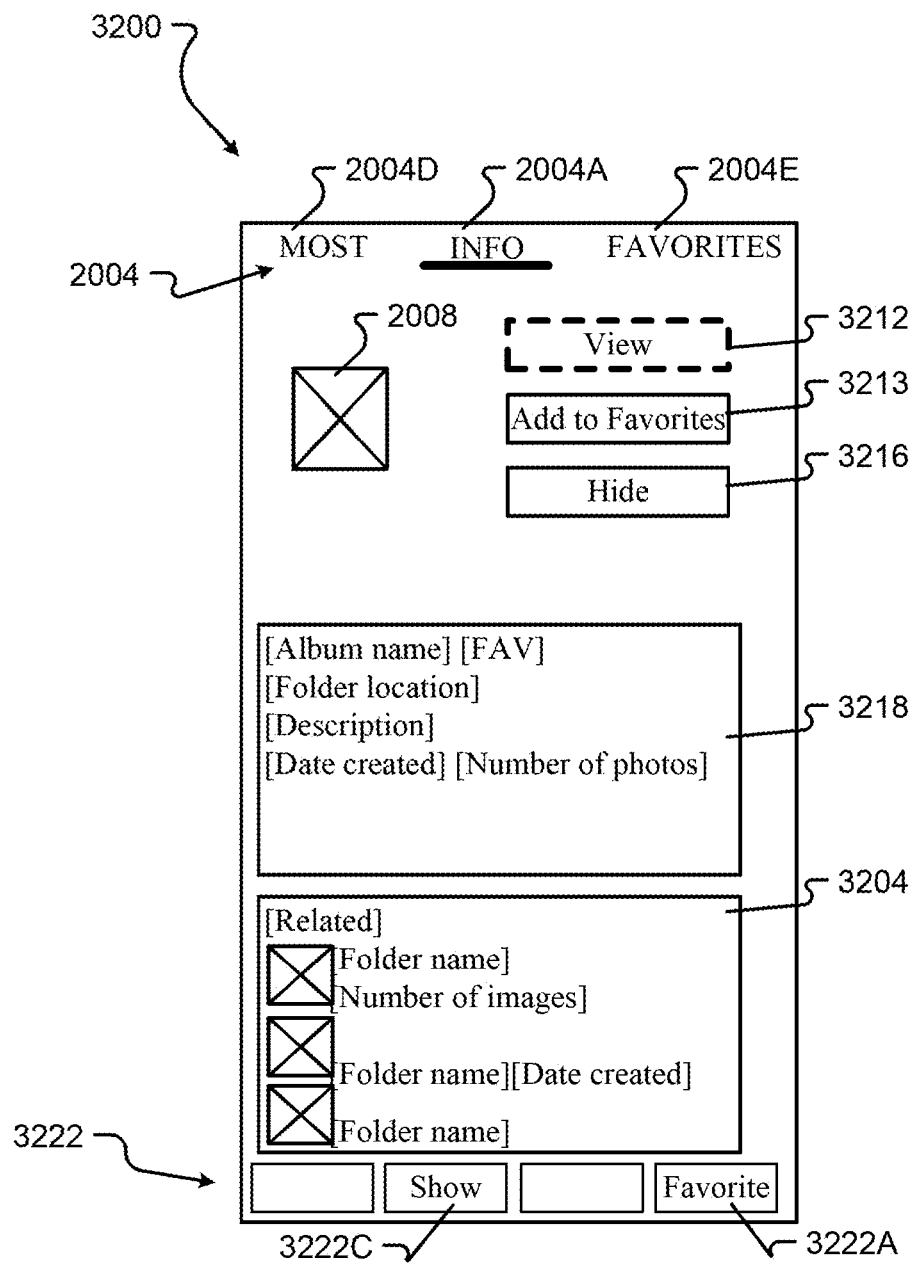
FIG. 32 is a visual representation of an embodiment of an information panel presented for a photo album.

A user may also activate one or more panels when a photo album or other collection of image media items have focus. An example of an information panel 3200 for a photo album is illustrated in FIG. 32. The information panel 3200 may display a navigation bar 2004 with one or more tabs representing different types of panels that may be activated. A thumbnail 2008 of one of the images in the photo album may be displayed. A "View" button 3212 may be displayed and if the select button 764 of the remote control is pressed while the "View" button 3212 has focus, the information panel 3200 may be dismissed and the image media items in the photo album that had focus may be displayed in a scrollable list. Selecting the "Add to Favorites" button 3213 will tag the photo album with focus as a favorite or untag the album if the photo album is already marked as a favorite. The "Hide" 3216 button may be selected to remove the photo album from all media center application 460 views and from memory 308. A photo album that has focus when the "Hide" button 3216 is selected is not actually deleted or erased.

The information panel 3200 may display information about the photo album in an information area 3218. The information may include a photo album name, a description, a folder location, a date created, and a number of photos. The area 3218 may also display any information displayed by lists 2204, 2304, 2404, and 2504 and area 3118 described above which is relevant to the photo album. The information panel 3200 may also display hot keys "Favorite" 3222A and "Show" 3222C which have the same functions as the hot keys 3122A and 3122C described in conjunction with FIG. 31.

A user may navigate left or right with the D-Pad to activate a new panel, a last viewed panel, a most viewed panel, a favorites panel, and a search panel which may each display information about other photo albums that have been identified by the search engine 1410. A new panel activated when a photo album has focus may display a list of one or more new photo albums. The new panel may display information about the photo albums in the list. When a last viewed panel is activated with a photo album in focus, a list of recently viewed photo albums may be displayed with information about the recently viewed photo albums. A most viewed panel may display information about one or more most viewed photo albums. A favorites panel may be activated to display information about one or more photo albums that have been tagged as favorites. The new panel, the last viewed panel, the most viewed panel, and the favorites panel may each include one or more hot keys, "Show" and "Favorite," which have the same functions as hot keys 3222A and 3222C described in conjunction with FIG. 32.

A search panel may also be activated to search for a particular photo album. The photo album search panel may be similar to search panel 2600. The photo album search panel may have additional search fields that may be selected by a user to search for photo albums of interest. For example, the search panel may have fields to filter a search by camera type, lens type, exposure, a date, a location, an event at which the photos in the photo album were taken, etc. The photo album search panel may have one or more hot keys for "Clear," "Show," and "Favorite." Selecting the "Show" hotkey while a photo album in the search result list has focus may launch a slide show of all the image media items in the photo album with focus. Selecting the "Favorite" hotkey may tag the photo album with focus as a favorite in the user's favorite list. If the "Clear" hot key is selected, the search field may be erased and a list of one or more previously used keywords may be displayed. The user may navigate to and select a keyword in the list of one or more previously used keywords to execute a new search using the selected keyword.

Figure 33:
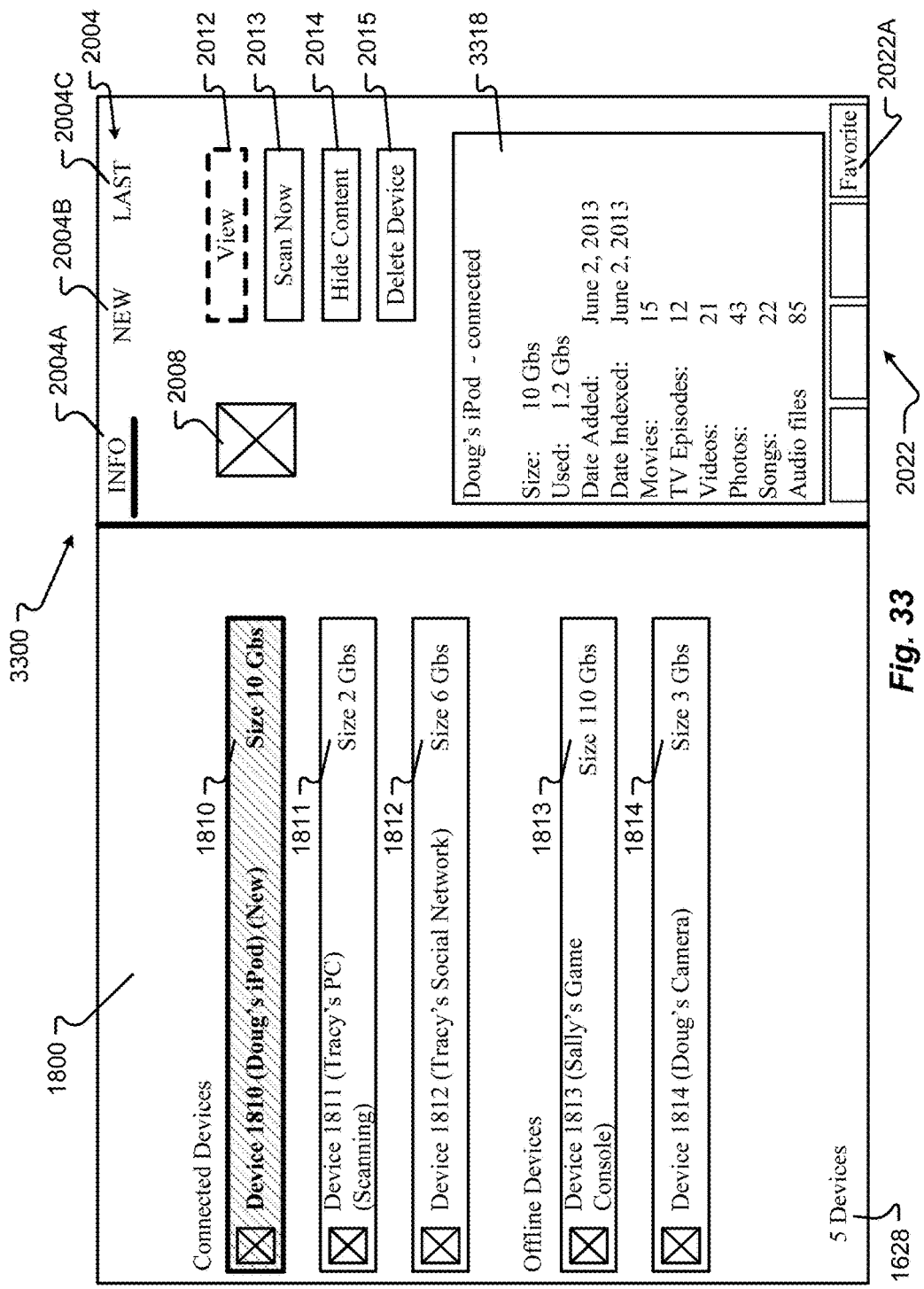
FIG. 33 is a visual representation of an embodiment of an information panel presented for a device.

Referring now to FIG. 33, an exemplary view of an information panel 3300 in accordance with embodiments of the present disclosure is illustrated. In the example illustrated in FIG. 33, the user activated the information panel 3300 while device 1810 displayed in user interface 1800 had focus (indicated by the grey highlight). The information panel 3300 may include a navigation bar 2004 with one or more tabs. In this example, tabs 2004A, 2004B, and 2004C are displayed.

The information panel 3300 may include a thumbnail 2008 or icon to represent the type of device with focus or may be a thumbnail image of a file stored on the device.

The information panel 3300 may have one or more action buttons 2012-2015. When the information panel 3300 is activated, the "View" action button 2012 may have initial focus (indicated in this case by the dashed box). If the user selects the view button by pressing the select button 764 of the remote control, the information panel may be dismissed and a top level directory view of device 1810 may be displayed. Selecting the "Scan Now" action button 2013 may pause any scanning that may be occurring on any other devices and begin scanning the selected device for media. When scanning of the selected device is completed, scanning of a prior running scan that may have been paused may resume. In the example of FIG. 33, if the "Scan Now" button 2013 is selected, the search engine 1410 may stop scanning device 1811 and begin scanning device 1810. When scanning of device 1810 is completed, the search engine 1410 may resume scanning device 1811.

Selecting the "Hide Content" button 2014 may remove all content residing on device 1810 and the metadata associated with device 1810 from memory 308. Information on the device 1810 is not changed or erased. Device 1810 may still be visible in the device user interface 1800. When the "Hide Content" button 2014 is selected, a confirmation modal may be provided to the user before the content and metadata are removed from memory.

The "Delete Device" button 2015 may remove the content residing on the device 1810 and metadata associated with device 1810 from memory. However, unlike when button 2014 is selected, when the "Delete Device" button 2015 is selected device 1810 may not be displayed in the device user interface 1800. Information on the device 1810 is not changed or erased. A confirmation modal may be provided to the user when the "Delete Device" button 2015 is selected before the content and metadata are removed from memory and before the device is removed from interface 1800.

An information area 3318 may be displayed by the information panel 3300 to display information about the device with focus. The information provided in area 3318 may include the name of the device, device type (e.g., a USB drive or a Digital Living Network Alliance® (DLNA) server, etc.), storage size (including available information on the size of content residing on the device), date the device was first added, date the device was last scanned, media content (such as number of movies, number of TV episodes, number of videos, number of photos, number of audio files, number of songs, etc.), and a state indicating whether or not the device is currently connected to the Intelligent TV. An information panel may be opened and display information for a device that is not currently connected to the Intelligent TV.

The information panel 3300 may also display one or more hot keys 2022. In the example of FIG. 33, a "Favorite" hot key 2022A is illustrated. If the corresponding hot key button 796 of the remote control 700 is selected, device 1810 may be added to the user's list of favorite media items.

The user may dismiss the information panel 3300 by selecting the back button 752 of the remote control, by speaking a voice command, by providing a gesture using the gesture capture regions 224, 228, by operating a pointing device 168i, and/or the like.

A user may navigate left or right to activate media center panels for new devices, last device viewed, most viewed device, and favorite devices. Each of these panels for devices are arranged in a manner similar to the new panel 2200, the last viewed panel 2300, the most viewed panel 2400, and the favorites panel 2500. The device panels will have similar hot key, information areas to display information about the devices, and action buttons.

Figure 34:
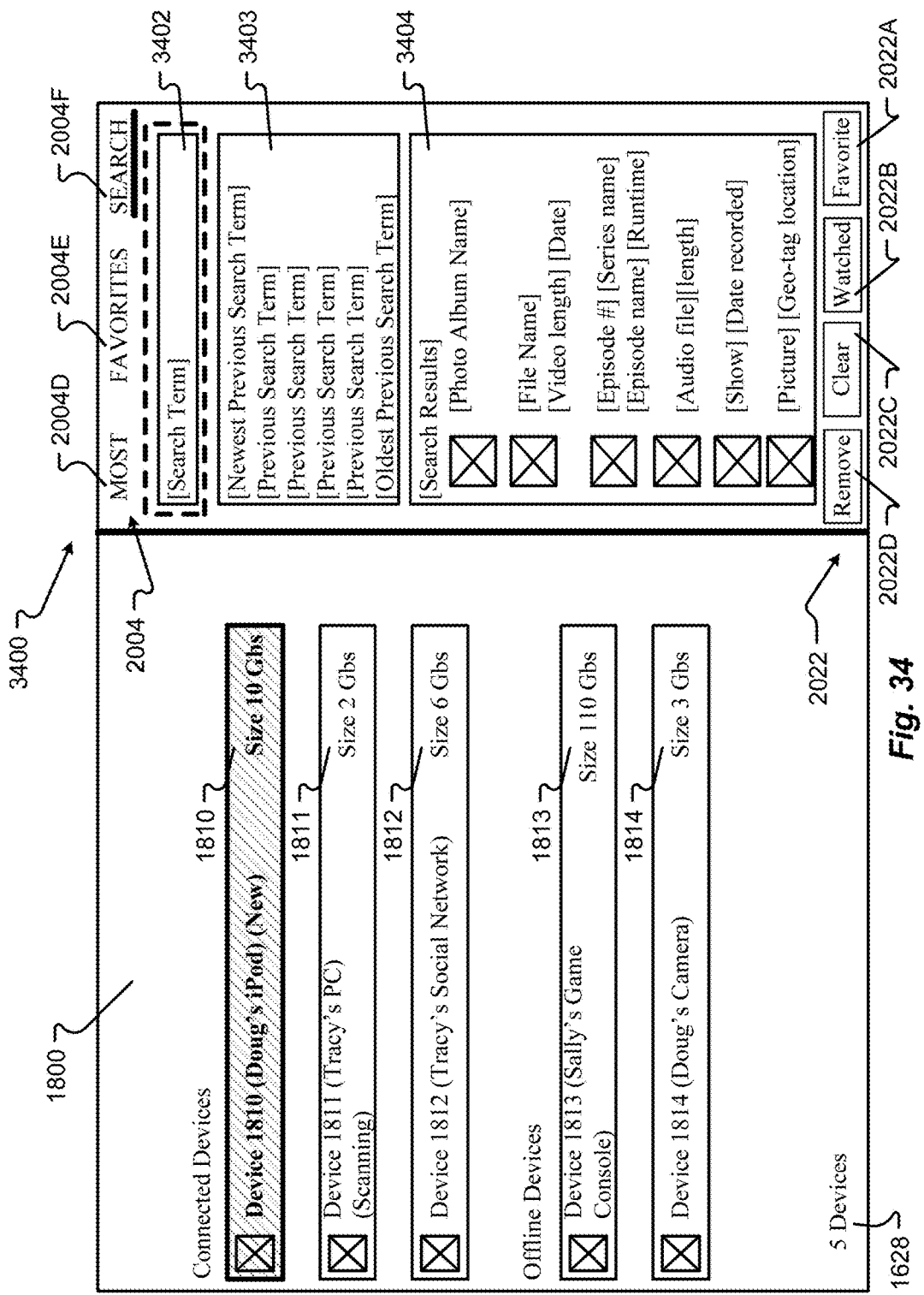
FIG. 34 is a visual representation of an embodiment of a search panel presented for a device.

A search panel 3400 may be activated when a device has focus as illustrated in FIG. 34. The search panel 3400 was activated when device 1810 had focus. A device search panel 3400 has an arrangement similar to the search panel 2600. For example, search panel 3400 has a navigation bar 2004 and a search term entry area 3402. A list 3402 of previous search terms may be displayed. However, a device search panel may be used to search for any type of media item located on a connected device. The search result list 3404 may therefore display results of all media types found on the device, including videos, TV episodes, movies, audio files, and photo files.

Figure 35:
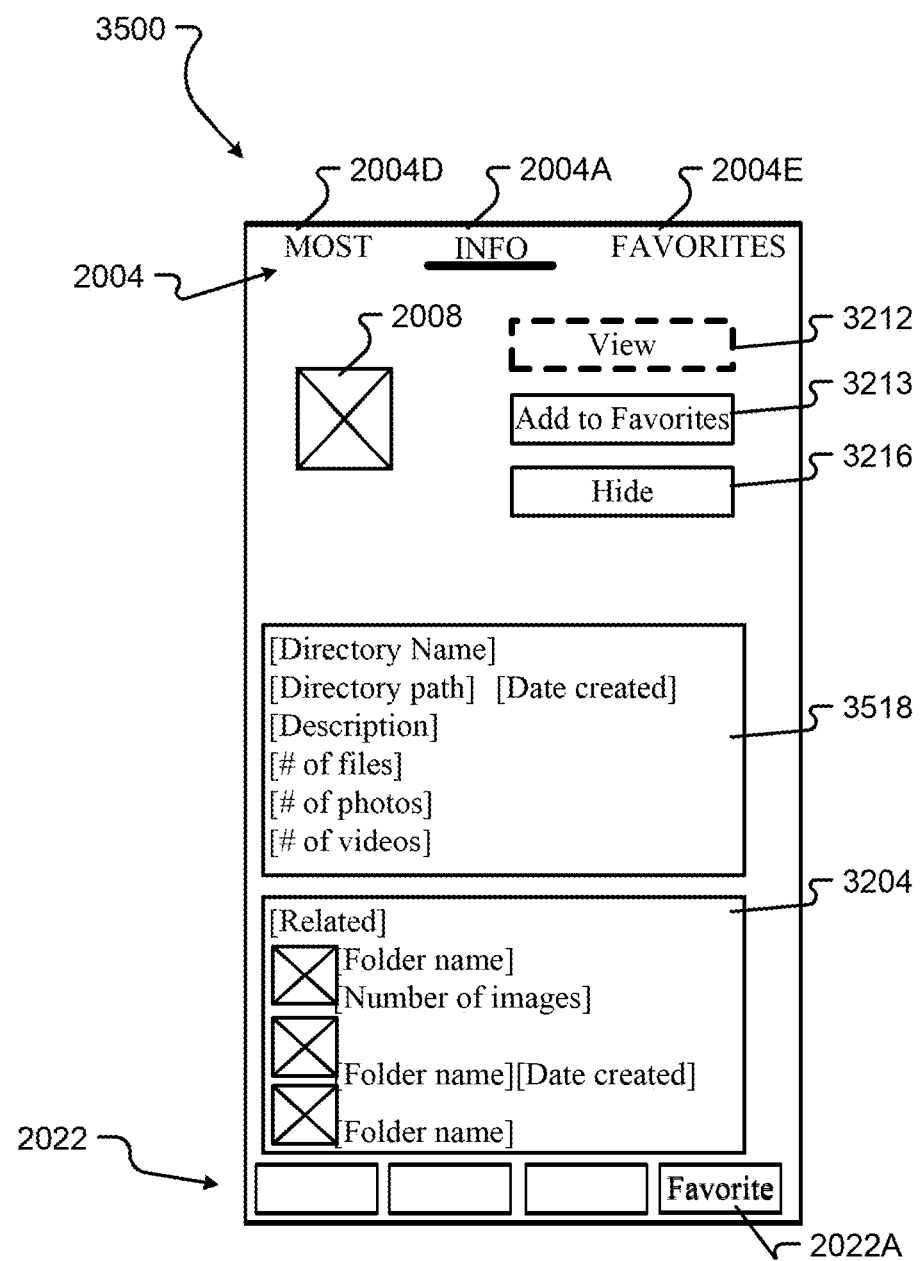
FIG. 35 is a visual representation of an embodiment of an information panel for a directory.

Referring now to FIG. 35, a user may activate an information panel 3500 when a directory has focus. The information panel 3500 may display a navigation bar 2004 with one or more tabs and may display a thumbnail 2008. The information panel 3500 may display one or more action buttons that have the same function as the view 3212, add to favorites 3213, and hide 3216 action buttons. An information area 3518 may provide information about the directory such as a directory name, directory path, a description, a date created, a number of files, a number of video files, a number of photo files, a and number of audio files. The information area 3518 may also display any of the information displayed in areas 2118, 3018, or in lists 2204, 2304, 2404, 2504, 2604, 2704, 2804, 3118, 3218, or 3318. The information panel 3500 may also include one or more hot keys 2022.

If a user dismisses a media center panel by, for example, pressing the back button of the remote control, the panel manager may hide active panel and return the user to user interface that was active when the user requested the panel. In the example, in FIG. 25, if the user dismisses media center favorite panel 2500, user interface 1600 may be displayed and media item 1621 may have initial focus. If user requests a media center panel again while still viewing user interface 1600, in some embodiments the media center panel the user just exited will be activated again. Returning again to the example illustrated in FIG. 25, a "Favorites" media center panel 2500 is illustrated. If the user dismisses the "Favorites" panel 2500, user interface 1600 may be displayed with initial focus on video media item 1621. If the user navigates focus to movie media item 1622 and requests a media center panel, in this embodiment, the panel manager may display a "Favorites" media panel again.

Figure 36:
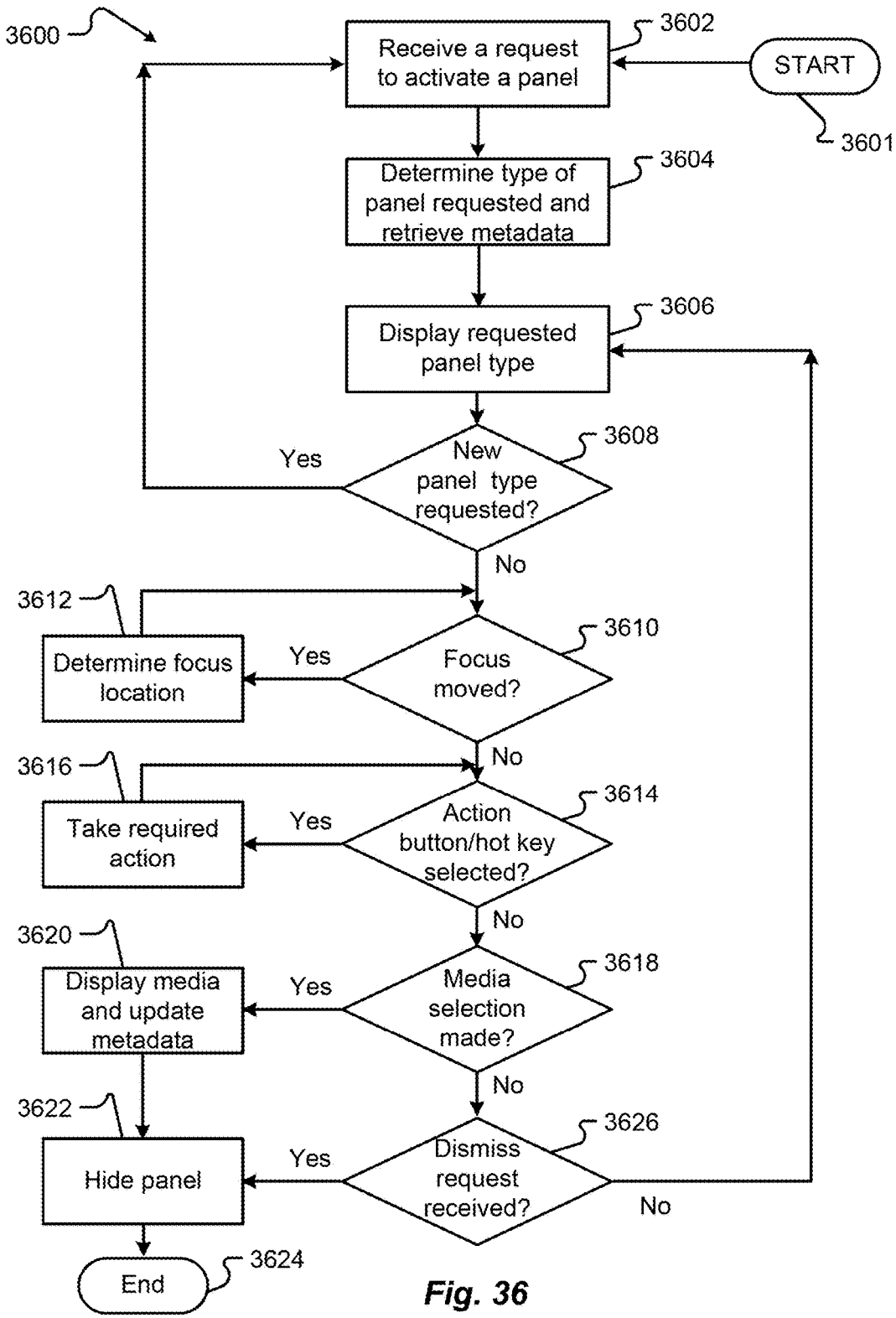
FIG. 36 is a process diagram for displaying media center panels.

FIG. 36 is a flow diagram of an embodiment of a method 3600 for displaying media center panels. Illustratively, the elements described herein may be stored-program-controlled entities, and a computer or processor 364 can perform the method 3600 of FIG. 36 and the processes described herein by executing program instructions stored in a tangible computer readable storage medium, such as a memory 308 or data storage 312. Although the method 3600, described in FIG. 36, is shown in a specific order, one of skill in the art would recognize that the method in FIG. 36 may be implemented in a different order and/or be implemented in a multi-threaded environment. Moreover, various steps may be omitted or added based on implementation. Hereinafter, the method 3600 shall be explained with reference to the systems, components, modules, software, etc. described in conjunction with FIGS. 1A-35.

The method 3600 starts 3601 when a user sends a request to activate a media center panel. The user may activate a panel through various commands, such as by moving focus to a media item displayed in the media center application 460 and then selecting the media center button 736, touching the touch sensitive display screen 212, by speaking a voice command, by providing a gesture using the gesture capture regions 224, 228, by operating a pointing device 168i, and/or the like. An input event manager 508 is operable to receive the request 3602 and is operable to determine the type of panel requested 3604. After determining the type of panel requested 3604, the input event manager 508 can send the request to the panel manager 536. The panel manager is operable to retrieve metadata from memory 308 associated with the media item that had focus when the user requested activation of the panel and based on the type of panel requested. If the Intelligent TV 100 recognizes the individual user, the panel manager 536 may retrieve metadata specific to the recognized individual user from the local database 1340 and/or database 640. The panel manager 536 may also retrieve metadata from media data service 628 that is in communication with one or more internal and/or external content providers 616. After the personal metadata is retrieved, the panel manager can display the requested media center panel type 3606.

After the user has activated a panel, the user may request a new panel type by navigating left or right using various commands. The input event manager 508 is operable to determine if a user requests a new panel type. If a user requests a new panel type 3608, the input event manager receives the request 3602, determines the type of panel requested 3604, and sends the request to the panel manager 536 which can display the requested panel type 3606.

A user may navigate focus within a media center panel to display more information about a media item or to move focus to an action button. The input event manager 536 is operable to determine 3610 focus has moved. If focus has moved, the input event manager is operable to determine a new focus location 3612. If the new focus location requires a change to the information displayed in the panel, the input event manager is operable to send the new focus location to the panel manager 536 which can update the panel. The panel manager 536 may resize and or reposition the panel and the information and/or lists displayed within the panel as necessary when focus is moved.

The user may use hot keys 2022, 3022, 3122, 3222 or action buttons such as, but not limited to, the scan now button 2013, hide content button 2014, delete device button 2015, favorite button 2113, audio button 2114, subtitle button 2115, to tag or untag a media item as watched or as a favorite, to hide an item, or delete a media item, and/or to make subtitle and audio selections. The input event manager 508 is operable to determine 3614 if a user has selected a hot key or an action button and to determine the action required 3616. The input event manager 508 may then send a requested action to the panel manager 536, the media module 1411, the settings panel 524, as necessary. For example, if the user selects a favorite button or hot key to tag a media item with focus as a favorite, the input event manager 508 would receive the request 3614 and send the request 3616 to the media module 1411 which may update the metadata stored in memory 308 to tag the media item as a favorite.

If a user navigated focus to an action button or a media item in a list displayed by the panel 3610, the user may select the button or media item with focus to make a media item selection and view the selected media item. A user may also press a hot key to make a media item selection. When a media item selection is made 3618, the input event manager 508 can receive the selection and determine the actions required. The input event manager 508 may send the selection to the media module 1411 which may update 3620 the metadata stored in memory 308 to tag the selected media item as watched, viewed, or listened to, or the like. The input event manager may also send the selection to the user interface application 468 which may display 3620 the selected media item. After updating the metadata and displaying the selected media, the input event manager 508 may notify the panel manager 536 which may hide 3622 the active media center panel ending the process 3624.

The user may send a command to exit or dismiss 3626 a media center panel and, if so, the input event manager 508 may send the command to the panel manager 536 which may dismiss or hide 3622 the active media center panel and the process 3600 may then end 3624. Of course, one of skill in the art will recognize that the user can send a command to exit the media center panel at any point in process 3600.

The exemplary systems and methods of this disclosure have been described in relation to the arrangement and organization of metadata about media items for display to a user in panels. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the panel displayed to a user may comprise one or more combinations of an information panel, a favorite panel, a last viewed panel, a most viewed panel, a search panel, and a new panel.

In some alternative embodiments, the translucency and position of each panel is user configurable such that each panel may vary in transparency.

In still another embodiment, the metadata displayed and the organization of a panel may change based on the type of media item that has focus when the panel is requested. In another embodiment, the layout, information, and content of a panel may depend on the context and content of the media item with focus when a user activates the panel. In yet another embodiment, the organization and information presented by a panel may change if a media item is active or playing when the panel is requested compared to a panel presented when a media item is inactive. For example, the information presented by a panel and the layout of the panel may be different when a movie is in progress or playing when the panel is presented compared to the information presented and the layout of the panel when the movie is not playing when the panel is requested.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A non-transitory computer readable storage medium having stored thereon instructions that cause a processor to execute a method of displaying a media center panel on a television display, the method comprising the steps of:

displaying on the television display a first display including content, wherein the content includes two or more selectable representations of two or more items of media that are displayed on the television display when selected, each item of media having a media type and the two or more items of media comprising at least two different media types;

receiving focus on a first selectable representation in the first display, wherein a visual indicia indicates the selectable representation receiving focus;

while displaying the content in the first display, receiving a first user input that requests activation of the media center panel, wherein the media center panel has two or more different types of user interfaces;

determining, based on the media type for the item of media represented by the first selectable representation in the first display, the type of media center panel user interface requested;

retrieving, from memory, metadata based on the determined type of media center panel user interface requested;

continuing to display at least some of the content in a first portion of the first display;

continuing to display the visual indicia on the first selectable representation receiving focus;

while continuing to display at least some of the content in the first portion of the first display and continuing to display the visual indicia on the first selectable representation receiving focus, displaying on the television display the determined type of media center panel user interface, wherein the determined type of media center panel displays at least some of the retrieved metadata in the media center panel, wherein the type of media center panel is a user interface displayed in a second portion of the first display that provides information about the first selectable representation receiving focus, wherein the determined type of media center panel user interface comprises two or more selectable tabs to navigate to at least a second type of media center panel indicated by the selectable tab;

while displaying the determined media center panel type, receiving a second user input in the determined type of media center panel user interface that requests activation of the second type of media center panel user interface, wherein the second user input is a directional input that selects a first selectable tab of the two or more selectable tabs in the determined type of media center panel user interface; and based on the second user input, while continuing to display at least some of the content in the first portion of the first display and continuing to display the visual indicia on the first selectable representation receiving focus, displaying the second type of media center panel in the second portion of the first display, wherein the second type of media center panel replaces the determined type of media center panel user interface, wherein the second type of media center panel provides a second list of media organized in a first organization in the second type of media center panel, and wherein the second type of media center panel provides at least a second selectable tab to display a third list of media in a second organization.

2. The non-transitory computer readable storage medium of claim 1, wherein the type of media center panel comprises at least one of: an information panel; a favorite panel; a last viewed panel; a most viewed panel; a search panel; and a new panel.

3. The non-transitory computer readable storage medium of claim 1, wherein the metadata comprises at least one of: a thumbnail; a title; a description; a rating; and a run time.

4. The non-transitory computer readable storage medium of claim 1, further comprising:

receiving a selection of a media item from one or more media items displayed in the media center panel; and presenting content associated with the selected media item in a second display.

5. The non-transitory computer readable storage medium of claim 1, wherein each of the two or more selectable tabs are associated with one of an information panel, a favorite panel, a last viewed panel, a most viewed panel, a search panel, and a new panel.

6. The non-transitory computer readable storage medium of claim 5, further comprising:

receiving a selection of a media item from one or more media items displayed in the second media center panel; and presenting content associated with the selected media item in a third display.

7. The non-transitory computer readable storage medium of claim 1, wherein the media center panel includes a list of one or more related media items.

8. The non-transitory computer readable storage medium of claim 7, further comprising:

receiving a selection of a media item displayed in the list;

determining if the selected media item is stored on a connected storage medium or available to purchase or rent from a content provider;

if the selected media item is stored on the connected storage medium, presenting content associated with the selected media item in a fourth display;

if the selected media item is available to purchase or rent, connecting to the content provider to purchase or rent the selected media item; and presenting content associated with the selected media item in the fourth display.

9. The non-transitory computer readable storage medium of claim 1, further including retrieving, from a data subservice, metadata based on the type of media center panel requested.

10. The non-transitory computer readable storage medium of claim 1, further comprising after receiving the request to activate the media center panel:

identifying a user associated with the request; and retrieving metadata associated with the identified user from memory for display by the media center panel.

11. The non-transitory computer readable storage medium of claim 1, further comprising after receiving the request:

during a present session, determining whether the request is a first request to activate a media center panel from a current user interface or if the request is not the first request to activate the media center panel from the current user interface, wherein the first request occurs once after turning on a television;

if the request is a first request:

determining the type of media center panel requested;

retrieving, from memory, metadata based on the type of media center panel requested; and displaying on the television display the retrieved metadata in the media center panel in the first display;

if the request is not the first request:
  determining the type of media center panel last displayed in the current user interface;
  retrieving, from memory, metadata based on the type of media center panel last displayed in the current user interface; and
  displaying on the television display the retrieved metadata in the media center panel in the first display.

12. A television system, comprising:
a display;
a memory;
a processor in communication with the memory and the display, the processor operable to:
  display on the television display a first display including content, wherein the content includes two or more selectable representations of two or more items of media that are displayed on the television display when selected, each item of media having a media type and the two or more items of media comprising at least two different media types;
  receive focus on a first selectable representation in the first display, wherein a visual indicia indicates the selectable representation receiving focus;
  while displaying the content in the first display, receive a first user input that requests activation of a media center panel, wherein the media center panel has two or more different types of user interfaces;
  determine, based on the media type for the item of media represented by the first selectable representation in the first display, the type of media center panel requested;
  retrieve, from memory, metadata based on the determined type of media center panel user interface requested;
  continue to display at least some of the content in a first portion of the first display;
  continue to display the visual indicia on the first selectable representation receiving focus;
  while continuing to display at least some of the content in the first portion of the first display and continuing to display the visual indicia on the first selectable representation receiving focus, display, on the television display the determined type of media center panel user interface, wherein the determined type of media center panel is a user interface displayed in a second portion of the first display that provides information about the first selectable representation receiving focus, wherein the determined type of media center panel displays at least some of the retrieved metadata in at least a portion of the media center panel, wherein the metadata comprises at least one of a thumbnail, a title, a description, a rating, and a run time, and wherein the determined type of media center panel user interface comprises two or more selectable tabs to navigate to at least a second type of media center panel indicated by the selectable tab;
  while displaying the determined media center panel type, receiving a second user input in the determined type of media center panel user interface that requests activation of the second type of media center panel user interface, wherein the second user input is a directional input that selects a first selectable tab of the two or more selectable tabs in the determined type of media center panel user interface; and
  based on the second user input, while continuing to display at least some of the content in the first portion of the first display and continuing to display the visual indicia on the first selectable representation receiving focus, navigating to the second type of media center panel in the media center panel user interface in the second portion of the first display, wherein user input in the display is limited to options within the second type of media center panel until the second type of media center panel is dismissed, wherein the second type of media center panel replaces the determined type of media center panel user interface, wherein the second type of media center panel provides a second list of media organized in a first organization in the second type of media center panel, and wherein the second type of media center panel provides at least a second selectable tab to display a third list of media in a second organization.

13. The television system of claim 12, wherein the processor is further operable to:
  receive a selection of a media item from one or more media items displayed in the media center panel; and
  present content associated with the selected media item in a second display.

14. The television system of claim 12, wherein the media center panel includes a list of one or more related media items.

15. The television system of claim 12,
  wherein each of the two or more selectable tabs are associated with one of an information panel, a favorite panel, a last viewed panel, a most viewed panel, a search panel, and a new panel.

16. The television system of claim 15, wherein the processor is further operable to:
  receive a selection of a media item from one or more media items displayed in the second media center panel; and
  present content associated with the selected media item in a third display.

17. The television system of claim 12, wherein after the second type of media center panel user interface is displayed, the processor is further operable to:
  receive a third user input in the user interface that requests dismissal of the second type of media center panel user interface; and
  present content associated with the selected media item in the first display.

18. The television system of claim 12, wherein the processor is further operable to:
  search a network connected to the television to identify a plurality of media sources;
  determine a number of media items associated with the plurality of media sources, wherein a first media item is stored at a first media source and a second media item is stored at a second media source, wherein the first media item and second media item are each one of a group comprising videos, photos, music, social media, recordings, video calls, audio calls, text conversations, books, emails, and letters;
  identify metadata associated with the first and second media items media items, wherein first metadata is data about the first media item and second metadata is data about the second media item;
  store the metadata in the memory;
  receive a request from a user to display the first and second media items; and
  display on the display a representation of the first and second media items based on the stored metadata, wherein a first representation is selectable for playing the first media item and a second representation is selectable for playing the second media item.

19. A method for organizing media item metadata on a television, the method comprising:

displaying on the television display a first display including content, wherein the content includes two or more selectable representations of two or more items of media that are displayed on the television display when selected, each item of media having a media type and the two or more items of media comprising at least two different media types;

receiving focus on a first selectable representation in the first display, wherein a visual indicia indicates the selectable representation receiving focus;

while displaying the content in the first display, receiving a first user input that requests activation of a media center panel user interface, wherein the media center panel user interface is one of two or more different types of user interfaces;

determining, based on the media type for the item of media represented by the first selectable representation in the first display, the type of media center panel requested, wherein the two or more types of user interfaces comprise two or more of an information panel, a favorite panel, a last viewed panel, a most viewed panel, a search panel, and a new panel;

retrieving, from memory, metadata based on the determined type of media center panel user interface requested;

continuing to display at least some of the content in a first portion of the first display;

continuing to display the visual indicia on the first selectable representation;

while continuing to display at least some of the content in the first portion of the first display and continuing to display the visual indicia on the first selectable representation receiving focus, displaying on the television display the determined type of media center panel user interface, wherein the determined type of media center panel displays at least some of the retrieved metadata in at least a portion of the media center panel, wherein the determined type of media center panel user interface is displayed in a second portion of the first display and provides information about the first selectable representation receiving focus, wherein the determined type of media center panel user interface is an information panel, and wherein the determined type of media center panel user interface comprises two or more selectable tabs to navigate to at least a second type of media center panel, wherein each of the two or more selectable tabs are associated with and indicate one of a favorite panel, a last viewed panel, a most viewed panel, a search panel, and a new panel;

while displaying the determined media center panel type, receiving a second user input in the information panel that requests activation of a favorite panel, wherein the second user input is a directional input that selects a first selectable tab of the two or more selectable tabs in the information panel; and while continuing to display at least some of the content in the first portion of the first display and continuing to display the visual indicia on the first selectable representation receiving focus, navigating to the favorite panel in the second portion of the first display, wherein the favorite panel obscures the second portion of the first display, wherein the favorite panel replaces the information panel, wherein user input in the display is limited to options within the favorite panel until the favorite panel is dismissed, and wherein the favorite panel provides a second list of media organized in a first organization in the favorite panel, and wherein favorite panel provides at least a second selectable tab to display a third list of media in a second organization in one of a last viewed panel or a most viewed panel.

20. The method of claim 19, further comprising:

receiving a selection of a media item from one or more media items displayed in the media center panel; and presenting content associated with the selected media item in a second display.

* * * * *

UNITED STATES PATENT AND TRADEMARK OFFICE
CERTIFICATE OF CORRECTION

PATENT NO. : 10,444,848 B2
APPLICATION NO. : 14/822705
DATED : October 15, 2019
INVENTOR(S) : Sanjiv Sirpal et al.

Page 1 of 1

It is certified that error appears in the above-identified patent and that said Letters Patent is hereby corrected as shown below:

On the Title Page

IN RELATED U.S. APPLICATION DATA:
Replace item (63) with the following:
Continuation application No. 13/968,897, filed on Aug. 16, 2013, now abandoned, and is a continuation-in-part of application Nos.: (1) 13/968,876 filed on Aug. 16, 2013; (2) 13/968,867 filed on Aug. 16, 2013; (3) 13/968,913 filed on Aug. 16, 2013; (4) 14/407,598 filed on Dec. 12, 2014, which is a national stage application under 35 U.S.C. § 371 of PCT Application No. PCT/US2013/036844, filed on Apr. 16, 2013; (5) 14/407,593, filed on Dec. 12, 2014," which is a national stage application under 35 U.S.C. § 371 of PCT application No. PCT/US2013/036782, filed on Apr. 16, 2013, now abandoned; and (6) 13/968,903 filed on Aug. 16, 2013.

In the Specification

Column 1, Line 10, delete "Television";" and insert --Television." The present application is a continuation-in-part of and claims priority to U.S. patent application-- therein.

Column 1, Line 33, delete "continuation" and insert --continuation-in-part-- therein.

Signed and Sealed this
Seventh Day of April, 2020

Andrei Iancu
*Director of the United States Patent and Trademark Office*